United States Patent
Ikeda

(10) Patent No.: US 11,765,395 B2
(45) Date of Patent: Sep. 19, 2023

(54) IMAGE PROCESSING DEVICE AND IMAGE PROCESSING METHOD

(71) Applicant: Sony Group Corporation, Tokyo (JP)

(72) Inventor: Masaru Ikeda, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 373 days.

(21) Appl. No.: 17/283,260

(22) PCT Filed: Oct. 18, 2019

(86) PCT No.: PCT/JP2019/041055
§ 371 (c)(1),
(2) Date: Apr. 7, 2021

(87) PCT Pub. No.: WO2020/090515
PCT Pub. Date: May 7, 2020

(65) Prior Publication Data
US 2021/0352331 A1  Nov. 11, 2021

(30) Foreign Application Priority Data
Nov. 2, 2018  (JP) ................................ 2018-207495

(51) Int. Cl.
*H04N 19/86* (2014.01)
*H04N 19/117* (2014.01)
(Continued)

(52) U.S. Cl.
CPC ........... *H04N 19/86* (2014.11); *H04N 19/117* (2014.11); *H04N 19/186* (2014.11); *H04N 19/82* (2014.11); *H04N 19/96* (2014.11)

(58) Field of Classification Search
CPC ..... H04N 19/86; H04N 19/117; H04N 19/186
(Continued)

(56) References Cited

U.S. PATENT DOCUMENTS

2015/0350687 A1* 12/2015 Zhai ...................... H04N 19/82
375/240.25
2016/0142721 A1* 5/2016 Shimada .............. H04N 19/186
382/166

FOREIGN PATENT DOCUMENTS

WO    2015/006662 A2    1/2015

OTHER PUBLICATIONS

Ikeda et al., "CE2: Long-tap Deblocking Filter for Luma and Chroma (CE2-2.1.6)", Joint Video Experts Team (JVET) of ITU-T SG 16 WP 3 and ISO/IEC JTC 1/SC 29/WG 11, JVET-K0152-v2, Jul. 10-18, 2018, pp. 1-10.

(Continued)

*Primary Examiner* — Amir Shahnami
(74) *Attorney, Agent, or Firm* — XSENSUS LLP

(57) ABSTRACT

The present technology relates to an image processing device and an image processing method by which various DFs can be provided.
A reduced second luminance filter having a reduced filter characteristic with respect to a second luminance filter having a higher filter strength than a first luminance filter, or a reduced first luminance filter having a reduced filter characteristic with respect to the first luminance filter is applied, as a second color-difference filter having a higher filter strength than a first color-difference filter, to a pixel of a color-difference component located around a block boundary in a decoded image. The present technology is applicable to image encoding and decoding, for example.

14 Claims, 21 Drawing Sheets

(51) Int. Cl.
  *H04N 19/186* (2014.01)
  *H04N 19/82* (2014.01)
  *H04N 19/96* (2014.01)
(58) Field of Classification Search
  USPC .................................................. 375/240.29
  See application file for complete search history.

(56) References Cited

OTHER PUBLICATIONS

Andersson et al., "CE11: Long Deblocking Filters for Luma (CE11. 1. 1) and for Both Luma and Chroma (CE11.1.9)", Joint Video Experts Team (JVET) of ITU-T SG 16 WP 3 and ISO/IEC JTC 1/SC 29/WG 11, JVET-L0072, Oct. 3-12, 2018, pp. 1-7.

Zhu et al., "CE11: Deblocking Modifications for Large CUs Both Luma and Chroma (Test 11.1.7a and CE11.1.7b)", Joint Video Experts Team (JVET) of ITU-T SG 16 WP 3 and ISO/IEC JTC 1/SC 29/WG 11, JVET-L0405r1, Oct. 3-12, 2018, pp. 1-11.

Chen et al., "Algorithm Description for Versatile Video Coding and Test Model 2 (VTM 2)", Joint Video Experts Team (JVET) of ITU-T SG 16 WP 3 and ISO/IEC JTC 1/SC 29/WG 11, JVET-K1002-v1, Jul. 10-18, 2018, pp. 1-19.

International Search Report and Written Opinion dated Dec. 10, 2019, received for PCT Application PCT/JP20189/041055, Filed on Oct. 18, 2019, 9 pages including English Translation.

Chih-Wei Hsu, et al., "CE12.3.2: Reducing pixel line buffers by modifying DF for horizontal LCU edges", Joint Collaborative Team on Video Coding (JCT-VC) of ITU-T SG16 WP3 and ISO/IEC JTC1/ SC29/WG11, Document: JCTVC-G228, 7th Meeting: Geneva, CH, Nov. 21-30, 2011, XP030110212, total 7 pages. URL:http://phenix.int-evry.fr/jct/doc_end_user/documents/7_Geneva/wgll/JCTVC-G228-vl.zip JCTVC-G228.doc.

\* cited by examiner

F I G. 1

| bS | Y | U | V |
|---|---|---|---|
| | | CONDITION CONCERNING INTRA PREDICTION (CONDITION A) | |
| 2 | | | |
| 1 | CONDITION CONCERNING PRESENCE/ABSENCE OF SIGNIFICANT COEFFICIENT OF Y (CONDITION B1) | N/A | N/A |
| | CONDITION CONCERNING MV AND REFERENCE PICTURE (CONDITION B2) | | |
| 0 | Others | | |

FIG. 2

| bS | Y | U | V |
|---|---|---|---|
| 2 | CONDITION CONCERNING INTRA PREDICTION (CONDITION A) | | |
| 1 | CONDITION CONCERNING PRESENCE/ABSENCE OF SIGNIFICANT COEFFICIENT OF Y (CONDITION B1) | | |
| | CONDITION CONCERNING MV AND REFERENCE PICTURE (CONDITION B2) | | |
| 0 | Others | | |

FIG. 4

| bS | Y | U | V |
|---|---|---|---|
| 16 | CONDITION CONCERNING INTRA PREDICTION (CONDITION A) | | |
| 2~14 | CONDITION CONCERNING PRESENCE/ABSENCE OF SIGNIFICANT COEFFICIENT OF Y (CONDITION B1-Y) | CONDITION CONCERNING PRESENCE/ABSENCE OF SIGNIFICANT COEFFICIENT OF U (CONDITION B1-U) | CONDITION CONCERNING PRESENCE/ABSENCE OF SIGNIFICANT COEFFICIENT OF U (CONDITION B1-V) |
| 1 | CONDITION CONCERNING MV AND REFERENCE PICTURE (CONDITION B2) | | |
| 0 | Others | | |

FIG. 8

O: TRUE   X: FALSE   N/A: NOT APPLICABLE

| bS | CONDITION A (INTRA PREDICTION) | CONDITION B1-Y (SIGNIFICANT COEFFICIENT OF Y) | CONDITION B1-U (SIGNIFICANT COEFFICIENT OF U) | CONDITION B1-V (SIGNIFICANT COEFFICIENT OF V) | CONDITION B2 (MV/ REFERENCE PICTURE) |
|---|---|---|---|---|---|
| 16=10000 | O | N/A | N/A | N/A | N/A |
| 14=01110 | X | O | O | O | X |
| 12=01100 | X | O | O | X | X |
| 10=01010 | X | O | X | O | X |
| 8=01000 | X | O | X | X | X |
| 6=00110 | X | X | O | O | X |
| 4=00100 | X | X | O | X | X |
| 2=00010 | X | X | X | O | X |
| 1=00001 | X | N/A | N/A | N/A | O |
| 0=00000 | X | X | X | X | X |

| FILTER TYPE / FILTER TARGET COMPONENT | STRONG FILTER | WEAK FILTER |
|---|---|---|
| LUMINANCE COMPONENT | FILTER Y1 | FILTER Y2 |
| COLOR-DIFFERENCE COMPONENT | FILTER C1 ||

FIG. 15

| FILTER TARGET COMPONENT \ FILTER TYPE | STRONG FILTER | WEAK FILTER |
|---|---|---|
| LUMINANCE COMPONENT | FILTER NY1 = Y1 | FILTER NY2 = Y2 |
| COLOR-DIFFERENCE COMPONENT | FILTER NC1 = FILTER BASED ON Y1/Y2/FILTER BASED ON ORIGINAL FILTER OF | FILTER NC2 = C1 |

FIG. 17

| FILTER NC1 \ REQUIRED PIXELS | PIXEL FOR DETERMINATION ON FILTER APPLICATION (APPLICATION DETERMINATION PIXEL) | PIXEL FOR DETERMINATION ON FILTER TYPE (TYPE DETERMINATION PIXEL) | PIXEL FOR FILTERING PROCESS (FILTER CONSTITUTING PIXEL) | PIXEL WHICH IS TARGET OF FILTERING PROCESS (TARGET PIXEL) |
|---|---|---|---|---|
| Y1 NORMAL | $p_0 \sim p_2$, $q_0 \sim q_2$ (6 PIXELS) | $p_0 \sim p_3$, $q_0 \sim q_3$ (8 PIXELS) | $p_0 \sim p_3$, $q_0 \sim q_3$ (8 PIXELS) | $p_0 \sim p_2$, $q_0 \sim q_2$ (6 PIXELS) |
| Y1-1 ASYMMETRIC | $p_0 \sim p_2$, $q_0 \sim q_2$ (6 PIXELS) | $p_0 \sim p_2$, $q_0 \sim q_3$ (7 PIXELS) | $p_0 \sim p_2$, $q_0 \sim q_3$ (7 PIXELS) | $p_0 \sim p_2$, $q_0 \sim q_2$ (6 PIXELS) |
| Y1-1 SYMMETRIC | $p_0 \sim p_2$, $q_0 \sim q_2$ (6 PIXELS) | $p_0 \sim p_2$, $q_0 \sim q_2$ (6 PIXELS) | $p_0 \sim p_2$, $q_0 \sim q_2$ (6 PIXELS) | $p_0 \sim p_2$, $q_0 \sim q_2$ (6 PIXELS) |
| Y1-2 ASYMMETRIC | $p_0 \sim p_1$, $q_0 \sim q_2$ (5 PIXELS) | $p_0 \sim p_1$, $q_0 \sim q_3$ (6 PIXELS) | $p_0 \sim p_1$, $q_0 \sim q_3$ (6 PIXELS) | $p_0 \sim p_1$, $q_0 \sim q_2$ (5 PIXELS) |
| Y1-2 SYMMETRIC | $p_0 \sim p_1$, $q_0 \sim q_1$ (4 PIXELS) | $p_0 \sim p_1$, $q_0 \sim q_1$ (4 PIXELS) | $p_0 \sim p_1$, $q_0 \sim q_1$ (4 PIXELS) | $p_0 \sim p_1$, $q_0 \sim q_1$ (4 PIXELS) |

F I G. 18

| FILTER NCI \ REQUIRED PIXELS | PIXEL FOR DETERMINATION ON FILTER APPLICATION (APPLICATION DETERMINATION PIXEL) | PIXEL FOR DETERMINATION ON FILTER TYPE (TYPE DETERMINATION PIXEL) | PIXEL FOR FILTERING PROCESS (FILTER CONSTITUTING PIXEL) | PIXEL WHICH IS TARGET OF FILTERING PROCESS (TARGET PIXEL) |
|---|---|---|---|---|
| OF NORMAL | $p_0 \sim p_2, q_0 \sim q_2$ (6 PIXELS) | $p_0 \sim p_3, q_0 \sim q_3$ (8 PIXELS) | $p_0 \sim p_3, q_0 \sim q_3$ (8 PIXELS) | $p_0 \sim p_2, q_0 \sim q_2$ (6 PIXELS) |
| OF-1 ASYMMETRIC | $p_0 \sim p_2, q_0 \sim q_2$ (6 PIXELS) | $p_0 \sim p_2, q_0 \sim q_3$ (7 PIXELS) | $p_0 \sim p_2, q_0 \sim q_3$ (7 PIXELS) | $p_0 \sim p_2, q_0 \sim q_2$ (6 PIXELS) |
| OF-1 SYMMETRIC | $p_0 \sim p_2, q_0 \sim q_2$ (6 PIXELS) | $p_0 \sim p_2, q_0 \sim q_2$ (6 PIXELS) | $p_0 \sim p_2, q_0 \sim q_2$ (6 PIXELS) | $p_0 \sim p_2, q_0 \sim q_2$ (6 PIXELS) |
| OF-2 ASYMMETRIC | $p_0 \sim p_1, q_0 \sim q_2$ (5 PIXELS) | $p_0 \sim p_1, q_0 \sim q_3$ (6 PIXELS) | $p_0 \sim p_1, q_0 \sim q_3$ (6 PIXELS) | $p_0 \sim p_1, q_0 \sim q_2$ (5 PIXELS) |
| OF-2 SYMMETRIC | $p_0 \sim p_1, q_0 \sim q_1$ (4 PIXELS) | $p_0 \sim p_1, q_0 \sim q_1$ (4 PIXELS) | $p_0 \sim p_1, q_0 \sim q_1$ (4 PIXELS) | $p_0 \sim p_1, q_0 \sim q_1$ (4 PIXELS) |

FIG. 19

| REQUIRED PIXELS / FILTER NCI | PIXEL FOR DETERMINATION ON FILTER APPLICATION (APPLICATION DETERMINATION PIXEL) | PIXEL FOR DETERMINATION ON FILTER TYPE (TYPE DETERMINATION PIXEL) | PIXEL FOR FILTERING PROCESS (FILTER CONSTITUTING PIXEL) | PIXEL WHICH IS TARGET OF FILTERING PROCESS (TARGET PIXEL) |
|---|---|---|---|---|
| Y2 NORMAL | $p_0 \sim p_2$, $q_0 \sim q_2$ (6 PIXELS) | $p_0 \sim p_2$, $q_0 \sim q_2$ (6 PIXELS) | $p_0 \sim p_2$, $q_0 \sim q_2$ (6 PIXELS) | $p_0 \sim p_1$, $q_0 \sim q_1$ (4 PIXELS) |
| Y2-1 ASYMMETRIC | $p_0 \sim p_1$, $q_0 \sim q_2$ (5 PIXELS) | $p_0 \sim p_1$, $q_0 \sim q_2$ (5 PIXELS) | $p_0 \sim p_1$, $q_0 \sim q_2$ (5 PIXELS) | $p_0 \sim p_1$, $q_0 \sim q_1$ (4 PIXELS) |
| Y2-1 SYMMETRIC | $p_0 \sim p_1$, $q_0 \sim q_1$ (4 PIXELS) | $p_0 \sim p_1$, $q_0 \sim q_1$ (4 PIXELS) | $p_0 \sim p_1$, $q_0 \sim q_1$ (4 PIXELS) | $p_0 \sim p_1$, $q_0 \sim q_1$ (4 PIXELS) |

FIG. 20

| CTU BOUNDARY | INNER BOUNDARY | DIFFERENCE IN IMAGE QUALITY BETWEEN CTU BOUNDARY AND INNER BOUNDARY (CONSTRAINTS OF CTU BOUNDARY) | Line buffer size |
|---|---|---|---|
| Y1 NORMAL | Y1 NORMAL | NO | 4 LINES |
| Y2 NORMAL | Y2 NORMAL | NO | 3 LINES |
| Y1/OF-1 ASYMMETRIC | Y1/OF NORMAL | SMALL (YES) | 3 LINES |
| Y1/OF-1 SYMMETRIC | Y1/OF NORMAL | SMALL (YES) | 3 LINES |
| Y1/OF-1 ASYMMETRIC | Y1/OF-1 ASYMMETRIC | NO (NO) | 3 LINES |
| Y1/OF-1 SYMMETRIC | Y1/OF-1 SYMMETRIC | NO (NO) | 3 LINES |
| Y1/OF-2 ASYMMETRIC | Y1/OF NORMAL | LARGE (YES) | 2 LINES |
| Y1/OF-2 SYMMETRIC | Y1/OF NORMAL | LARGE (YES) | 2 LINES |
| Y1/OF-2 ASYMMETRIC | Y1/OF-2 ASYMMETRIC | NO (NO) | 2 LINES |
| Y1/OF-2 SYMMETRIC | Y1/OF-2 SYMMETRIC | NO (NO) | 2 LINES |
| Y2-1 ASYMMETRIC | Y2 NORMAL | SMALL (YES) | 2 LINES |
| Y2-1 SYMMETRIC | Y2 NORMAL | SMALL (YES) | 2 LINES |
| Y2-1 ASYMMETRIC | Y2-1 ASYMMETRIC | NO (NO) | 2 LINES |
| Y2-1 SYMMETRIC | Y2-1 SYMMETRIC | NO (NO) | 2 LINES |

FIG. 21

| CTU BOUNDARY | | INNER BOUNDARY | | DIFFERENCE IN IMAGE QUALITY BETWEEN CTU BOUNDARY AND INNER BOUNDARY (CONSTRAINTS OF CTU BOUNDARY) | Line buffer size |
|---|---|---|---|---|---|
| p-side | q-side | p-side | q-side | | |
| C1 | Y1 NORMAL | Y1 NORMAL | Y1 NORMAL | SMALL (YES) | 2 LINES |
| C1 | C1 | Y1 NORMAL | Y1 NORMAL | LARGE (YES) | 2 LINES |
| C1 | Y1 NORMAL | C1 | Y1 NORMAL | NO (NO) | 2 LINES |
| C1 | C1 | C1 | C1 | NO (NO) | 2 LINES |

IMAGE PROCESSING DEVICE AND IMAGE PROCESSING METHOD

CROSS-REFERENCE TO RELATED APPLICATIONS

The present application is based on PCT filing PCT/JP2019/041055, filed Oct. 18, 2019, which claims priority to JP 2018-207495, filed Nov. 2, 2018, the entire contents of each are incorporated herein by reference.

TECHNICAL FIELD

The present technology relates to an image processing device and an image processing method, and particularly, relates to an image processing device and an image processing method by which various DEs (deblocking filters) can be provided, for example.

BACKGROUND ART

In H.265/HEVC which is one standard of image encoding, a deblocking filter is applied to a block boundary in a decoded image in order to prevent deterioration of the image quality due to block distortion which is generated during encoding. In H.265/HEVC, two types of deblocking filters, that is, a weak filter and a strong filter which can be applied to a luminance component, while only one type of a deblocking filter, that is, a weak filter can be applied to a color-difference component.

In addition, in order to obtain an encoding efficiency higher than that of H.265/HEVC, the JVET (Joint Video Experts Team), which is a common standardizing organization of ITU-T and ISO/IEC, is facilitating the standardization of VVC (Versatile Video Coding) as an image encoding method of a next generation (for example, see NPL 1).

In the standardization of VVC, NPL 1 proposes a method in which a deblocking filter applicable to a color-difference component is changed into two types, as in a deblocking filter applicable to a luminance component so that a strong filter can also be applied to a color-difference component.

CITATION LIST

Non Patent Literature

[NPL 1]
Jianle Chen, Yan Ye, Seung Hwan Kim: Algorithm description for Versatile Video Coding and Test Model 2 (VTM 2), Joint Video Experts Team (JVET) of ITU-T SG 16 WP 3 and ISO/IEC JTC 1/SC 29/WG 11 11th Meeting, Ljubljana, SI, 10-18 Jul. 2018.

SUMMARY

Technical Problem

Regarding DF, provision of various types of DF has been demanded.

The present technology has been made in view of the aforementioned circumstances, and can provide various DFs.

Solution to Problem

A first image processing device according to the present technology includes a decoding section that generates a decoded image by performing a decoding process of a bitstream, and a filtering section that applies, as a second color-difference filter having a higher filter strength than a first color-difference filter, a reduced second luminance filter or a reduced first luminance filter to a pixel of a color-difference component located around a block boundary in the decoded image having undergone the decoding process by the decoding section, the reduced second luminance filter having a reduced filter characteristic with respect to a second luminance filter having a higher filter strength than a first luminance filter, the reduced first luminance filter having a reduced filter characteristic with respect to the first luminance filter.

A first image processing method according to the present technology includes generating a decoded image by performing a decoding process of a bitstream, and applying, as a second color-difference filter having a higher filter strength than a first color-difference filter, a reduced second luminance filter or a reduced first luminance filter to a pixel of a color-difference component located around a block boundary in the decoded image having undergone the decoding process by the decoding section, the reduced second luminance filter having a reduced filter characteristic with respect to a second luminance filter having a higher filter strength than a first luminance filter, the reduced first luminance filter having a reduced filter characteristic with respect to the first luminance filter.

In the first image processing device and the first image processing method according to the present technology, a decoded image is generated by a decoding process of a bitstream. Then, as the second color-difference filter having a higher filter strength than the first color-difference filter, the reduced second luminance filter having a reduced filter characteristic with respect to the second luminance filter having a higher filter strength than the first luminance filter, or the reduced first luminance filter having a reduced filter characteristic with respect to the first luminance filter is applied to a pixel of a color-difference component located around a block boundary in the decoded image.

A second image processing device according to the present technology includes a filtering section that applies, as a second color-difference filter having a higher filter strength than a first color-difference filter, a reduced second luminance filter or a reduced first luminance filter to a pixel of a color-difference component located around a block boundary in a local decoded image obtained by a local decoding process during an encoding process of an image, the reduced second luminance filter having a reduced filter characteristic with respect to a second luminance filter having a higher filter strength than a first luminance filter, the reduced first luminance filter having a reduced filter characteristic with respect to the first luminance filter, and an encoding section that performs an encoding process of the image by using the local decoded image to which the second color-difference filter has been applied by the filtering section.

A second image processing method according to the present technology includes applying, as a second color-difference filter having a higher filter strength than a first color-difference filter, a reduced second luminance filter or a reduced first luminance filter to a pixel of a color-difference component located around a block boundary in a local decoded image obtained by a local decoding process during an encoding process of an image, the reduced second luminance filter having a reduced filter characteristic with respect to a second luminance filter having a higher filter strength than a first luminance filter, the reduced first luminance filter having a reduced filter characteristic with respect to the first luminance filter, and performing an encoding process of the image by using the local decoded image to which the second color-difference filter has been applied.

In the second image processing device and the second image processing method according to the present technology, during an encoding process of an image, the reduced second luminance filter having a reduced filter characteristic with respect to the second luminance filter having a higher filter strength than the first luminance filter, or the reduced first luminance filter having a reduced filter characteristic with respect to the first luminance filter is applied, as the second color-difference filter having a higher filter strength than the first color-difference filter, to a pixel of a color-difference component located around a block boundary in a local decoded image obtained by a local decoding process. Further, the encoding process of the image is performed with use of the local decoded image to which the second color-difference filter has been applied.

It is to be noted that the image processing device can be implemented by causing a computer to execute a program. The program can be provided by being recorded in a recording medium, or by being transmitted via a transmission medium.

BRIEF DESCRIPTION OF DRAWINGS

FIG. 1 is a table for explaining calculation of a bS in HEVC.

FIG. 2 is a table for explaining calculation of a bS in NPL 1.

FIG. 4 is a table for explaining calculation of a bS in one embodiment according to the present disclosure.

FIG. 8 is a table depicting examples of a bS that is calculated by a boundary strength calculation section 261.

FIG. 15 is a diagram for explaining new DFs.

FIG. 17 is a diagram indicating a filter NC1 and pixels required in a case where a filter based on a filter Y1 is adopted as the filter NC1.

FIG. 18 is a diagram indicating a filter NC1 and pixels required in a case where a filter based on a filter OF is adopted as the filter NC1.

FIG. 19 is a diagram indicating a filter NC1 and pixels required in a case where a filter based on a filter Y2 is adopted as the filter NC1.

FIG. 20 is a diagram depicting examples of an application method for applying a filter NC1 to a decoded image.

FIG. 21 is a diagram depicting other examples of an application method for applying a filter NC1 to a decoded image.

DESCRIPTION OF EMBODIMENTS

Figure 3:
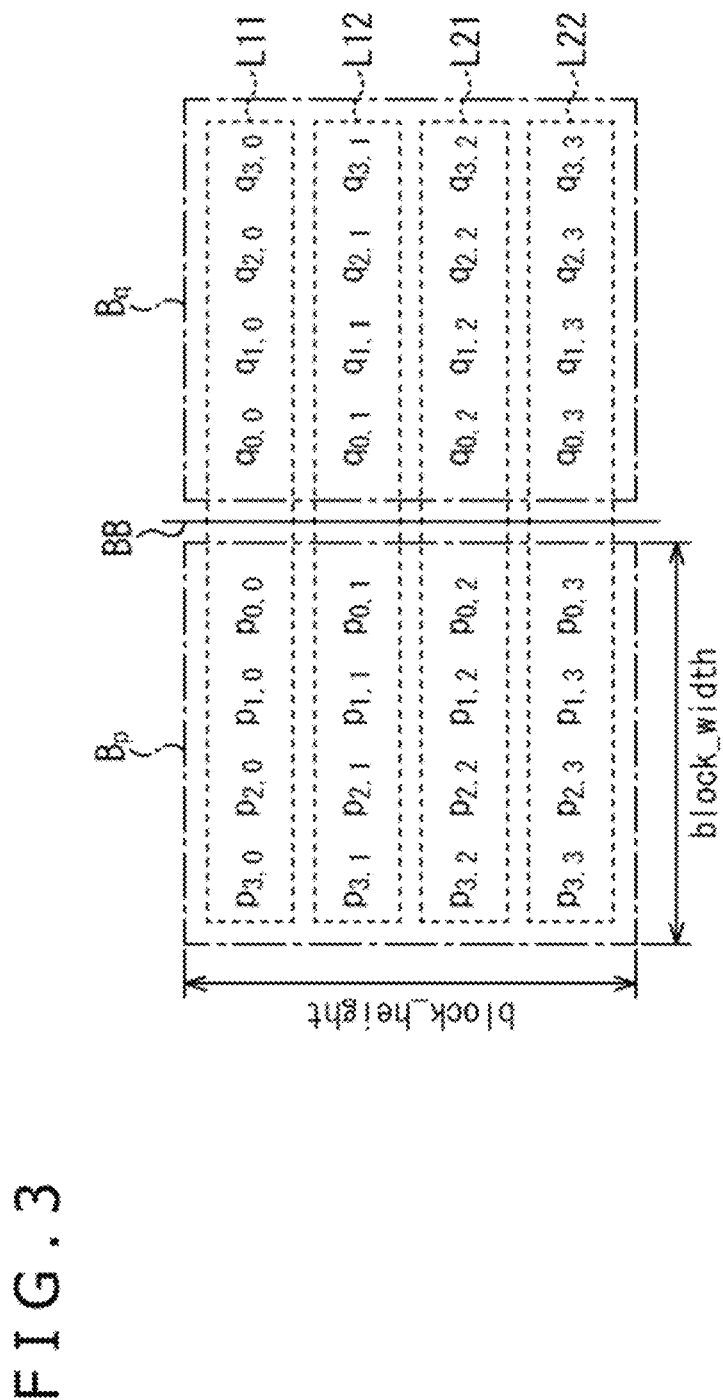
FIG. 3 is an explanatory diagram depicting one example of pixels of color-difference components (U component and V component) in two blocks, that is, a block Bp and a block Bq that are adjacent to each other with a vertical block boundary BB disposed therebetween.

Hereinafter, preferable embodiments according to the present disclosure will be explained in detail with reference to the attached drawings. It is to be noted that, throughout the present description and the drawings, components having substantially the same functional configuration are denoted by the same reference numeral, and an overlapping explanation thereof will be omitted.

In addition, the scope disclosed in the present description is not limited to the embodiments. The disclosures in the following reference documents REF1 to REF3, which have been publicly known at the time of filing of the present application, are also incorporated into the present description by reference. That is, the disclosures in the following the reference documents REF1 to REF3 also serve as the grounds for determination on the support requirements. For example, even if a Quad-Tree Block Structure which is described in the reference document REF2 or a QTBT (Quad Tree Plus Binary Tree) Block Structure which is described in the reference document REF3 is not directly defined in the detailed description of the invention, the structure is considered to be included within the scope of the present disclosure and to satisfy the support requirements of the claims. The same applies to the technical terms such as Parsing, Syntax, and Semantics. Even if these technical terms are not directly defined in the detailed description of the invention, the technical terms are considered to be included within the scope of the present disclosure and to satisfy the support requirements of the claims.

REF1: Recommendation ITU-T H.264 (April 2017) "Advanced video coding for generic audiovisual services", April 2017

REF2: Recommendation ITU-T H.265, (December 2016) "High efficiency video coding", December 2016

REF3: J. Chen, E. Alshina, G. J. Sullivan, J.-R. Ohm, J. Boyce, "Algorithm Description of Joint Exploration Test Model (JEM7)", JVET-G1001, Joint Video Exploration Team (JVET) of ITU-T SG 16 WP 3 and ISO/IEC JTC 1/SC 29/WG 11 7th Meeting: Torino, IT, 13-21 Jul. 2017

Further, hereinafter, unless otherwise noted, a YUV420 format signal is used as an example in the following explanation, a luminance component is expressed as a Y component, and color-difference components are expressed as a U component and a V component. However, the technology described below is applicable to signals of any other formats such as the YUV444 format and the YUV422 format. In addition, an expression of a luminance component and color-difference components differs according to a target signal. For example, the technology described below can be applied also to a signal in which a luminance component and color-difference components are expressed by YCbCr.

Moreover, the following terms which are used in the present description are defined as follows.

The term "color difference-related parameter" means any parameter that is related to a color difference. For example, a color difference-related parameter can include information regarding a transformation coefficient of a color-difference component, such as a transformation coefficient for a color-difference component included in each TU (Transform Unit) and a flag indicating the presence/absence of a significant coefficient (non-zero transformation coefficient) for a color-difference component in each TU. However, the term "color difference-related parameter" is not limited to these examples, and can refer to various parameters related to color differences.

The term "necessity/unnecessity of application of a deblocking filter" means whether or not to apply a deblocking filter. For example, determining the necessity/unnecessity of application of a deblocking filter means determining whether or not to apply a deblocking filter. In addition, a determination result of the necessity/unnecessity of application of a deblocking filter refers to a result obtained by determining whether or not to apply a deblocking filter. For example, the determination result can be either information indicating that a deblocking filter should be applied, or information indicating that a deblocking filter does not need to be applied.

A large block determination means a determination on whether or not a determination target block is large. In the present description, determination target blocks can be blocks with a block boundary disposed therebetween, as described later. Further, a large block determination can be made by comparison of the size of the blocks (block size) with a predetermined threshold. It is to be noted that a case where a large block determination is made, and the details of the large block determination will be explained later.

1. OUTLINE

[1-1. Existing Methods]

In the existing image encoding method such as HEVC, processing concerning deblocking filters involves an application necessity/unnecessity determination process, a filter strength determination process, and a filtering process (filter application process). Hereinafter, an explanation about the existing processing concerning deblocking filters will be given with use of deblocking filters in HEVC by way of example. It is to be noted that deblocking filters for color-difference components in decoded images (including an image obtained by local decoding during encoding) will be mainly explained below, and an explanation about deblocking filters for luminance components in decoded images will be omitted, as appropriate.

In the processing concerning deblocking filters, an application necessity/unnecessity determination process is first performed. In the application necessity/unnecessity determination process, whether or not to apply a deblocking filter to a block boundary in a decoded image is determined. It is to be noted that, in HEVC, a block boundary is specified on the basis of a block structure of a Quad-Tree Block Structure which is described in the reference document REF2. Specifically, among the edges of an 8×8 pixel block (sample grid) which is a minimum block unit, an edge satisfying a condition that the edge is at least either one of a TU (Transform Unit) boundary or a PU (Prediction Unit) boundary, is specified as a block boundary in HEVC.

The application necessity/unnecessity determination process is performed on the basis of the boundary strength (hereinafter, referred to as a bS in some cases) of the block boundary. In HEVC, a bS is calculated for every 4 lines of the specified block boundary. In a case where the block boundary is a vertical boundary, the lines correspond to lines orthogonal to the vertical boundary. In a case where the block boundary is a horizontal boundary, the lines correspond to rows orthogonal to the horizontal boundary.

FIG. 1 is a table for explaining calculation of a bS in HEVC. As depicted in FIG. 1, in HEVC, a bS is calculated on the basis of whether a condition A which is a condition regarding intra prediction, a condition B1 which is a condition regarding a significant coefficient of a Y component, and a condition B2 which is a condition regarding a motion vector (MV) and a reference picture, are true or false (are satisfied or not). According to FIG. 1, in a case where the condition A is true, the bS is set to 2. Further, in a case where the condition A is false while at least either one of the condition B1 or the condition B2 is true, the bS is set to 1. Moreover, in a case where the condition A, the condition B1, and the condition B2 are all false, the bS is set to 0. It is to be noted that the condition A, the condition B1, and the condition B2 depicted in FIG. 1 are as follows.

Condition A: Regarding CUs (Coding Units) that include pixels in the uppermost line among lines which are bS calculation targets and that have a block boundary disposed therebetween, an encoding mode in at least either one of the CUs is an intra prediction mode Condition B1: Regarding two TUs the TU boundary between which is the block boundary, which include the uppermost line among the lines that are bS calculation targets, and which have the block boundary disposed therebetween, a significant coefficient of a Y component is present in at least either one of the TUs.

Condition B2: Between two CUs which include pixels in the uppermost line among the lines that are bS calculation targets and which have the block boundary disposed therebetween, the absolute value of the MV difference is one pixel or greater, or the CUs are difference in reference pictures for motion compensation or are different in the number of MVs.

Furthermore, in HEVC, a deblocking filter for a luminance component (Y component) in a decoded image is applicable to a block boundary having a bS of 1 or greater which is set in the aforementioned manner. Therefore, in HEVC, the determination result of the necessity/unnecessity determination of application of a deblocking filter to a luminance component in a decoded image can vary according to whether or not the condition B1 and the condition B2 are satisfied.

It is to be noted that, in HEVC, a strong filter having a high filter strength and a weak filter having a low filter strength are prepared as deblocking filters for a luminance component in a decoded image. In a case where a bS is 1 or greater, processing concerning a deblocking filter for a luminance component in a decoded image is performed such that an additional application necessity/unnecessity determination process based on an additional condition is followed by a filter strength determination process and a filtering process. An explanation of these processes, which are described in the reference document REF2 in detail, is omitted here.

Meanwhile, a deblocking filter for color-difference components (U component and V component) in a decoded image is applied only to a block boundary having a bS of 2 in HEVC. Therefore, as depicted in FIG. 1, whether or not the condition B1 and the condition B2 are satisfied does not affect the determination on the necessity/unnecessity of application of a deblocking filter to a color-difference component in a decoded image in HEVC.

In addition, in HEVC, only a weak filter can be used as a deblocking filter applicable to a color-difference component in a decoded image. Therefore, the filter strength determination process is not necessary for a color-difference component in a decoded image. In a case where the bS is 2, a weak filter is applied to a color-difference component in a decoded image.

Meanwhile, as described in the reference document REF3, blocks of a much larger size can be selected by block division based on a QTBT Block Structure in VVC, compared to block division based on a Quad-Tree Block Structure in HEVC. In a case where the size of a block is large in a flat region (a region in which variation of pixel values is small), a block distortion is likely to be generated. Therefore, in VVC in which blocks of much larger size can be selected, in a case where only a weak filter is used as a deblocking filter applicable to a color-difference component in a decoded image, as in HEVC, there is a possibility that a prominent block distortion remains in the color-difference component. In view of such a circumstance, an improvement has been demanded for a deblocking filter for a color-difference component in a decoded image.

For example, NPL 1 proposes a method in which, like deblocking filters applicable to a luminance component, the number of types of deblocking filters applicable to color-difference components is changed to two so that a strong filter can be applied also to a color-difference component. Further, NPL 1 indicates that not only in a case where the bS is 2 but also in a case where the bS is 1, the deblocking filter can be applied to a color-difference component in a decoded image.

FIG. 2 is a table for explaining calculation of a bS in NPL 1. As depicted in FIG. 2, a bS is calculated on the basis of the aforementioned condition A, condition B1, and condition B2 in NPL 1, as in the example of HEVC depicted in FIG. 2. However, as previously explained, not only in a case where the bS is 2 but also in a case where the bS is 1, a deblocking filter can be applied to color-difference components in a decoded image in NPL 1. Therefore, as depicted in FIG. 2, the determination result of the necessity/unnecessity of application of a deblocking filter to color-difference components (U component and V component) in a decoded image can vary in NPL 1, according to whether or not the condition B1 and the condition B2 are satisfied.

Hereinafter, with reference to FIG. 3, an explanation will be given of the application necessity/unnecessity determination process, the filter strength determination process, and the filtering process concerning a deblocking filter that is applicable to color-difference components in a decoded image in NPL 1. FIG. 3 is an explanatory diagram depicting one example of pixels of color-difference components (U component and V component) in two blocks, that is, a block Bp and a block Bq that are adjacent to each other with a vertical block boundary BB disposed therebetween. Here, the vertical boundary is used as an example, but this explanation can also be applied to a horizontal boundary, as a matter of course. Further, in the example depicted in FIG. 3, the block Bp and the block Bq each include 4×4 color-difference components, but this explanation can also be applied to blocks of any other sizes.

In the example in FIG. 3, pixels of color-difference components in the block Bp are denoted by signs $p_{i,j}$, in which i represents a row index while j represents a line index. The row indexes i are numbered 0, 1, 2, and 3 in the order from the row closest to the block boundary BB (from the left side to the right side in FIG. 3). The line indexes j are numbered 0, 1, 2, and 3 in the order from the upper side toward the lower side. Pixels of color-difference components in the block Bq are denoted by signs $q_{k,j}$, in which k represents a row index while j represents a line index. The row indexes k are numbered 0, 1, 2, and 3 in the order from the row closest to the block boundary BB (from the right side to the left side in FIG. 3).

After the bS is calculated in the manner explained with reference to FIG. 2, the application necessity/unnecessity determination process and the filter strength determination process are performed by using the three conditions as follows. In the YUV420 format, these processes are performed for every 2 lines of color-difference components. For example, in the example depicted in FIG. 3, a determination as to a line L11 and a line L12 and a determination as to a line L21 and a line L22 are separately made. It is to be noted that pixels in a determination target line are used to make a line-based determination. Hereinafter, an explanation of the application necessity/unnecessity determination process, the filter strength determination process, and the filtering process will be given with use of the line L11 and the line L12 by way of example.

First, in the application necessity/unnecessity determination process, whether or not the following condition C91 is true and whether or not the following condition C92 is true are sequentially determined.

Condition C91: (bS==2||bS==1&&(block_width>16&&block_height>16))

Condition C92: d<beta

It is to be noted that, in the condition C91 described above, block_width and block_height respectively represent the horizontal size and the vertical size of each block (e.g., CU) related to a block boundary to be determined, as depicted in FIG. 3.

In addition, in the condition C92, the variable beta is an edge determination threshold. The initial value of the variable beta is given according to a quantization parameter. Further, the value of the variable beta can be designated by a parameter in a slice header given by a user. Moreover, in the condition C92, the variable d is calculated by the following expressions (1) to (7).

$$dp0 = \text{Abs}(p_{2,0} - 2*p_{1,0} + p_{0,0}) \quad (1)$$

$$dp1 = \text{Abs}(p_{2,1} - 2*p_{1,1} + p_{1,1}) \quad (2)$$

$$dq0 = \text{Abs}(q_{2,0} - 2*q_{1,0} + q_{0,0}) \quad (3)$$

$$dq1 = \text{Abs}(q_{2,1} - 2*q_{1,1} + q_{0,1}) \quad (4)$$

$$dpq0 = dp0 + dq0 \quad (5)$$

$$dpq1 = dp1 + dq1 \quad (6)$$

$$d = dpq0 + dpq1 \quad (7)$$

Except for the difference in lines to be referred to, the condition C92 is similar to a condition (hereinafter, referred to as a condition for a luminance component) that is used in the application necessity/unnecessity determination process of a deblocking filter to be applied to a luminance component in HEVC. In the condition for a luminance component, pixels in the first line and pixels in the fourth lines are referred to, and a determination is made for every 4 lines. On the other hand, in the YUV420 format, the pixel density of color-difference components (U component and V component) is half as high as that of luminance components. Therefore, in the condition C92, the pixels in the line L11 which is the first line and the pixels in the line L12 which is the second line are referred to, and a determination is made for every 2 lines.

In a case where at least either one of the condition C91 or the condition C92 is false, a deblocking filter is not applied to color-difference components in a decoded image. On the other hand, in a case whether both the condition C91 and the condition C92 are true, the process proceeds to the filter strength determination process.

In the filter strength determination process, whether or not the following condition C93 is true is determined in order to determine whether a strong filter is applied or a weak filter is applied.

Condition C93: (block_width>16&&block_height>16)

It is to be noted that, similar to block_width and block_height in the condition C91, block_width and block_height in the condition C93 respectively represent the horizontal size and the vertical size of each block related to the block boundary to be determined.

In a case where the condition C93 is true, a strong filter is applied, on the target block boundary, to color-difference components in a decoded image. In a case where the condition C93 is false, a weak filter is applied, on the the target block boundary, to color-difference components in a decoded image.

In NPL 1, a strong filter which is applied to a color-difference component is similar to a strong filter which is applied to a luminance component in HEVC. The strong filter is expressed by the following expressions (8) to (13).

$$p_0'=\text{Clip3}(p_0-2*tc, p_0+2*t_c, (p_2+2*p_1+2*p_0+2*q_0+q_1+4)>>3) \quad (8)$$

$$p_1'=\text{Clip3}(p_1-2*tc, p_1+2*t_c, (p_2+p_1+p_0+q_0+2)>>2) \quad (9)$$

$$p_2'=\text{Clip3}(p_2-2*tc, p_2+2*t_c, (2*p_3+3*p_2+p_1+p_0+q_0+4)>>3) \quad (10)$$

$$q_0'=\text{Clip3}(q_0-2*tc, q_0+2*t_c, (p_1+2p_0+2q_0+2q_1+q_2+4)>>3) \quad (11)$$

$$(q_1'=\text{Clip3}(q_1-2*tc, q_1+2*t_c, (p_0+q_0+q_1+q_2+2)>>2) \quad (12)$$

$$q_2'=\text{Clip3}(q_2-2*t_C, q_2+2*t_c, (p_0+q_0+q_1+3*q_2+2*q_3+4)>>3) \quad (13)$$

In the expressions (8) to (13), $p_i$ and $q_k$ each represent a pixel value of a color-difference component having not undergone application of a deblocking filter, and $p_i'$ and $q_k'$ each represent a pixel value of a color-difference component having not undergone application of a deblocking filter. Here, i and k each represent row indexes in the aforementioned block Bp and block Bq, respectively. The line indexes are omitted in the expressions (8) to (13). Further, $t_C$ represents a parameter which is given according to a quantization parameter. Clip3(a,b,c) indicates a clipping process of clipping the value c within the range of a≤c≤b.

Since a weak filter which is applied to a color-difference component in NPL 1 is identical to a weak filter which is applied to a color-difference component in HEVC, an explanation of this weak filter is omitted here.

The processes concerning a deblocking filter that is applicable to a color-difference component in a decoded image in NPL 1 have been explained so far. With the aforementioned method, a strong filter can be applied not only to a luminance component but also to a color-difference component, according to the conditions.

However, as previously explained with reference to FIG. 2, the condition 1 which is used to calculate a bS in NPL 1 depends on the presence/absence of a significant coefficient of a luminance component (Y component), as in HEVC. Even in the other conditions, information regarding the color-difference components (U component and V component) is not used. However, the space pattern of a luminance component does not necessarily match the space pattern of each color-difference component. Therefore, if the necessity/unnecessity of application of a deblocking filter to a color-difference component is determined according to a condition based on information regarding a luminance component, a deblocking filter is not appropriately applied, irrespective of occurrence of a block distortion. This may leave the block distortion.

Further, in order to make the condition C91, which is used for the application necessity/unnecessity determination process, true in a case where the bS is 1 in NPL 1, the horizontal size and the vertical size of each block related to the block boundary to be determined, need to be each greater than 16. However, as described in the reference document REF3, the shape of a block (e.g., CU) in VVC is not limited to a square shape, and can be a non square rectangle. Further, a block distortion is likely to be generated depending on not the size in a direction the same as the direction of the block boundary, but the size in a direction orthogonal to the block boundary. For this reason, with a certain block shape, a deblocking filter is not appropriately applied during the application necessity/unnecessity determination process in NPL 1 so that there is a possibility that a block distortion is left.

In addition, a strong filter in NPL 1 is similar to a strong filter which is applied in HEVC. On the other hand, as previously explained, blocks of a large size can be selected in VVC, compared to divided blocks in HEVC. Thus, even if the strong filter of NPL 1 is applied, there is a possibility that a block distortion is not sufficiently lessened.

[1-2. Outline of One Embodiment According to Present Disclosure]

To this end, in view of the aforementioned circumstance, one embodiment of the present disclosure has been made. An image processing device according to one embodiment of the present disclosure performs an application necessity/unnecessity determination process of determining the necessity/unnecessity of application of a deblocking filter to a color-difference component in a decoded image on the basis of a boundary strength (bS) that is calculated with use of a color difference-related parameter which is related to a color difference in the decoded image. Hereinafter, the outline of one embodiment of the present disclosure will be explained.

FIG. 4 is a table for explaining calculation of a bS according to the present embodiment. As depicted in FIG. 4, the calculation is based on a condition A which is a condition concerning intra prediction, a condition B1-Y which is a condition concerning the presence/absence of a significant coefficient of a Y component, a condition B1-U which is a condition concerning the presence/absence of a significant coefficient of a U component, a condition B1-V which is a condition concerning the presence/absence of a significant coefficient of a V component, and a condition B2 which is a condition concerning an MV and a reference picture.

With reference to FIG. 4, in a case where the condition A is true, the bS is set to 16. Also, in a case where the condition A is false while the condition B2 is true, the bS is set to 1. In a case where the condition A and the condition B2 are false while any one of the condition B1-Y, the condition B1-U, or the condition B1-V is true, the bS is set to a value between 2 to 14. Further, in a case where the condition A, the condition B1-Y, the condition B1-U, the condition B1-V, and the condition B2 are all false, the bS is set to 0. It is to be noted that the condition A, the condition B1-Y, and the condition B2 in FIG. 4 are identical to the condition A, the condition B1, and the condition B2 which have been explained with reference to FIG. 1, respectively. In addition, the bS calculation method according to the present embodiment will be explained in detail later.

In addition, the condition B1-U and the condition B1-V depicted in FIG. 4 correspond to conditions respectively using, in order to make the determination, the presence/absence of a significant coefficient of a U component and the presence/absence of a significant coefficient of a V component, instead of the presence/absence of a significant coefficient of a Y component in the condition B1-Y. The condition B1-U and the condition B1-V are expressed as follows. It is to be noted that whether the condition B1-U is true or false and whether the condition B1-V is true or false can be determined on the basis of a flag (one example of the color difference-related parameter) indicating the presence/absence of a significant coefficient of a color-difference component in each TU.

Condition B1-U: The block boundary is a TU boundary, and, regarding two TUs that each include pixels of the uppermost line among lines that are bS calculation targets and that have the block boundary disposed therebetween, a significant coefficient of a U component is present in at least either one of the TUs.

Condition B1-V: The block boundary is a TU boundary, and, regarding two TUs that each include pixels of the uppermost line among lines that are bS calculation targets and that have the block boundary disposed therebetween, a significant coefficient of a V component is present in at least either one of the TUs.

In the present embodiment, the necessity/unnecessity of application of a deblocking filter to a color-difference component in a decoded image is determined on the basis of a bS calculated with use of the aforementioned color difference-related condition B1-U and condition B1-V. With this configuration, a deblocking filter can be appropriately applied to a color-difference component.

Also, in the present embodiment, the necessity/unnecessity of application of a deblocking filter to a color-difference component in a decoded image is determined further on the basis of the size in a direction orthogonal to the block boundary, as explained later. With this configuration, a deblocking filter can be more appropriately applied even in a case where the shape of each block is a non square rectangle.

In addition, in the present embodiment, a strong filter that has a higher strength than the strong filter of NPL 1 (having strong low-pass characteristics) can be applied to a color-difference component in a decoded image, as explained later. Moreover, in the present embodiment, in order to more appropriately apply such a strong filter, the filter strength is determined by a method different from that in the filter strength determination process of NPL 1. With this configuration, a block distortion can be further lessened.

The outline of the one embodiment according to the present disclosure has been explained so far. Hereinafter, configurations and operations according to the present embodiment for implementing the aforementioned effects will be sequentially explained in detail.

2. SCHEMATIC CONFIGURATION OF DEVICE

First, a schematic configuration of a device as one example to which the technology disclosed in the present description is applicable will be explained with use of FIGS. 5 and 6. The technology disclosed in the present description is applicable to an image encoding device and an image decoding device, for example.

[2-1. Image Encoding Device]

Figure 5:
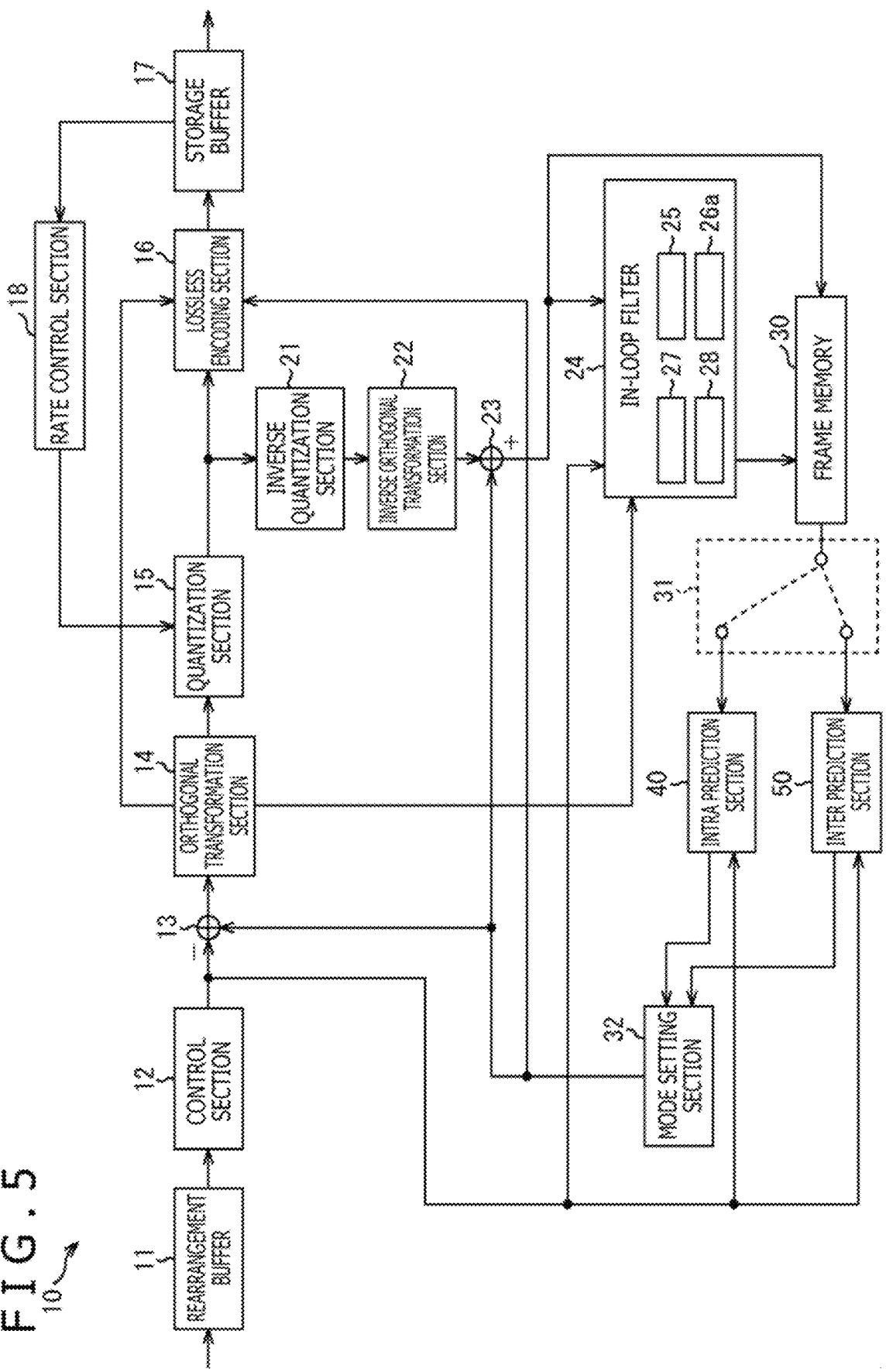
FIG. 5 is a block diagram depicting one configuration example of an image encoding device 10 which is one aspect of an image processing device according to the embodiment.
Figure 6:
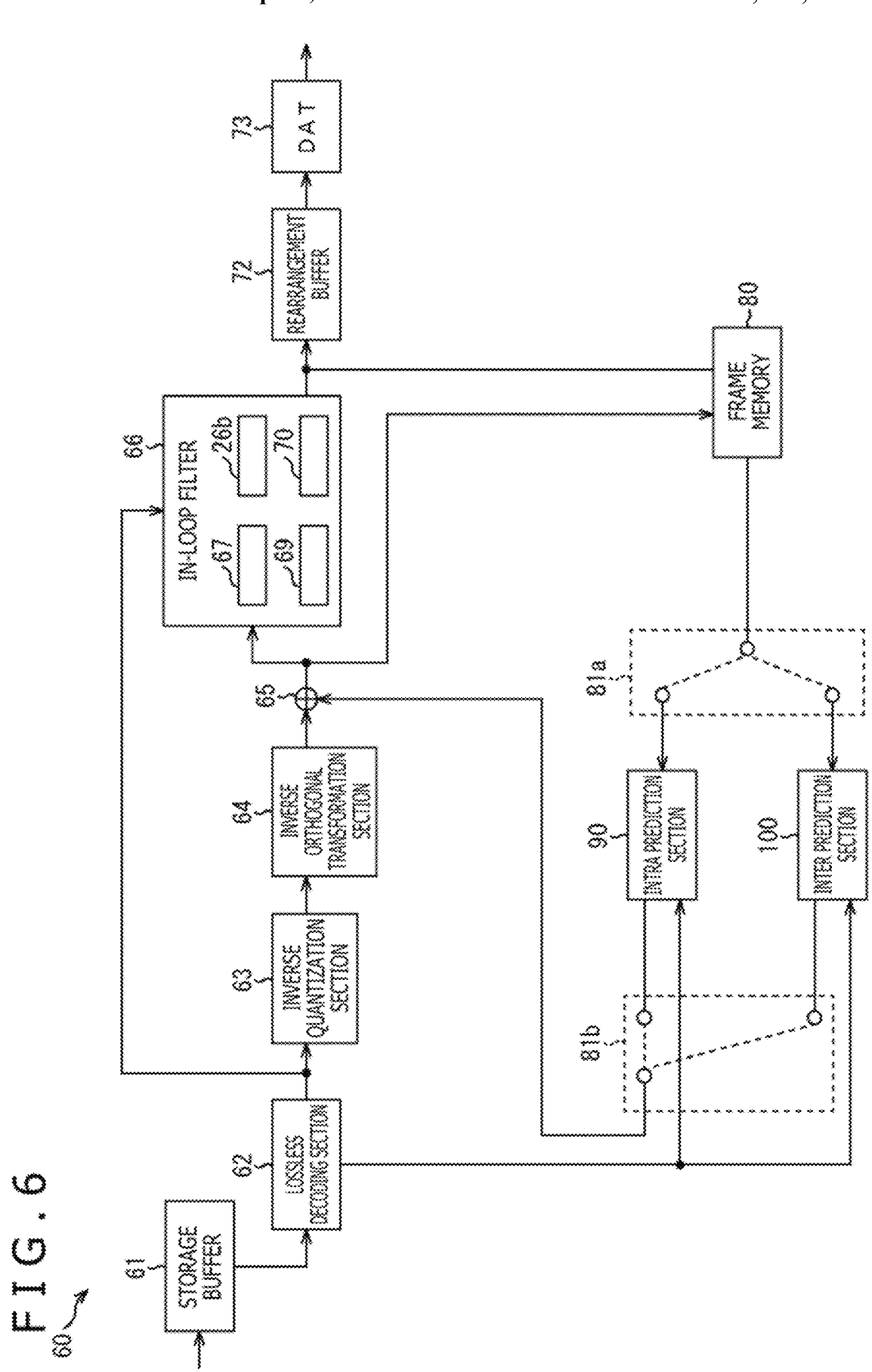
FIG. 6 is a block diagram depicting one configuration example of an image decoding device 60 which is one aspect of an image processing device according to the embodiment.

FIG. 5 is a block diagram depicting one configuration example of an image encoding device 10 which is one aspect of an image processing device according to one embodiment of the present disclosure.

According to FIG. 5, the image encoding device 10 includes a rearrangement buffer 11, a control section 12, a subtraction section 13, an orthogonal transformation section 14, a quantization section 15, a lossless encoding section 16, a storage buffer 17, an inverse quantization section 21, an inverse orthogonal transformation section 22, an addition section 23, an in-loop filter 24, a frame memory 30, a switch 31, a mode setting section 32, an intra prediction section 40, and an inter prediction section 50.

According to a GOP (Group of Pictures) structure regarding encoding processing, the rearrangement buffer 11 rearranges a series of images (original images) to be encoded. The rearrangement buffer 11 outputs the rearranged images to the control section 12, the subtraction section 13, the intra prediction section 40, and the inter prediction section 50.

The control section 12 divides the images into process unit blocks on the basis of the outside or predesignated process unit block size. By division into blocks by the control section 12, CUs of a Quad-Tree Block Structure or a QTBT (Quad Tree Plus Binary Tree) Block Structure may be formed as process units. In addition, the control section 12 decides parameters for the encoding processes on the basis of RDO (Rate-Distortion Optimization), for example. The decided parameters are supplied to the sections.

The subtraction section 13 calculates a prediction error indicating the difference between an image inputted from the rearrangement buffer 11 and a predicted image, and outputs the calculated prediction error to the orthogonal transformation section 14.

The orthogonal transformation section 14 executes an orthogonal transformation process on each of one or more transformation blocks (TU) which are set in each region. The orthogonal transformation may be discrete cosine transform or discrete sine transform, for example. More specifically, the orthogonal transformation section 14 transforms, for each of the transformation blocks, the prediction error inputted from the subtraction section 13 from an image signal of a space region into a transformation coefficient of a frequency region. Then, the orthogonal transformation section 14 outputs the transformation coefficient to the quantization section 15.

Further, the orthogonal transformation section 14 may generate, on the basis of the transformation coefficient obtained by the orthogonal transformation, flags each indicating the presence/absence of significant coefficients for the respective components (Y component, U component, and V component) in each of the TUs, and may output the flags to the lossless encoding section 16 and the in-loop filter 24. It is to be noted that the flag generated by the orthogonal transformation section 14 so as to indicate the presence/absence of a significant coefficient of a U component in each of the TUs, and the flag generated by the orthogonal transformation section 14 so as to indicate the presence/absence of a significant coefficient of a V component in each of the TUs are included in the color difference-related parameters.

The transformation coefficient inputted from the orthogonal transformation section 14 and a rate control signal from a rate control section 18 (explained later) are supplied to the quantization section 15. The quantization section 15 quantizes the transformation coefficient and outputs the quantized transformation coefficient (hereinafter, also referred to as quantization data) to the lossless encoding section 16 and the inverse quantization section 21. Further, by switching a quantization scale on the basis of the rate control signal from the rate control section 18, the quantization section 15 changes the bit rate of the quantization data to be inputted to the lossless encoding section 16.

The lossless encoding section 16 generates an encoded stream by encoding the quantization data inputted from the quantization section 15. Further, the lossless encoding section 16 encodes various parameters to be referred to by a decoder, and inserts the encoded parameters into the encoded stream. Parameters to be encoded by the lossless encoding section 16 can include the aforementioned parameter decided by the control section 12.

Also, parameters to be encoded by the lossless encoding section 16 can include color difference-related parameters. Color difference-related parameters to be encoded by the lossless encoding section 16 include the flag indicating the presence/absence of a significant coefficient of a U component in each of the TUs and the flag indicating the presence/absence of a significant coefficient of a V component in each of the TUs, which are inputted from the orthogonal transformation section 14, as previously explained. The lossless encoding section 16 outputs the generated encoded stream to the storage buffer 17.

By using a storage medium such as a semiconductor memory, the storage buffer 17 temporarily stores the encoded stream inputted from the lossless encoding section 16. Then, the storage buffer 17 outputs the stored encoded stream to a transmission section (e.g., a communication interface, or a connection interface to a peripheral device), not illustrated, at a rate corresponding to the band of a transmission path.

The rate control section 18 monitors the free capacity of the storage buffer 17. Further, the rate control section 18 generates a rate control signal depending on the free capacity of the storage buffer 17, and outputs the generated rate control signal to the quantization section 15. For example, when the free capacity of the storage buffer 17 is small, the rate control section 18 generates a rate control signal for lowering the bit rate of the quantization data. For example, when the free capacity of the storage buffer 17 is sufficiently large, the rate control section 18 generates a rate control signal for increasing the bit rate of the quantization data.

The inverse quantization section 21, the inverse orthogonal transformation section 22, and the addition section 23 constitute a local decoder. The local decoder has a role for local-decoding encoded data into a decoded image.

The inverse quantization section 21 restores the transformation coefficient by inversely quantizing the quantization data by using a quantization parameter the same as the parameter used by the quantization section 15. Then, the inverse quantization section 21 outputs the restored transformation coefficient to the inverse orthogonal transformation section 22.

The inverse orthogonal transformation section 22 restores the prediction error by executing an inverse orthogonal transformation process on the transformation coefficient inputted from the inverse quantization section 21. Then, the inverse orthogonal transformation section 22 outputs the restored prediction error to the addition section 23.

The addition section 23 generates a decoded image (reconstructed image) by adding up the restored prediction error inputted from the inverse orthogonal transformation section 22 and a predicted image inputted from the intra prediction section 40 or the inter prediction section 50. Then, the addition section 23 outputs the generated decoded image to the in-loop filter 24 and the frame memory 30.

In order to improve the image quality of the decoded image, the in-loop filter 24 applies a series of in-loop filtering. For example, as described in "2.5. In-loop filtering" in the reference document REF3, four in-loop filters, that is, a bilateral filter, a deblocking filter, an adaptive offset filter, and an adaptive loop filter may be applied in this order. For example, the in-loop filter 24 depicted in FIG. 5 includes a bilateral filter 25, a deblocking filter 26*a*, an adaptive offset filter 27, and an adaptive loop filter 28 such that these four in-loop filters can be sequentially applied. However, the in-loop filter 24 is not limited to this configuration. Which one of the four in-loop filters is applied, and the order of applying the in-loop filters can be selected, as appropriate. It is to be noted that the deblocking filter 26*a* will be explained in detail later.

The in-loop filter 24 outputs the decoded image to which the in-loop filter has been applied, to the frame memory 30.

By using a storage medium, the frame memory 30 stores an unfiltered decoded image inputted from the addition section 23 and the decoded image which has undergone application of the in-loop filters and been inputted from the in-loop filter 24.

The switch 31 reads out, from the frame memory 30, the unfiltered decoded image for use in intra prediction, and supplies, as a reference image, the read decoded image to the intra prediction section 40. Further, the switch 31 reads out, from the frame memory 30, the filtered decoded image for use in inter prediction, and supplies, as a reference image, the read decoded image to the inter prediction section 50.

The mode setting section 32 sets a prediction encoding mode for each block on the basis of comparison between a cost inputted from the intra prediction section 40 and a cost inputted from the inter prediction section 50. For a block for which an intra prediction mode has been set, the mode setting section 32 outputs a predicted image that is generated by the intra prediction section 40 to the subtraction section 13 and the addition section 23, and outputs information regarding intra predication to the lossless encoding section 16. For a block for which an inter prediction mode has been set, the mode setting section 32 outputs a predicted image that is generated by the inter prediction section 50 to the subtraction section 13 and the addition section 23, and outputs information regarding inter prediction to the lossless encoding section 16.

The intra prediction section 40 executes an intra prediction process on the basis of the original image and the decoded image. For example, for each of prediction mode candidates included in a search range, the intra prediction section 40 evaluates a cost based on a prediction error and a generated code amount. Next, the intra prediction section 40 selects, as an optimum prediction mode, a prediction mode in which the cost is minimum. In addition, the intra prediction section 40 generates a predicted image according to the selected optimum prediction mode. Then, the intra prediction section 40 outputs intra prediction-related information including prediction mode information indicating the optimum prediction mode, the corresponding cost, and the predicted image to the mode setting section 32.

The inter prediction section 50 executes an inter prediction process (motion compensation) on the basis of an original image and a decoded image. For example, for each of prediction mode candidates included in a certain search range, the inter prediction section 50 evaluates a cost based on a prediction error and a generated code amount. Next, the inter prediction section 50 selects, as an optimum prediction mode, a prediction mode in which the cost becomes minimum, that is, a prediction mode in which the compression rate becomes maximum. In addition, the inter prediction section 50 generates a predicted image according to the selected optimum prediction mode. Then, the inter prediction section 50 outputs inter prediction-related information, the corresponding cost, and the predicted image to the mode setting section 32.

[2-2. Image Decoding Device]

Next, decoding of data that is obtained by the aforementioned encoding will be explained. FIG. 6 is a block diagram depicting one configuration example of an image decoding device 60 which is one aspect of an image processing device according to the present embodiment. With reference to FIG. 6, the image decoding device 60 includes a storage buffer 61, a lossless decoding section 62, an inverse quantization section 63, an inverse orthogonal transformation section 64, an addition section 65, an in-loop filter 66, a rearrangement buffer 72, a D/A (Digital to Analogue) conversion section 73, a frame memory 80, selectors 81*a* and 81*b*, an intra prediction section 90, and an inter prediction section 100.

By using a storage medium, the storage buffer 61 temporarily stores an encoded stream received from the image encoding device 10 via a transmission section (e.g., a communication interface or a connection interface to a peripheral device), not illustrated.

The lossless decoding section 62 generates quantization data by decoding the encoded stream inputted from the storage buffer 61 according to the encoding scheme used during encoding. The lossless decoding section 62 outputs the generated quantization data to the inverse quantization section 63.

Further, the lossless decoding section 62 parses various kinds of parameters from the encoded stream. Parameters to be parsed by the lossless decoding section 62 can include information regarding the intra prediction and information regarding the inter prediction, for example. The lossless decoding section 62 outputs the information regarding the intra prediction to the intra prediction section 90. Further, the lossless decoding section 62 outputs the information regarding the inter prediction to the inter prediction section 100.

In addition, parameters to be parsed by the lossless decoding section 62 can include color difference-related parameters. The lossless decoding section 62 outputs the color difference-related parameters to the in-loop filter 66. It is to be noted that the color difference-related parameters to be parsed by the lossless decoding section 62 include the aforementioned flag indicating the presence/absence of a significant coefficient of a U component in each of the TUs and the aforementioned flag indicating the presence/absence of a significant coefficient of a V component in each of the TUs, for example.

The inverse quantization section 63 restores the transformation coefficient by inversely quantizing the quantization data inputted from the lossless decoding section 62 by using a quantization step the same as the step used during the encoding. The inverse quantization section 63 outputs the restored transformation coefficient to the inverse orthogonal transformation section 64.

The inverse orthogonal transformation section 64 generates a prediction error by performing inverse orthogonal transformation of the transformation coefficient inputted from the inverse quantization section 63 according to the orthogonal transformation scheme used during the encoding.

The inverse orthogonal transformation section 64 outputs the generated prediction error to the addition section 65.

The addition section 65 generates a decoded image by adding up the prediction error inputted from the inverse orthogonal transformation section 64 and a predicted image inputted from a selector 71*b*. Then, the addition section 65 outputs the generated decoded image to the in-loop filter 66 and the frame memory 80.

In order to improve the image quality of the decoded image, the in-loop filter 66 applies a series of in-loop filters. For example, as described in "2.5. In-loop filtering" of the reference document REF3, four in-loop filters, that is, a bilateral filter, a deblocking filter, an adaptive offset filter, and an adaptive loop filter may be applied in this order. For example, the in-loop filter 66 depicted in FIG. 6 includes a bilateral filter 67, a deblocking filter 26*b*, an adaptive offset filter 69, and an adaptive loop filter 70 such that these four in-loop filters can be sequentially applied. However, the in-loop filter 66 is not limited to this configuration. Which one of the four in-loop filters is applied, and the order of applying the in-loop filters can be selected, as appropriate. It is to be noted that the deblocking filter 26*b* will be explained in detail later.

The in-loop filter 66 outputs the decoded image to which the in-loop filters have been applied, to the rearrangement buffer 72 and the frame memory 80.

The rearrangement buffer 72 generates a set of time-series images by rearranging images inputted from the in-loop filter 66. Then, the rearrangement buffer 72 outputs the generated images to the D/A conversion section 73.

The D/A conversion section 73 converts the digital images inputted from the rearrangement buffer 72, into analog image signals. Then, the D/A conversion section 73 causes a display (not depicted), which is connected with the image decoding device 60, to display images by outputting the analog image signals to the display, for example.

By using a storage medium, the frame memory 80 stores an unfiltered decoded image inputted from the addition section 65 and a decoded image which has undergone application of the in-loop filters and has been inputted from the in-loop filter 66.

For each block in an image, the selector 81*a* switches an output destination of an image from the frame memory 80 to the intra prediction section 90 or the inter prediction section 100, according to prediction mode information acquired by the lossless decoding section 62. For example, in a case where the intra prediction mode is designated, the selector 81*a* outputs, as a reference image, an unfiltered decoded image supplied form the frame memory 80 to the intra prediction section 90. Further, in a case where the inter prediction mode is designated, the selector 81*a* outputs, as a reference image, a filtered decoded image to the inter prediction section 100.

The selector 81*b* switches an output source of a predicted image to be supplied to the addition section 65, to the intra prediction section 90 or the inter prediction section 100, according to the prediction mode information acquired by the lossless decoding section 62. For example, in a case where the intra prediction mode is designated, the selector 81*b* supplies the predicted image outputted from the intra prediction section 90 to the addition section 65. Further, in a case where the inter prediction mode is designated, the selector 81*b* supplies the predicted image outputted from the inter prediction section 100, to the addition section 65.

The intra prediction section 90 generates a predicted image by performing an intra prediction process on the basis of intra prediction-related information inputted from the lossless decoding section 62 and the reference image from the frame memory 80. Then, the intra prediction section 90 outputs the generated predicted image to the selector 81b.

The inter prediction section 100 generates a predicted image by performing the inter prediction process on the basis of the inter predication-related information inputted from the lossless decoding section 62 and the reference image from the frame memory 80. Then, the inter prediction section 100 outputs the generated predicted image to the selector 81b.

3. DEBLOCKING FILTER

[3-1. Configuration Example of Deblocking Filter]

In the present chapter, one configuration example of the deblocking filter 26a of the image encoding device 10 depicted in FIG. 5 and one configuration example of the deblocking filter 26b of the image decoding device 60 depicted in FIG. 6 will be explained. It is to be noted that the configuration of the deblocking filter 26a may be the same as that of the deblocking filter 26b. Therefore, in the following explanation, the deblocking filter 26a and the deblocking filter 26b are collectively referred to as a deblocking filter 26 unless a distinction is particularly necessary therebetween.

As previously explained, the deblocking filter 26 according to the present embodiment determines the necessity/unnecessity of application of a deblocking filter to a color-difference component in a decoded image on the basis of a bS that is calculated with use of a color difference-related parameter which is related to a color difference. In addition, as previously explained, the deblocking filter 26 according to the present embodiment determines the necessity/unnecessity of application of a deblocking filter to a color-difference component in a decoded image further on the basis of a size in a direction orthogonal to a block boundary. In addition, as previously explained, the deblocking filter 26 according to the present embodiment can apply a strong filter having a higher strength (having strong low-pass characteristics) than the strong filter of NPL 1, to a color-difference component in a decoded image. Moreover, in order to appropriately apply this strong filter in the present embodiment, the filter strength is determined by a method different from that in the filter strength determination process in NPL 1. It is to be noted that, hereinafter, the functions of the deblocking filter 26 regarding a deblocking filter that is mainly applied to a color-difference component in a decoded image will be explained, and the functions of the deblocking filter 26 regarding a deblocking filter that is applied to a luminance component will be omitted, as appropriate.

Figure 7:
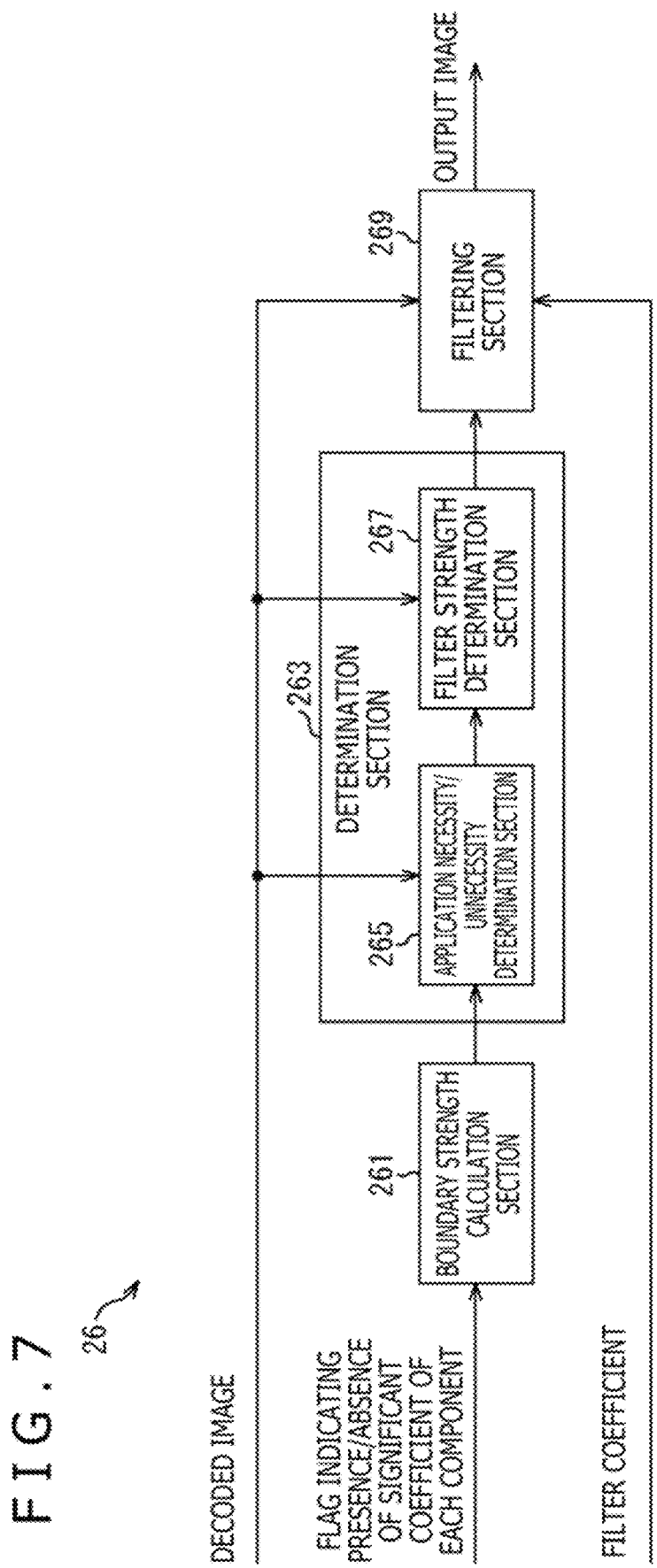
FIG. 7 is a block diagram depicting one detailed configuration example of a deblocking filter 26 according to the embodiment.

FIG. 7 is a block diagram depicting one detailed configuration example of the deblocking filter 26 according to the present embodiment. According to FIG. 7, the deblocking filter 26 includes a boundary strength calculation section 261, a determination section 263, and a filtering section 269.

(1) Boundary Strength Calculation Section

The boundary strength calculation section 261 calculates the bS (boundary strength) of a block boundary in a decoded image by using color difference-related parameters which are related to color differences. In a case where a YUV420 format signal is a target, the boundary strength calculation section 261 calculates the bS for every 4 lines of luminance components in a decoded image, that is, for every 2 lines of color-difference components in a decoded image.

In the present embodiment, the color difference-related parameters which the boundary strength calculation section 261 uses to calculate a bS, include a flag indicating the presence/absence of a significant coefficient of a U component in each of TUs and a flag indicating the presence/absence of a significant coefficient of a V component in each of TUs. As depicted in FIG. 7, flags indicating the presence/absence of significant coefficients of respective components (Y component, U component, and V component) in each of the TUs are inputted from the orthogonal transformation section 14 or the lossless decoding section 62 to the boundary strength calculation section 261.

The boundary strength calculation section 261 calculates a bS on the basis of the condition A, the condition B1-Y, the condition B1-U, the condition B1-V, and the condition B2 which have been explained with reference to FIG. 4. That is, the boundary strength calculation section 261 calculates a bS on the basis of whether or not a significant coefficient of a color-difference component is present in TUs disposed on both sides of a block boundary that is a bS calculation target. Further, the boundary strength calculation section 261 according to the present embodiment can calculate a bS by separately determining whether or not respective significant coefficients of a Y component, a U component, and a V component are present in TUs disposed on both sides of a block boundary that is a bS calculation target. With this configuration, a bS that is suitable to a U component and a V component is calculated, compared to a case in which a bS is calculated on the basis of whether or not a significant coefficient of a Y component is present, as previously explained with reference to FIG. 2. Accordingly, a deblocking filter can be more appropriately applied.

Calculation of a bS at the boundary strength calculation section 261 will be explained in more detail with reference to FIG. 8. FIG. 8 is a table depicting one example of a bS that is calculated by the boundary strength calculation section 261. A bS calculated by the boundary strength calculation section 261 can be expressed by a plurality of bits. In the example depicted in FIG. 8, a bS is expressed by 5 bits. In addition, a bS may be calculated such that the plurality of bits includes at least one bit corresponding to a Y component, at least one bit corresponding to a U component, and at least one bit corresponding to a V component. With this configuration, when determining the necessity/unnecessity of application of a deblocking filter on the basis of a bS (explained later), the determination section 263 refers to the corresponding bits of the bS for each determination target component. Accordingly, the determination can be easily made.

In addition, the boundary strength calculation section 261 may calculate a bS such that the bits included in the bS correspond to whether the respective conditions are true or false. In the example depicted in FIG. 8, a bS is calculated such that a bit corresponding to a condition which is true is set to 1 while a bit corresponding to a condition which is false is set to 0. Further, in the example depicted in FIG. 8, a bS is expressed by 5 bits, the fifth bit of the bS corresponds to the condition A regarding intra prediction, the fourth bit of the bS corresponds to the condition B1-Y regarding a significant coefficient of a Y component, the third bit of the bS corresponds to the condition B1-U regarding a significant coefficient of a U component, the second bit of the bS corresponds to the condition B1-V regarding a significant coefficient of a V component, and the first bit of the bS corresponds to the condition B2 regarding a MV and a reference picture. However, the correspondence between the bits of the bS and the conditions is not limited to the example depicted in FIG. 8. For example, the order of the fourth bit, the third bit, and the second bit of the bS, the bits corresponding to a Y component, a U component, and a V component, respectively, may be changed.

(2) Determination Section

As depicted in FIG. 7, the determination section 263 includes an application necessity/unnecessity determination section 265 that determines the necessity/unnecessity of application of a deblocking filter to a color-difference component in a decoded image, and a filter strength determination section 267 that determines the filter strength of a deblocking filter to be applied to a color-difference component in the decoded image. Hereinafter, the functions of the application necessity/unnecessity determination section 265 and the functions of the filter strength determination section 267 will be sequentially explained.

It is to be noted that a determination on the necessity/unnecessity of application of a deblocking filter to a color-difference component in a decoded image and a determination on a filter strength will be mainly explained below, and an explanation of a determination for a luminance component will be omitted, as appropriate. In addition, the application necessity/unnecessity determination section 265 and the filter strength determination section 267 according to the present embodiment determine the necessity/unnecessity of a deblocking filter and a filter strength, respectively, for each of a U component and a V component separately.

The application necessity/unnecessity determination section 265 determines, for a block boundary of a decoded image, the necessity/unnecessity of application of a deblocking filter to a color-difference component in the decoded image on the basis of a bS (boundary strength) that is calculated in the aforementioned manner by the boundary strength calculation section 261.

Further, the application necessity/unnecessity determination section 265 may determine the necessity/unnecessity of application of a deblocking filter to a color-difference component in the decoded image further on the basis of the block size of blocks disposed on both sides of the block boundary. It is to be noted that, hereinafter, a determination based on such a block size may be referred to as large block determination. In addition, the application necessity/unnecessity determination section 265 does not need to necessarily make a large block determination for all the block boundaries, and may decide whether or not to make a large block determination on the basis of a bS. It is to be noted that a case of making a large block determination and the details of the large block determination will be explained later.

The application necessity/unnecessity determination section 265 according to the present embodiment determines the necessity/unnecessity of application of a deblocking filter, by determining a condition C1 and determining a condition C2 below.

Condition C1: (bS==16||(condition C11 &&condition C12))
Condition C2: d<beta

The condition C11 in the condition C1 is given for determining whether to make a large block determination. The condition C12 is about the large block determination. In a case where a bS is 16, that is, in a case where the condition A regarding intra prediction is satisfied, a large block determination is not needed, and the condition C1 can be determined to be true. Therefore, in a case where the bS has an inter prediction-related value, the condition C11 for determining whether or not to make a large block determination can be true. It is to be noted that, by skipping a large block determination and determining that the condition C1 is true in the case where the bS is 16 as described above, a processing amount for the large block determination can be reduced.

In addition, even in a case where the condition C11 in the condition C1 is false, a determination of the condition C12 (large block determination) is not made, and the condition C1 is determined to be false. With this configuration, a processing amount for the large block determination can be reduced.

The condition C11 may be true in a case where the condition regarding a significant coefficient of each component, or the aforementioned condition B2 is true. That is, the condition C11 may vary according to a determination target component. For example, in a case where a U component is a determination target, a condition C11-U below may be used as the condition C11, and in a case where a V component is a determination target, a condition C11-V below may be used as the condition C11.

Condition C11-U: (bS&0x04||bS&0x01)
Condition C11-V: (bS&0x02||bS&0x01)

Further, the application necessity/unnecessity determination section 265 makes a large block determination on the basis of the size, in a direction orthogonal to the block boundary, of each of blocks disposed on both sides of the block boundary. With this configuration, in a case where the block shape is a non square rectangle, the necessity/unnecessity of application of a deblocking filter can be determined on the basis of the size in the direction orthogonal to the block boundary. The size is likely to affect occurrence of a block distortion.

In addition, the application necessity/unnecessity determination section 265 may make a large block determination on the basis of whether or not the size, in a direction orthogonal to the block boundary, of each of blocks disposed on both sides of the block boundary, is greater than a predetermined threshold. Any limitation is not put on the threshold for use in the large block determination. For example, the threshold may be set to 16. In a case where the size in the direction orthogonal to the block boundary is small, particularly, in a case is the size is not larger than 16, a block noise is hardly noticeable. Therefore, with this configuration, unnecessary application of a deblocking filter can be avoided. For example, the condition C12 regarding a large block determination may be defined as follows.

Condition C12: (EDGE_VER&&block_width>16)||(EDGE_HOR&&block_height>16)

It is to be noted that, in the condition C12, EDGE_VER indicates that a block boundary as a determination target is a vertical boundary, and EDGE_HOR indicates that a block boundary as a determination target is a horizontal boundary.

In addition, since the condition C2 is identical to the aforementioned condition C92, an explanation of the condition C2 is omitted here. It is to be noted that a determination of the condition C2 is made in a case where the condition C1 is true. In a case where the condition C1 is false, non application of a deblocking filter is determined without a determination of the condition C2. The determination of the condition C2 involves the processes for calculating the variable d by the aforementioned expressions (1) to (7) so that the processing amount is larger than that for the determination of the condition C1. Therefore, when the determination of the condition C1 is followed by the determination of the condition C2, the processing amount can be reduced.

Further, the filter strength determination section 267 further determines the filter strength of a deblocking filter to be applied to a color-difference component in a decoded image, after the necessity/unnecessity of application of a deblocking filter is determined on the basis of the condition C1 and the condition C2 in the aforementioned manner. Deblocking filters that are applicable in the present embodiment can be classified into two types, that is, a weak filter having a lower strength and a strong filter having a higher strength, as explained later. The filtering section 269, which will be explained later, applies either a weak filter or a strong filter according to the filter strength determined by the filter strength determination section 267.

In a case where application of a deblocking filter is determined, the filter strength determination section 267 determines the filter strength. Since the determination of the necessity/unnecessity of application of a deblocking filter is followed by the determination of the filter strength, processes involved in the determination of the filter strength can be reduced.

In addition, the filter strength determination section 267 determines the filter strength on the basis of a waveform of color-difference components in pixels around the block boundary. Hereinafter, a determination based on the waveform will be explained. The filter strength determination section 267 determines the filter strength on the basis of the following waveform-based condition C3.

Condition C3: (condition C31&&condition C32&&condition C33)
Condition C31: $|p_3-p_0|+|q_3-q_0|<(\text{beta}>>3)$
Condition C32: $|p_2-2*p_1+p_0|+|q_2-2*q_1+q_0|<(\text{beta}>>2)$
Condition C33: $|p_0-q_0|<((t_c*5+1)>>1)$ For pixels included in two lines among pixels located around a block boundary, the filter strength determination section 267 makes a determination of the condition C3. The condition C31, the condition C32, and the condition C33, which are used in C3, are determined for each line. It is to be noted that $p_i$, $q_k$, $p_i'$, $q_k'$, beta, and $t_c$ in the condition C31, the condition C32, and the condition C33 have been explained above, and thus, an explanation thereof is omitted here.

The condition C31, the condition C32, and the condition C33 are determined with use of pixels included in each line. More specifically, the condition C31 is related to the flatness, in a block, of color-difference components of pixels included in each line. In addition, the condition C32 is related to a determination of the continuity, in a block, of color-difference components of pixels included in each line. Further, the condition C33 is related to a gap (difference), between blocks, of color-difference components of pixels included in each line, and more specifically, is a condition for determining the gap between the blocks by using the values of pixels adjoining the block boundary.

In a case where the condition C31 is true, the flatness of a waveform of color-difference components is high in each block. In addition, in a case where the condition C32 is true, the continuity of a waveform of color-difference components is high in each block. Further, in a case where the condition C32 is true, a waveform of color-difference components has a large gap at the block boundary.

Accordingly, in a case where the condition C31, the condition C32, and the condition C33 are all determined to be true, the condition C3 is determined to be true. Further, the filter strength determination section 267 makes a determination of the condition C3 for each line. However, the filter strength is determined for every 2 lines, as explained above. That is, the filter strength is determined such that, in a case where the condition C3 is true for both two successive lines, a strong filter is applied to the two lines, and, in a case where the condition C3 is false for both two successive lines, a weak filter is applied to the two lines.

(3) Filtering Section

The filtering section 269 applies a deblocking filter to color-difference components of pixels located around a block boundary, on the basis of the determination result on application of a deblocking filter made by the application necessity/unnecessity determination section 265. In addition, as explained above, the filtering section 269 applies, as a deblocking filter, a weak filter or a strong filter according to the filter strength determined by the filter strength determination section 267.

A weak filter which the filtering section 269 according to the present embodiment applies to a color-difference component may be identical to a weak filter that is applied to a color-difference component in a decoded image in NPL 1 or in HEVC described above, for example. However, a strong filter that is applied to a color-difference component in the present embodiment may be different from a strong filter that is applied to a color-difference component in NPL 1 (a strong filter that is applied to a luminance component in HEVC). Hereinafter, an example of a strong filter that is applied to a color-difference component in the present embodiment will be explained.

A coefficient for a strong filter that is applied to a color-difference component in the present embodiment may be 2 at the center position of an application target range of the strong filter, and may be 1 at any other positions. In addition, the filtering section 269 may set the application target range of the strong filter to a range of three pixels on each side from the block boundary, and may set, as reference pixels, three pixels on each side from the center position of the application target range, and may apply the strong filter to color-difference components of the pixels included in the application target range. For example, a strong filter whose application target range has a center position at $p_0$ is expressed by the following expression (14).

$$p_0'=\text{Clip3}(p_0-w*t_cp_0w*t_c,((p_3+p_2+p_1+2*p_0+q_0+q_1+q_2+4)>>3)) \quad (14)$$

In the expression (14), w represents a weight that can be set, as appropriate. For example, w may be set to 1 or 2. Clip3(a,b,c) represents a clipping process of clipping the value c within the range of $a \leq c \leq b$, as described above.

When such a strong filter is applied, a deblocking filter that is stronger than a strong filter that is applied to a color-difference component in NPL 1 can be applied.

In a case where the center position of the application target range of the strong filter is at the second pixel or the third pixel from the block boundary, pixels apart from the block boundary by five or more pixels are included in reference pixels. However, a pixel apart from the block boundary by five or more pixels is not used for a determination on the filter strength, and thus, is not suitable for use as reference pixels in some cases. Therefore, the filtering section 269 may pad the pixel value of the fourth pixel apart from the block boundary, and use the pixel value as the pixel value of a reference pixel, instead of a pixel apart from the block boundary by five or more pixels.

For example, a strong filter whose application target range has a center position set at $p_1$ is expressed by the following expression (15).

$$p'_1 = \text{Clip } 3(p_1 - w^*t_c, p_1 + w^*t_c, \quad (15)$$
$$((p_4 + p_3 + p_2 + 2^*p_1 + p_0 + q_0 + q_1 + 4) >> 3)) =$$
$$\text{Clip } 3(p_1 - w^*t_c, p_1 + w^*t_c,$$
$$((p_3 + p_3 + p_2 + 2^*p_1 + p_0 + q_0 + q_1 + 4) >> 3)) =$$
$$\text{Clip } 3(p_1 - w^*t_c, p_1 + w^*t_c,$$
$$((2^*p_3 + p_2 + 2^*p_1 + p_0 + q_0 + q_1 + 4) >> 3))$$

Similarly, a strong filter whose application target range has a center position set at $p_2$ is expressed by the following expression (16).

$$p'_2 = \text{Clip } 3(p_2 - w^*t_c, p_2 + w^*t_c, \quad (16)$$
$$((p_5 + p_4 + p_3 + 2^*p_2 + p_1 + p_0 + q_1 + 4) >> 3)) =$$
$$\text{Clip } 3(p_2 - w^*t_c, p_1 + w^*t_c,$$
$$((p_3 + p_3 + p_3 + 2^*p_2 + p_1 + p_0 + q_0 + 4) >> 3)) = \text{Clip } 3$$
$$(p_2 - w^*t_c, p_2 + w^*t_c, ((3^*p_3 + 2^*p_2 + p_1 + p_0 + q_0 + 4) >> 3))$$

Further, similarly, strong filters whose application target ranges have respective center positions set at $q_0$ to $q_3$ are expressed by the following expressions (17) to (19), respectively.

$$q_0' = \text{Clip3}(q_0 - w^*t_c, q_0 + w^*t_c, ((p_2 + p_1 + p_0 + 2^*q_0 + q_1 + q_2 + q_3 + 4) >> 3)) \quad (17)$$

$$q_1' = \text{Clip3}(q_1 - w^*t_c, q_1 + w^*t_c, ((p_1 + p_0 + q_0 + 2^*q_1 + q_2 + 2^*q_3 + 4) >> 3)) \quad (18)$$

$$q_2' = \text{Clip3}(q_2 - w^*t_c, ((q_2 + w^*t_c, ((p_0 + q_0 + q_1 + 2^*q_2 + 3^*q_3 + 4) >> 3)) \quad (19)$$

[3-2. Flow of Processes]

Figure 9:
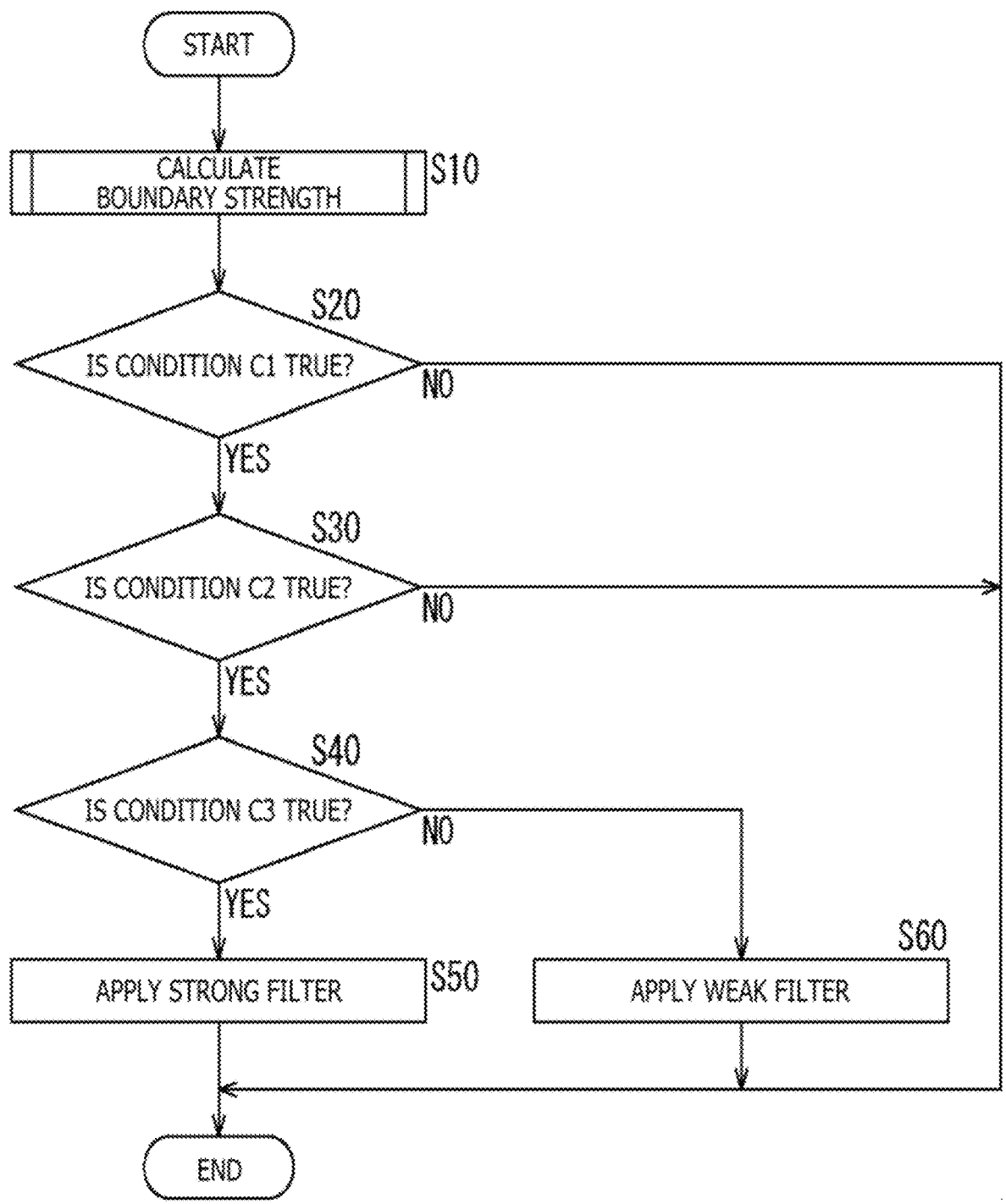
FIG. 9 is a flowchart depicting one example of a process flow that is performed by the deblocking filter 26 according to the embodiment.

The configuration example of the deblocking filter 26 according to the present embodiment has been explained above. Next, the flow of processes which are performed by the deblocking filter 26 according to the present embodiment will be explained. FIG. 9 is a flowchart depicting one example of the flow of processes which are performed by the deblocking filter 26 according to the present embodiment. It is to be noted that, hereinafter, among processes which are executed by the deblocking filter 26, processes related to the features of the present embodiment will be explained while an explanation of the remaining processes will be omitted, as appropriate. [0147]

Figure 10:
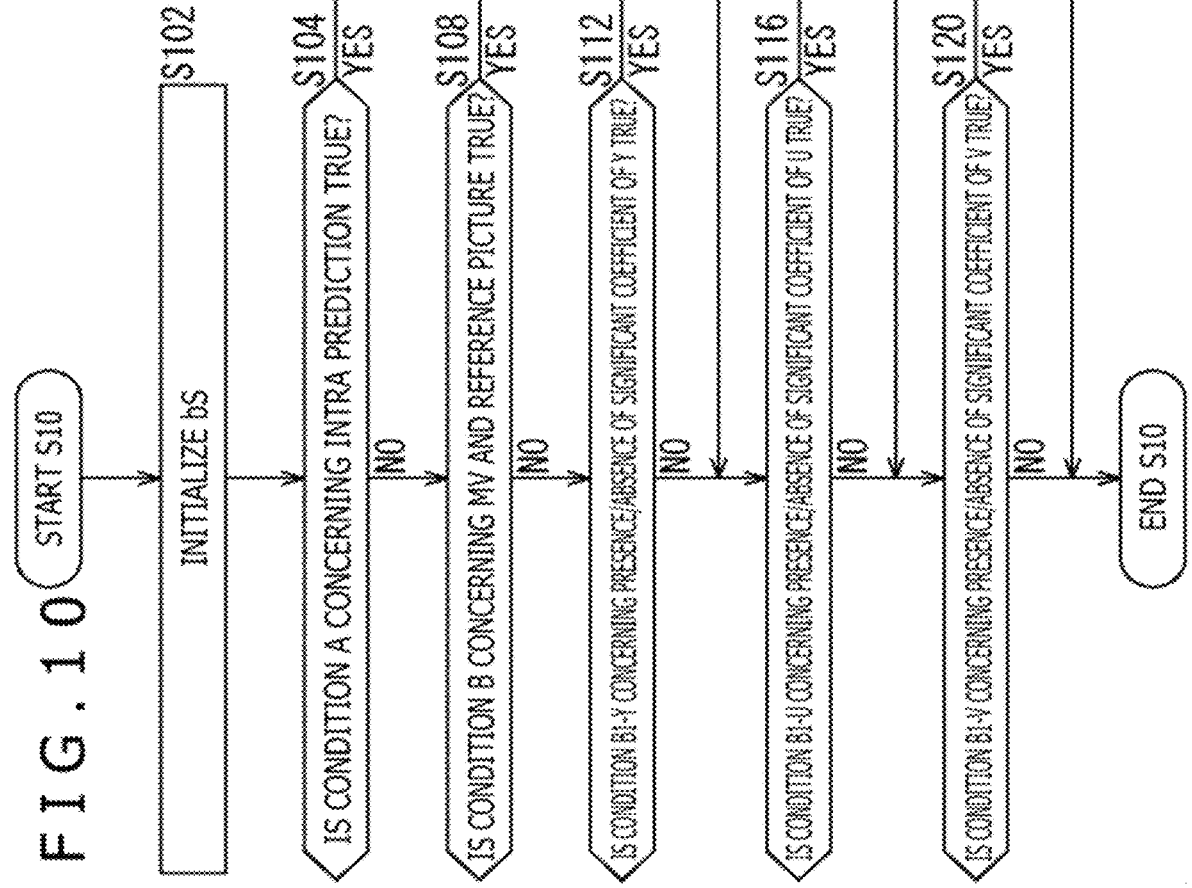
FIG. 10 is a flowchart for explaining the flow of a boundary strength calculation process that is executed by the boundary strength calculation section 261.

First, a bS (boundary strength) is calculated by the boundary strength calculation section 261 (S10). Here, the bS calculation method will be explained in more detail with reference to FIG. 10. FIG. 10 is a flowchart for explaining the flow of the boundary strength calculation process (S10) which is executed by the boundary strength calculation section 261.

First, the boundary strength calculation section 261 initializes a bS to 0 (S102). Next, the boundary strength calculation section 261 determines whether the condition A which is a condition regarding intra prediction is true or false (S104). In a case where the condition A is true (YES at S104), the bS is set to 16 (S106).

On the other hand, in a case where the condition A is false (NO at S104), the boundary strength calculation section 261 determines whether the condition B2 which is a condition regarding a motion vector (MV) and a reference picture is true or false (S108). In a case where the condition B2 is true (YES at S108), the bS is set to 1 (S110).

On the other hand, in a case where the condition B2 is false (NO at S108), the boundary strength calculation section 261 determines the condition B1-Y which is a condition regarding the presence/absence of a significant coefficient of a Y component is true or false (S112). In a case where the condition B1-Y is true (YES at S112), 8 is added to the bS (S114), and then, the process proceeds to step S116. On the other hand, in a case where the condition B1-Y is false (NO at S112), the process directly proceeds to step S116.

At step s116, the boundary strength calculation section 261 determines whether the condition B1-U which is a condition regarding the presence/absence of a significant coefficient of a U component is true or false. In a case where the condition B1-U is true (YES at S116), 4 is added to the bS (S118), and then, the process proceeds to step s120. On the other hand, in a case where the condition B1-U is false (NO at S116), the process directly proceeds to step s120.

At step s120, the boundary strength calculation section 261 determines whether the condition B1-V which is a condition regarding the presence/absence of a significant coefficient of a V component is true or false. In a case where the condition B1-V is true (YES at S120), 2 is added to the bS (S122), and then, the boundary strength calculation process (S10) is ended. In a case where the condition B1-V is false (NO at S120), the boundary strength calculation process (S10) is directly ended.

Referring back to FIG. 9, the explanation of the flow of processes which are performed by the deblocking filter 26 will be continued. At step S20, the application necessity/unnecessity determination section 265 of the determination section 263 determines whether the aforementioned condition C1 is true or false. In a case where the condition C1 is false (NO at S20), the process is ended.

On the other hand, in a case where the condition C1 is true (YES at S20), the application necessity/unnecessity determination section 265 determines whether the aforementioned condition C2 is true or false (S30). In a case where the condition C2 is false (NO at S30), the process is ended.

On the other hand, in a case where the condition C2 is true (YES at S30), the filter strength determination section 267 of the determination section 263 determines the filter strength by determining whether the aforementioned condition C3 is true or false (S40). In a case where the condition C3 is true (YES at S40), the filtering section 269 applies a strong filter to color-difference components of pixels located around the block boundary (S50). On the other hand, in a case where the condition C3 is false (NO at S40), the filtering section 269 applies a weak filter to color-difference components of pixels located around the block boundary (S60).

The flow of processes which are performed by the deblocking filter 26 according to the present embodiment has been explained above. It is to be noted that, in the YUV420 format, for example, the aforementioned processes having been explained with reference to FIGS. 9 and 10 are performed for every 4 lines of luminance components in a decoded image, that is, for every 2 lines of color-difference components in a decoded image.

<New DF>

Hereinafter, a new DF (deblocking filter) will be explained.

It is to be noted that documents related to the present technology include the following documents as conventional technologies, and are incorporated in the present description by reference.

[JVET-L0072 (version 1—date 2018-09-25 00:23:50)]
K. Andersson, Z. Zhang, R. Sjoberg: CE11: Long deblocking filters for luma (CE11.1.1) and for both luma and chroma (CE11.1.9), Joint Video Experts Team (JVET) of ITU-T SG 16 WP 3 and ISO/IEC JTC 1/SC 29/WG 11 12th Meeting, Macao, CN, 3-12 Oct. 2018.

[JVET-L0224 (version 1—date 2018-09-25 01:59:53)]
Anand Meher Kotra, Biao Wang, Semih Esenlik, Han Gao, Zhijie Zhao, Jianle Chen: CE11.1.8: Longer tap Luma deblocking filter, Joint Video Experts Team (JVET) of ITU-T SG 16 WP 3 and ISO/IEC JTC 1/SC 29/WG 11 12th Meeting, Macao, CN, 3-12 Oct. 2018.

[JVET-L0403r1 (version 3—date 2018-10-04 05:13:00)]
Dmytro Rusanovskyy, Marta Karczewicz: CE11: Test on long deblocking filtering from JVET-J0021/JVET-K0334 (CE11.1.4). Joint Video Experts Team (JVET) of ITU-T SG 16 WP 3 and ISO/IEC JTC 1/SC 29/WG 11 12th Meeting, Macao, CN, 3-12 Oct. 2018.

[JVET-L0405r1 (version 2—date 2018-10-03 07:14:31)]
Weijia Zhu, Kiran Misra, Phil Cowan, Andrew Segall: CE11: Deblocking modifications for Large CUs both luma and chroma (Test 11.1.7a and CE11.1.7b). Joint Video Experts Team (JVET) of ITU-T SG 16 WP 3 and ISO/IEC JTC 1/SC 29/WG 11 12th Meeting, Macao, CN, 3-12 Oct. 2018.

[JVET-L0327-v1 (version 1—date 2018-09-25 02:33:13)]
Masaru Ikeda, Teruhiko Suzuki: CE11: Long-tap deblocking filter for luma and chroma (CE11.1.6). Joint Video Experts Team (JVET) of ITU-T SG 16 WP 3 and ISO/IEC JTC 1/SC 29/WG 11 12th Meeting, Macao, CN, 3-12 Oct. 2018.

Further, the scope disclosed in the present description is not limited to the embodiment, and the disclosure in the reference document REF4, which has been publicly known at the time of filing of the present application, is also incorporated in the present description by reference. That is, the disclosure in the reference document REF4 is also used as a ground for determination as to support requirements.

REF4: [JVET-K1002-v2 (version 3—date 2018-10-02 16:37:03)]
Jianle Chen, Yan Ye, Seung Hwan Kim: Algorithm description for Versatile Video Coding and Test Model 2 (VTM 2), Joint Video Experts Team (JVET) of ITU-T SG 16 WP 3 and ISO/IEC JTC 1/SC 29/WG 11 11th Meeting, Ljubljana, SI, 10-18 Jul. 2018.

A block size for encoding in VVC is large (eight times larger than in AVC, two times larger than in HEVC), so that deterioration of a block boundary becomes remarkable.

In a case where strong noise is generated in a large block which has a large block size, a DF (deblocking filter) in HEVC does not always completely eliminate the block noise.

In addition, in VVC, different block divisions can be selected for a luminance component and for color-difference components, in an intra case. Therefore, a block size can be optimized individually for a luminance component and color-difference components. It is known that, when large blocks are adopted for color-difference components and small blocks of a small block size are adopted for luminance components, the encoding efficiency is improved. Thus, the importance of a DF for large blocks of color-difference components is increasing.

In large blocks, block noise (block distortion) is likely to become large. In order to appropriately eliminate large block noise, a DF that has a high filter strength, that is, that makes an image more blurred, has been demanded.

A filter that makes an image more blurred is a long tap filter (the number of taps is great). Therefore, in order to appropriately eliminate large block noise, a long tap filter needs to be adopted as a DF to be applied to a luminance component and a color-difference component.

In a case where a long tap filter is adopted as the DF, a line buffer needs to be prepared for pixels required in a filtering process at a block boundary, that is, a horizontal boundary if the DF is applied in a raster scan order, for example. For example, in a case where 8 pixels arranged in the vertical direction orthogonal to a horizontal boundary are used for a filtering process by the DF, when 4 pixels of the 8 pixels are included in a block on the upper side of the horizontal boundary, a line buffer for storing (the pixel values of) pixels in 4 lines is needed.

In a case where a large-capacity line buffer is provided to a DF, the cost becomes high. When the capacity of the line buffer is reduced in view of the cost, a long tap filter cannot be adopted as a DF. In this case, since the performance of the DF is deteriorated, block noise cannot be sufficiently eliminated.

Hence, it is desirable to decide specifications of the DF by balancing the cost and the performance. It is to be noted that, in AVC and HEVC, a DF is designed without taking a line buffer capacity into consideration.

To this end, a DF that is new (hereinafter, also referred to as a new DF) is proposed by the present technology.

It is to be noted that the following explanation is about color-difference components, unless otherwise mentioned. An explanation about a luminance component will be omitted.

Figure 11:
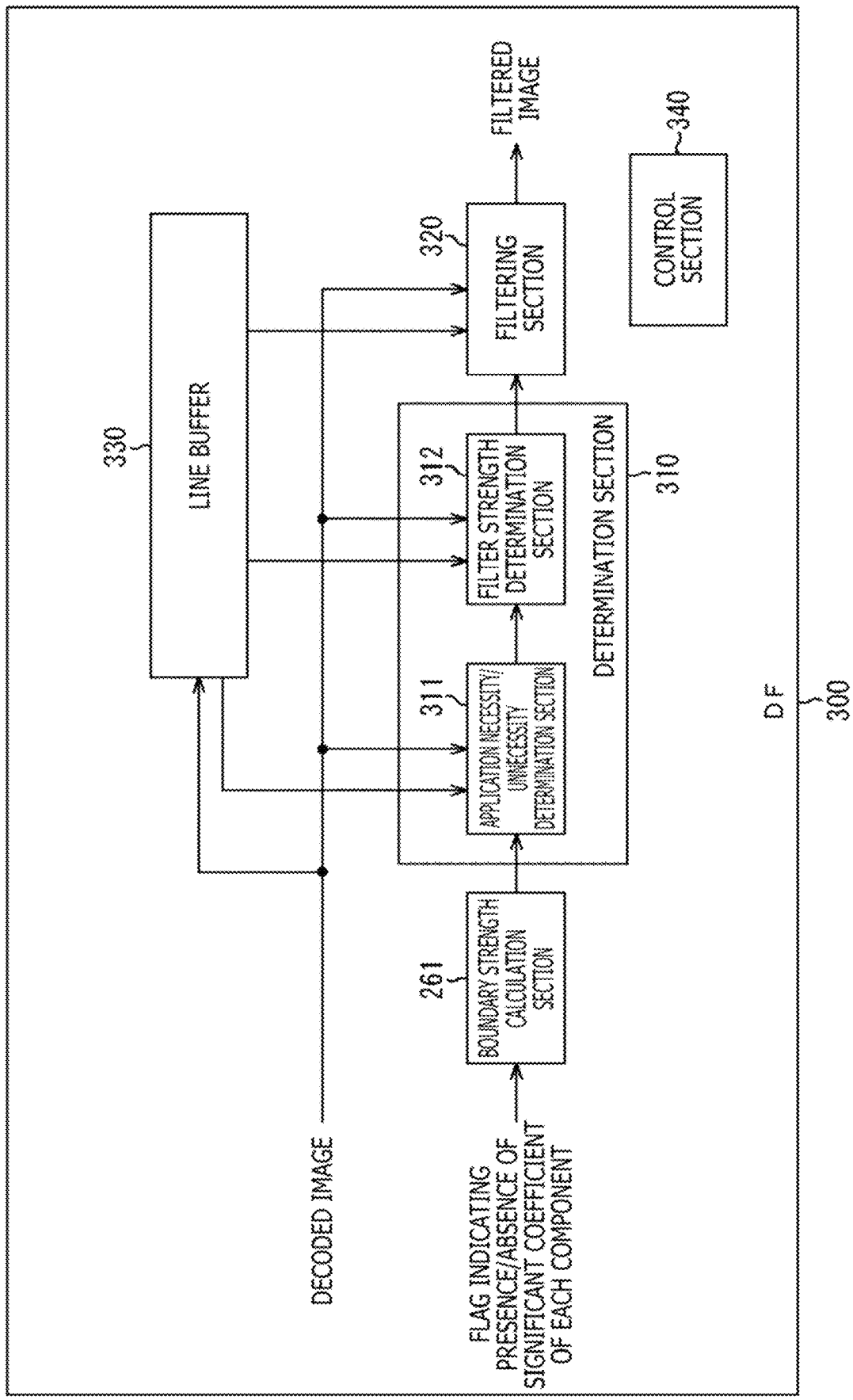
FIG. 11 is a block diagram depicting a configuration example of a DF 300 which is a new DF.

FIG. 11 is a block diagram depicting a configuration example of a DF 300 which is a new DF.

The DF 300 can be used as the DF 26.

It is to be noted that sections in FIG. 11 corresponding sections of the DF 26 in FIG. 7 are denoted by the same reference numerals. Hereinafter, an explanation of the sections will be omitted, as appropriate.

In FIG. 11, the DF 300 includes the boundary strength calculation section 261, a determination section 310, a filtering section 320, a line buffer 330, and a control section 340.

Therefore, the DF 300 and the DF 26 in FIG. 7 have the same feature of including the boundary strength calculation section 261. However, the DF 300 differs from the DF 26 in the feature of including the determination section 310 and the filtering section 320 in place of the determination section 263 and the filtering section 269. Further, the DF 300 differs from the DF 26 in the feature of additionally including the control section 340.

It is to be noted that, like the DF 300, the DF 26 depicted in FIG. 7 includes a line buffer which is not depicted in FIG. 7. However, the capacity of the line buffer 330 of the DF 300 can differ from the capacity of the line buffer of the DF 26.

The determination section 310 includes an application necessity/unnecessity determination section 311 and a filter strength determination section 312.

A bS from the boundary strength calculation section 261 is supplied to the application necessity/unnecessity determination section 311. In addition, a decoded image from the outside of the DF 300 (the addition section 23 in FIG. 5 or the addition section 65 in FIG. 6) or from the line buffer 330 is supplied to the application necessity/unnecessity determination section 311.

In a manner similar to the application necessity/unnecessity determination section 265 in FIG. 7, the application necessity/unnecessity determination section 311 performs the application necessity/unnecessity determination process by using the bS from the boundary strength calculation section 261, and further, the decoded image from the outside of the DF 300 or from the line buffer 330.

It is to be noted that the application necessity/unnecessity determination section 311 makes a step difference determination of determining whether or not a possibility that there is a step difference on the block boundary is high, on the basis of the bS. For example, in a case where the bS is greater than 0 (is not less than 1), the application necessity/unnecessity determination section 311 determines that a possibility that there is a step difference on the block boundary is high. Then, after determining that a possibility that there is a step difference on the block boundary is high through the step difference determination, the application necessity/unnecessity determination section 311 makes a filter application determination of determining whether or not to apply a DF to pixels of color-difference components located around the block boundary. The application necessity/unnecessity determination process which is performed by the application necessity/unnecessity determination section 311, includes the step difference determination and the above filter application determination described above.

The application necessity/unnecessity determination section 311 supplies, as a determination result of the application necessity/unnecessity determination process, the determination result of the filter application determination to the filter strength determination section 312.

Not only the determination result of the filter application determination from the application necessity/unnecessity determination section 311, but also a decoded image from the outside of the DF 300 or the line buffer 330 is supplied to the filter strength determination section 312.

In a case where the filter application determination made by the application necessity/unnecessity determination section 311 indicates that the DF is to be applied, the filter strength determination section 312 makes, by using the decoded image from the outside of the DF 300 or the line buffer 330, a filter strength determination of determining the filter strength of the DF to be applied to color-difference components in the decoded image, that is, a filter type determination of determining the filter type of the DF to be applied to color-difference components in the decoded image, in a manner similar to the filter strength determination section 267 in FIG. 7. Then, the filter strength determination section 321 supplies the determination result of the filter type determination to the filtering section 320.

In the new DFs, the filter types of a DF to be applied to color-difference components in a decoded image include two types, that is, a weak filter that has a lower filter strength (than a strong filter) and a strong filter that has a higher filter strength (than a weak filter), for example.

Not only the determination result of the filter type determination from the filter strength determination section 312, but also the decoded image from the outside of the DF 300 or the line buffer 330 is supplied to the filtering section 320.

The filtering section 320 performs a filtering process of applying, to the decoded image, a strong filter or a weak filter which is indicated by the determination result of the filter type determination from the filter strength determination section 312, in a manner similar to the filtering section 269 in FIG. 7. That is, the filtering section 320 performs computation as a filtering process of a target pixel which is a pixel of a color-difference component to be filtered in the decoded image from the outside of the DF 300 or the line buffer 330, by using a pixel of a color-difference component located around the target pixel. Here, a pixel for use in the filtering process is also referred to as a filter constituting pixel.

The filtering section 320 outputs, as filtered pixels (pixels constituting a filtered image having undergone the filtering process), pixels (of color-difference components) obtained by the filtering process of the target pixels.

A decoded image is supplied from the outside of the DF 300 to the line buffer 330. The line buffer 330 stores, as appropriate, pixels of color-difference components in the decoded image from the outside of the DF 300 (color-difference components of the pixels in the decoded image). It is to be noted that the line buffer 330 has a storage capacity for storing pixels of color-difference components in a predetermined number of lines such that, after pixels are stored to the storage capacity, the line buffer 330 stores a new pixel by overwriting the oldest pixel.

The control section 340 controls blocks constituting the DF 300.

It is to be noted that, in the present embodiment, the DF 300 is assumed to process decoded images in a raster scan order, for example. In a case where processing decoded images not in the raster scan order, but downwardly in the vertical direction, for example, is repeated from the left side to the right side, a horizontal direction (lateral) (left-right) and a vertical direction (longitudinal) (up-down) in the following explanation are inverted (switched).

Figure 12:
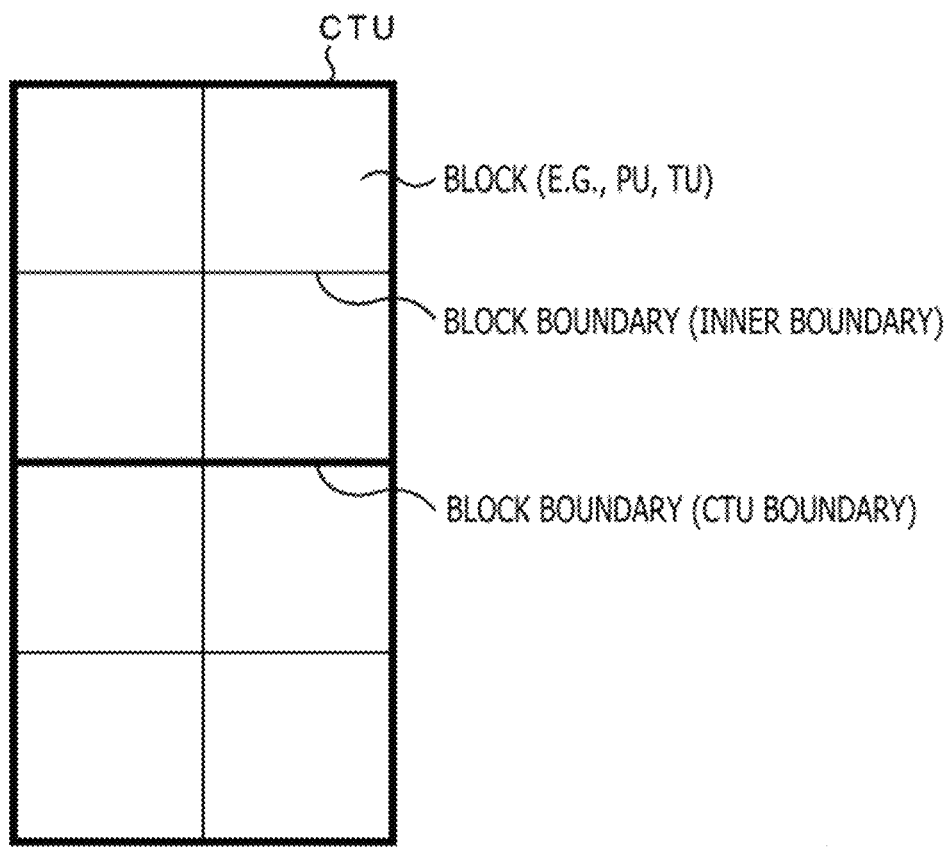
FIG. 12 is a diagram depicting a configuration example of a decoded image to be processed by the DF 300.

FIG. 12 is a diagram depicting a configuration example of a decoded image which is processed by the DF 300.

Blocks constituting a decoded image include CTUs. CTUs include blocks such as a PU or a TU.

The strength calculation section 261, the determination section 310, and the filtering section 320 of the DF 300 in FIG. 11 can perform CTU-based processing, for example. In this case, a buffer (also referred to as an internal buffer hereinafter), not illustrated, capable of storing CTUs is provided.

Here, among block boundaries, boundaries of CTUs are referred to as CTU boundaries, and further, block boundaries excluding the CTU boundaries are referred to as internal boundaries. In addition, it is assumed that a CTU to be processed by the DF 300 is referred to as an attention CTU.

The strength calculation section 261, the determination section 310, and the filtering section 320 store, in an internal buffer, pixels in lines included in the attention CTU, and process the attention CTU.

Regarding an internal boundary in the horizontal direction in an attention CTU, pixels in blocks disposed above and below the internal boundary are stored in the internal buffer, and thus, do not need to be stored in the line buffer 330.

In addition, regarding the horizontally upper CTU boundary of the attention CTU, pixels in a block below the CTU boundary are stored in the internal buffer, and thus, do not need to be stored in the line buffer 330 either. However, pixels in a block on the horizontally upper CTU boundary are pixels in the CTU in an upper line in the attention CTU, and thus, are not stored in the internal buffer. Accordingly, pixels in a block on the upper side of the horizontally upper CTU boundary of the attention CTU need to be stored in the line buffer 330.

The reason that the line buffer 330 is necessary has been explained above.

Figures 13, 14:
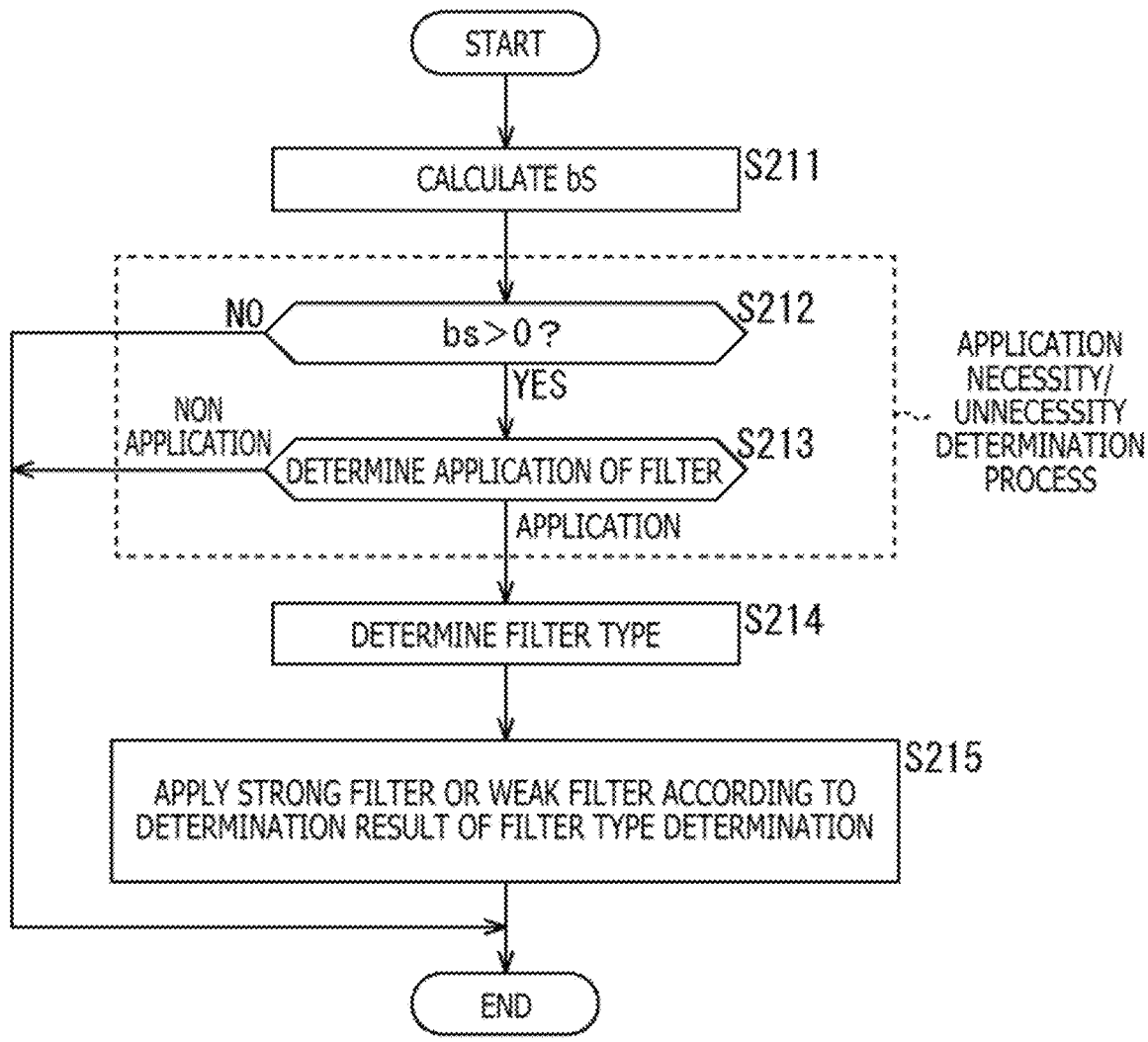
FIG. 13 is a flowchart for explaining processes by the DF 300.
FIG. 14 is a diagram for explaining DFs in HEVC.

FIG. 13 is a flowchart for explaining processes which are performed by the DF 300 in FIG. 11.

In the DF 300, the line buffer 330 stores pixels of color-difference components in a decoded image supplied from the outside of the DF 300, as appropriate.

Then, at step S211, the boundary strength calculation section 261 calculates a bS in the aforementioned manner, and supplies the bS to the application necessity/unnecessity determination section 311. Then, the process proceeds to step S212.

At step S212, the application necessity/unnecessity determination section 311 makes a step difference determination of determining whether or not the bS is greater than 0.

In a case where it is determined that the bS is not greater than 0 as a result of the step difference determination at step S212, that is, in a case where there is no possibility that any step difference is on the block boundary, the process is ended. Therefore, in this case, the filtering process by the DF 300 is not applied to the decoded image.

On the other hand, in a case where it is determined that the bS is greater than 0 as a result of the step difference determination at step S212, that is, in a case where there is a possibility that there is a step difference on the block boundary, the process proceeds to step S213.

At step S213, the application necessity/unnecessity determination section 311 makes a filter application determination of determining whether or not to apply a DF to pixels of color-difference component located around the block boundary.

In a case where it is determined to refrain from applying a DF (non-application) as a result of the filter application determination at the step S213, the process is ended.

On the other hand, in a case where it is determined to apply a DF as a result of the filter application determination at step S213, the process proceeds to step S214.

At step S214, the filter strength determination section 312 performs a filter type determination. Then, the process proceeds to step S215.

At step S215, the filtering section 320 performs a filtering process to apply, to the decoded image, a strong filter or a weak filter indicated by the determination result of the filter type determination at step S214. Then, the process is ended.

FIG. 14 is a diagram for explaining a DF in HEVC.

DFs in HEVC include filters Y1, Y2, and C1.

The filter Y1 is a strong filter for a luminance component. The filter Y1 performs a filtering process of a luminance component as a DF target.

The filter Y2 is a weak filter for a luminance component. The filter Y2 performs a filtering process of a luminance component as a DF target.

A filter C1 is a filter for a color-difference component. The filter C1 performs a filtering process of a color-difference component as a DF target.

In HEVC, only the filter C1 performs a filtering process of a color-difference component as a DF target. The filter C1 is not classified as a strong filter or a weak filter.

FIG. 15 is a diagram for explaining a new DF.

The new DFs include filters NY1, NY2, NC1, and NC2.

The filter NY1 is a strong filter for a luminance component. The filter NY1 performs a filtering process of a luminance component as a DF target. For example, the filter Y1 can be adopted as the filter NY1.

The filter NY2 is a weak filter for a luminance component. The filter NY2 performs a filtering process of a luminance component as a DF target. For example, the filter Y2 can be adopted as the filter NY2.

The filter NC1 is a strong filter (which has a higher filter strength than the filter NC2) for a color-difference component. The filter NC1 performs a filtering process of a color-difference component as a DF target. For example, the filter Y1, Y2, or a filter (the filter Y1, Y2, or the OF itself, or a filter obtained by reducing a filter characteristic of the filter Y1, Y2, or OF) that is based on an original filter OF explained later, can be adopted as the filter NC1.

The filter NC2 is a weak filter (which has a lower filter strength than the filter NC1) for a color-difference component. The filter NC2 performs a filtering process of a color-difference component as a DF target. For example, the filter C1 can be adopted as the filter NC2.

Figure 16:
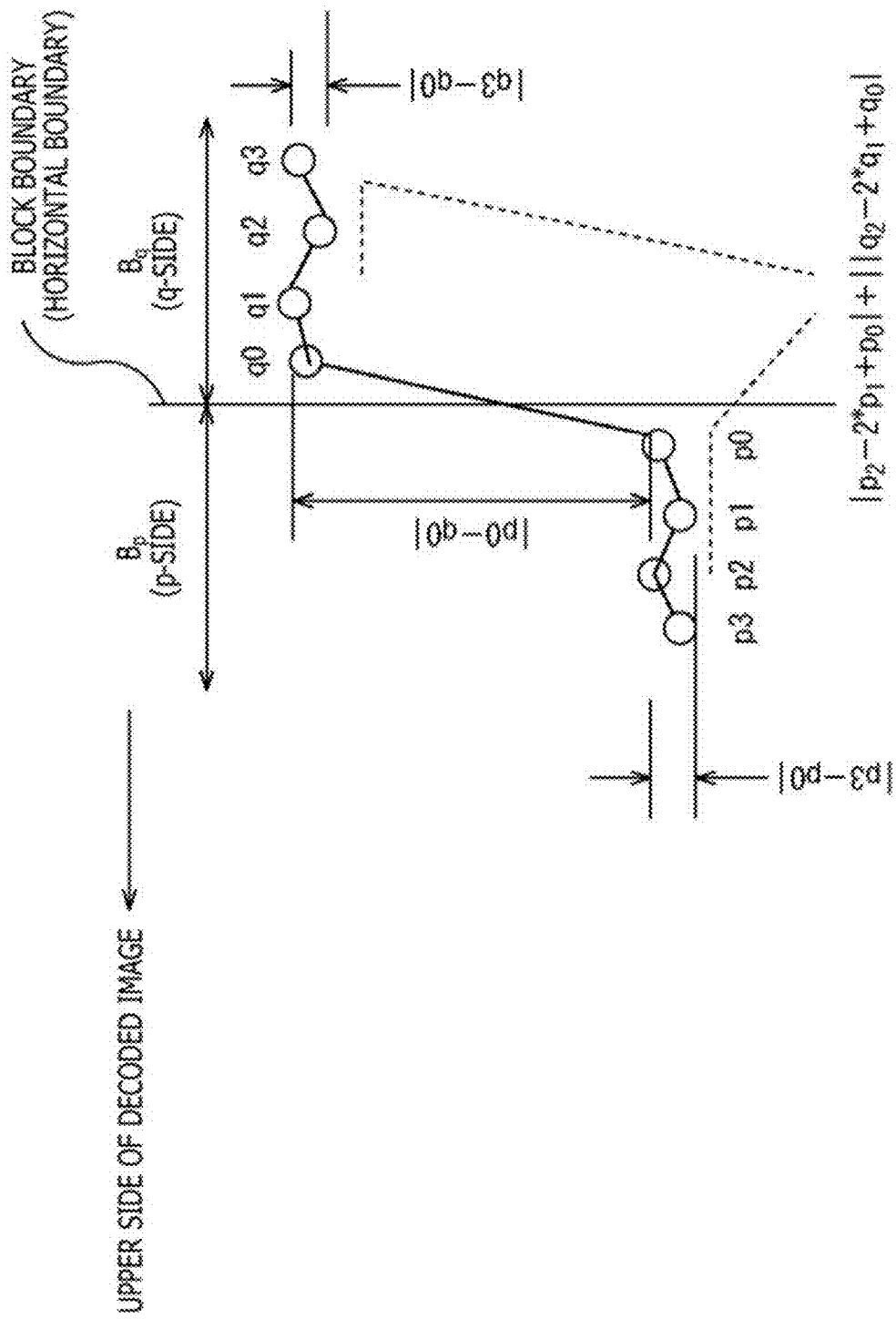
FIG. 16 is a diagram depicting an example of pixels of color-difference components in a block boundary.

FIG. 16 is a diagram depicting an example of pixels of color-difference components of a block boundary.

It is to be noted that the left-right direction in FIG. 16 indicates the up-down direction of a decoded image, and the up-down direction in FIG. 16 indicates (the intensity of) a color-difference component. Therefore, a block boundary indicated by a vertical straight line in FIG. 16 is a horizontal boundary (boundary in the horizontal direction) in the decoded image.

An explanation of a new DF will be given on the basis of a case where a DF is applied to pixels in the blocks Bp and Bq that are vertically adjacent with a horizontal boundary disposed therebetween, as described above. In this case, a DF which is applied to pixels in the blocks Bp and Bq is a vertical filter which is applied in the vertical direction.

A new DF or any other filters can be adopted as a DF to be applied to pixels in adjacent blocks disposed on the left and right sides of the vertical boundary. Hereinafter, an explanation of a case where a DF is applied to pixels in adjacent blocks disposed on the left and right sides of the vertical boundary will be omitted.

In FIG. 16, a pixel in the block Bp on the upper side of the horizontal boundary and a pixel in the block Bq on the lower side of the horizontal boundary are denoted by $p_{i,j}$ and $q_{k,j}$, respectively, as in FIG. 3. However, in FIG. 16, index j in $p_{i,j}$ and $q_{k,j}$ is omitted. A pixel $p_i$ ($p_{i,j}$) is also referred to as a p-side pixel. A pixel $q_k$ ($q_{k,j}$) is also referred to as a q-side pixel.

In the adjacent blocks Bp and Bq on the upper and lower sides of the horizontal boundary, |p3−p0|+|q3−q0| represents a flatness between the blocks Bp and Bq. Further, |p2−2*p1+p0|+|q2−2*q1+q0| represents the continuity between the blocks Bp and Bq, and |p0−q0| represents a gap between the blocks Bp and Bq.

Hereinafter, regarding a new DF, the variation of the filter NC1 serving as a strong filter to be applied to a color-difference component will be explained.

<Case of Adopting, As Filter NC1, Filter Based on Filter Y1>

FIG. 17 is a diagram depicting the filter NC1 and pixels required in a case where a filter based on the filter Y1 is adopted as the filter NC1.

The filter NC1 that is based on the filter Y1 is a Y1 normal filter, a Y1-1 asymmetric filter, a Y1-1 symmetric filter, a Y1-2 asymmetric filter, or a Y1-2 symmetric filter.

In a case where the Y1 normal filter is adopted as the filter NC1, a determination similar to a luminance component application determination of determining whether or not to apply a DF to a luminance component in HEVC, is made during the filter application determination.

In the luminance component application determination, whether or not an expression (20) is satisfied is determined. In a case where the expression (20) is satisfied, it is determined to apply a DF. In a case where the expression (20) is not satisfied, it is determined to refraining from applying a DF.

$$dp0 = \text{Abs}(p2,0 - 2*p1,0 + p0,0)$$

$$dp3 = \text{Abs}(p2,3 - 2*p1,3 + p0,3)$$

$$dq0 = \text{Abs}(q2,0 - 2*q1,0 + q0,0)$$

$$dq3 = \text{Abs}(q2,3 - 2*q1,3 + q0,3)$$

$$d = dp0 + dp3 + dq0 + dq3 < \text{beta} \quad (20)$$

In the expression (20), Abs(A) represents the absolute value of A.

In the luminance component application determination, pixels $p_{i,j}$ and $q_{k,j}$ of luminance components in the first line and pixels $p_{i,j}$ and $q_{k,j}$ of luminance components in the fourth line in the blocks Bp and Bq are used to determine whether or not the expression (20) is satisfied. In a case where the expression (20) is satisfied, it is determined to apply a DF to the pixels in the fourth lines in the blocks Bp and Bq.

Here, when it is assumed that a decoded image of the YUV420 format is used as a DF target, 2 lines of pixels of color-difference components are included in the blocks Bp and Bq. In the filter application determination in a case where the Y1 normal filter is adopted, one line of pixels of color-difference components, between the 2 lines of pixels of color-difference components, is used to determine whether or not the expression (20) is satisfied. That is, dp3 and dq3 in the expression (20) are set to 0, for example, whereby whether or not the expression (20) is satisfied is determined.

In this case, pixels (hereinafter, also referred to as an application determination pixel) of color-difference components for use in the filter application determination are 6 pixels which are pixels $p_0$ to $p_2$ and $q_0$ to $q_2$.

Therefore, for the filter application determination in a case where the horizontal boundary is a CTU boundary, a capacity (hereinafter, also referred to as a capacity for 3 pixel lines) to store color-difference components of the lines of 3 pixels: pixels p0 to p2 in the block Bp which is on the upper side of the horizontal boundary is needed as the storage capacity of the line buffer 330.

In a case where the Y1 normal filter is adopted as the filter NC1, a determination similar to the luminance component application determination of determining whether or not to apply a DF to a luminance component in HEVC is made during the filter type determination. That is, whether or not an expression (21) is satisfied is determined in the filter type determination.

$$|p3-p0|+|q3-q0|<(\text{beta}>>3)$$

$$|p2-2*p1+p0|+|q2-2*q1+q0|<(\text{beta}>>2)$$

$$|p0-q0|<((tc*5+1)>>1) \quad (21)$$

It is to be noted that A>>B represents a right shift of A by B bits, and A<<B represents a left shift of A by B bits.

In the filter type determination, in a case where the expression (21) is satisfied, it is determined to apply the filter NC1 as a strong filter to the color-difference components, and, in a case where the expression (21) is not satisfied, it is determined to apply the filter NC2 as a weak filter to the color-difference components.

Pixels (hereinafter, also referred to as a type determination pixel) of color-difference components for use in the filter type determination of the expression (21) are 8 pixels which are pixels $p_0$ to $p_3$ and $q_0$ to $q_3$.

Therefore, for the filter type determination in a case where the horizontal boundary is a CTU boundary, a capacity for 4 pixel lines of the pixels $p_0$ to $p_3$ in the block Bp which is on the upper side of the horizontal boundary is needed as the storage capacity of the line buffer 330.

A strong filter for a luminance component in HEVC can be adopted as the Y1 normal filter. In this case, the Y1 normal filter is expressed by an expression (22).

$$p2' = \text{Clip3}(p2-2*tC, p2+2*tC, (2*p3+3*p2+p1+p0+q0+4)>>3)$$

$$p1' = \text{Clip3}(p1-2*tC, p1+2*tC, (p2+p1+p0+q0+2)>>2)$$

$$p0' = \text{Clip3}(p0-2*tC, p0+2*tC, (p2+2*p1+2*p0+2*q0+q1+4)>>3)$$

$$q0' = \text{Clip3}(q0-2*tC, q0+2*tC, (p1+2*p0+2*q0+2*q1+q2+4)>>3)$$

$$q1' = \text{Clip3}(q1-2*tC, q1+2*tC, (p0+q0+q1+q2+2)>>2)$$

$$q2' = \text{Clip3}(q2-2*tC, q2+2*tC, (p0+q0+q1+3*q2+2*q3+4)>>3) \quad (22)$$

Clip3(A, B, C) represents a function that indicates A in a case where C<A, indicates B in a case where C>B, and indicates C in other cases.

Filter constituting pixels of color-difference components for use in a filtering process using the Y1 normal filter in the expression (22) are 8 pixels which are pixels $p_0$ to $p_3$ and $q_0$ to $q_3$. In addition, target pixels (pixels for which filtered pixels are required) of color-difference components, which are targets of the filtering process, are 6 pixels which are pixel $p_0$ to $p_2$ and $q_0$ to $q_2$.

Therefore, in a case where the horizontal boundary is a CTU boundary, capacity for 4 pixel lines of the pixels $p_0$ to $p_3$ in the block Bp on the upper side of the horizontal boundary is needed as the storage capacity of the line buffer 330 for the filtering process using the Y1 normal filter.

Accordingly, in a case where the Y1 normal filter is adopted as the filter NC1, the storage capacity of the line buffer 330 is restrained by the type determination pixels the number of which is the largest on the p-side among the application determination pixels, the type determination pixels, and the filter constituting pixels, and a capacity for 4 pixel lines of the pixels $p_0$ to $p_3$ in the block Bp on the upper side of the horizontal boundary is needed as the storage capacity of the line buffer 330.

In a case where the Y1-1 asymmetric filter is adopted as the filter NC1, the filter application determination is made in a manner similar to the case of the Y1 normal filter, for example.

Therefore, application determination pixels of color-difference components for use in the filter application determination are 6 pixels which are pixel $p_0$ to $p_2$ and $q_0$ to $q_2$, as in the case of the Y1 normal filter.

As a result, in the filter application determination in a case where the horizontal boundary is a CTU boundary, a capacity for 3 pixel lines of the pixels $p_0$ to $p_2$ in the block Bp on the upper side of the horizontal boundary is needed as the storage capacity of the line buffer 330.

In a case where Y1-1 asymmetric filter is adopted as the filter NC1, whether or not an expression (23) in which the pixel p2 (only one pixel) on the horizontal boundary side is substituted for the pixel p3 (one p-side pixel farthest from the horizontal boundary) in the expression (21) for the luminance component application determination to determine whether or not to apply a DF to a luminance component in HEVC, is satisfied is determined during the filter type determination.

$$|p2-p0|+|q3-q0|<(\text{beta}>>3)$$

$$|p2-2*p1+p0|+|q2-2*q1+q0|<(\text{beta}>>2)$$

$$|p0-q0|<((tc*5+1)>>1) \quad (23)$$

In the filter type determination, in a case where the expression (23) is satisfied, it is determined to apply the filter NC1 as a strong filter to the color-difference components, and, in a case where the expression (23) is not satisfied, it is determined to apply the filter NC2 as a weak filter to the color-difference components.

The type determination pixels of color-difference components for use in the filter type determination in the expression (23) are 7 pixels which are pixel p0 to p2 and q0 to q3.

Therefore, in the filter type determination in the case where the horizontal boundary is a CTU boundary, a capacity for 3 pixel lines of the pixels p0 to p2 in the block Bp on the upper side of the horizontal boundary is needed as the storage capacity of the line buffer 330.

The Y1 normal filter in the expression (22), that is, a filter obtained by substituting the pixel p2 on the horizontal boundary side for the pixel p3 in a strong filter for a luminance component in HEVC, can be adopted as the Y1-1 asymmetric filter. In this case, the Y1-1 asymmetric filter is expressed by an expression (24).

$$p2'=\text{Clip3}(p2\ 2*tC,p2+2*tC,(5*p2+3*p2+p1+p0+q0+4)>>3)$$

$$p1'=\text{Clip3}(p1-2*tC,p1+2*tC,(p2+p1+p0+q0+2)>>2)$$

$$p0'=\text{Clip3}(p0-2*tC,p0+2*tC,(p2+2*p1+2*p0+2*q0+q1+4)>>3)$$

$$q0'=\text{Clip3}(q0-2*tC,q0+2*tC,(p1+2*p0+2*q0+2*q1+q2+4)>>3)$$

$$q1'=\text{Clip3}(q1-2*tC,q1+2*tC,(p0+q0+q1+q2+2)>>2)$$

$$q2'=\text{Clip3}(q2-2*tC,q2+2*tC,(p0+q0+q1+3*q2+2*q3+4)>>3) \quad (24)$$

The filter constituting pixels of color-difference components for use in the filtering process using the Y1-1 asymmetric filter in the expression (24) are 7 pixels which are pixels p0 to p2 and q0 to q3. In addition, target pixels of color-difference components which are targets of the filtering process, are 6 pixels which are pixels p0 to p2 and q0 to q2.

Therefore, for the filtering process using the Y1-1 asymmetric filter in a case where the horizontal boundary is a CTU boundary, a capacity for 3 pixel lines of the pixels $p_0$ to $p_2$ in the block Bp which is on the upper side of the horizontal boundary, is need as the storage capacity of the line buffer 330.

The Y1-1 asymmetric filter in the expression (24) is a filter obtained by substituting the pixel p2 on the horizontal boundary side for the pixel p3 in the first expression of the expression (22) for obtaining the pixel p2'. Therefore, a tap coefficient (filter coefficient) for the pixel p2 in the first expression for obtaining the pixel p2' is changed from 3 in the expression (22) to 5 (=2+3).

Accordingly, in the case where the Y1-1 asymmetric filter is adopted as the filter NC1, a capacity for 3 pixel lines of the pixels $p_0$ to $p_2$ in the block Bp which is on the upper side of the horizontal boundary is needed as the storage capacity of the line buffer 330.

Here, pixels for use in a case where the Y1-1 asymmetric filter is adopted as the filter NC1, are pixels $p_0$ to $p_2$ in the block Bp and pixels $q_0$ to $q_3$ in the block Bq. These pixels are asymmetric with respect to the horizontal boundary (the p-side and the q-side are asymmetric).

In a case where the Y1-1 symmetric filter is adopted as the filter NC1, the filter application determination is made, for example, as in the case of the Y1 normal filter.

Therefore, the application determination pixels of color-difference components for use in the filter application determination are 6 pixels which are pixels $p_0$ to $p_2$ and $q_0$ to $q_2$, as in the case of the Y1 normal filter.

As a result, for the filter application determination in a case where the horizontal boundary is a CTU boundary, a capacity for 3 pixel lines of the pixels $p_0$ to $p_2$ in the block Bp which is on the upper side of the horizontal boundary, is needed as the storage capacity of the line buffer 330.

In the filter type determination in a case where the Y1-1 symmetric filter is adopted as the filter NC1, the pixel p2 on the horizontal boundary side is substituted for the pixel p3 in the expression (21) for the luminance component application determination to determine whether or not to apply a DF to a luminance component in HEVC, and further, whether or not the expression (25) in which the pixel q2 on the horizontal boundary side is substituted for the pixel $q_3$ is satisfied is determined.

$$|p2-p0|+|q2-q0|<(\text{beta}>>3)$$

$$|p2-2*p1+p0|+|q2-2*q1+q0|<(\text{beta}>>2)$$

$$|p0-q0|<((tc*5+1)>>1) \quad (25)$$

In the filter type determination, in a case where the expression (25) is satisfied, it is determined to apply the filter NC1 as a strong filter to the color-difference components, and, in a case where the expression (25) is not satisfied, it is determined to apply the filter NC2 as a weak filter to the color-difference components.

Type determination pixels of color-difference components for use in the filter type determination in the expression (25) are 6 pixels which are pixels p0 to p2 and q0 to q2.

Therefore, for the filter type determination in a case where the horizontal boundary is a CTU boundary, a capacity for 3 pixel lines of the pixels p0 to p2 in the block Bp which is on the upper side of the horizontal boundary, is needed as the storage capacity of the line buffer 330.

The Y1 normal filter in the expression (22), that is, a filter obtained by substituting the pixel p2 on the horizontal boundary side for the pixel p3 in a strong filter for a luminance component in HEVC, and further, substituting the pixel p2 on the horizontal boundary side for the pixel q3 can be adopted as the Y1-1 symmetric filter. In this case, the Y1-1 symmetric filter is expressed by an expression (26).

$$p2'=\text{Clip3}(p2-2*tC,p2+2*tC,(5*p2+3*p2+p1+p0+q0+4)>>3)$$

$$p1'=\text{Clip3}(p1-2*tC,p1+2*tC,(p2+p1+p0+q0+2)>>2)$$

$$p0'=\text{Clip3}(p0-2*tC,p0+2*tC,(p2+2*p1+2*p0+2*q0+q1+4)>>3)$$

$$q0'=\text{Clip3}(q0-2*tC,q0+2*tC,(p1+2*p0+2*q0+2*q1+q2+4)>>3)$$

$$q1'=\text{Clip3}(q1-2*tC,q1+2*tC,(p0+q0+q1+q2+2)>>2)$$

$$q2'=\text{Clip3}(q2-2*tC,q2+2*tC,(p0+q0+q1+5*q2+4)>>3) \quad (26)$$

Filter constituting pixels of color-difference components for use in the filtering process using the Y1-1 symmetric filter in the expression (26) are 6 pixels which are pixels p0 to p2 and q0 to q2. In addition, target pixels of color-difference components, which are targets of the filtering process, are 6 pixels which are pixels p0 to p2 and q0 to q2.

Therefore, for the filtering process using the Y1-1 symmetric filter in a case where the horizontal boundary is a CTU boundary, a capacity for 3 pixel lines of the pixels p0 to p2 in the block Bp which is on the upper side of the horizontal boundary, is needed as the storage capacity of the line buffer 330.

The Y1-1 symmetric filter in the expression (26) is a filter obtained by substituting the pixel p2 on the horizontal boundary side for the pixel p3 in the first expression for obtaining the pixel p2' in the expression (22). Therefore, a tap coefficient for the pixel p2 in the first expression for obtaining the pixel p2' is changed from 3 in the expression (22) to 5 (=2+3). Moreover, the Y1-1 symmetric filter in the expression (26) is a filter obtained by substituting the pixel q2 on the horizontal boundary side for the pixel q3 in the sixth expression for obtaining the pixel q2' in the expression (22). Therefore, a tap coefficient for the pixel q2 in the sixth expression for obtaining the pixel q2' is changed from 3 in the expression (22) to 5 (=3+2).

Accordingly, in a case where the Y1-1 symmetric filter is adopted as the filter NC1, a capacity for 3 pixel lines of the pixels p0 to p2 in the block Bp which is on the upper side of the horizontal boundary, is needed as the storage capacity of the line buffer 330.

Here, pixels for use in the case where the Y1-1 symmetric filter is adopted as the filter NC1 are pixels p0 to p2 in the block Bp and pixels q0 to q2 in the block Bq. These pixels are symmetric with respect to the horizontal boundary.

In the filter application determination in a case where the Y1-2 asymmetric filter is adopted as the filter NC1, whether or not the expression (27) in which, for example, dp3 and dq3 in expression (20) are set to 0 and the pixel p1,0 on the horizontal boundary side is substituted for the pixel p2,0 is satisfied is determined.

$$dp0 = \text{Abs}(p1,0 - 2*p1,0 + p0,0) = \text{Abs}(p0,0 - p1,0)$$

$$dq0 = \text{Abs}(q2,0 - 2*q1,0 + q0,0)$$

$$d = dp0 + dq0 < (\text{beta} >> 1) \quad (27)$$

In the filter application determination, it is determined to apply a DF in a case where the expression (27) is satisfied, and it is determined to refrain from applying a DF in in a case where the expression (27) is not satisfied.

Therefore, the application determination pixels of color-difference components for use in the filter application determination are 5 pixels p0 to p1 and q0 to q2.

As a result, for the filter application determination in a case where the horizontal boundary is a CTU boundary, a capacity for 2 pixel lines of the pixels p0 to p1 in the block Bp which is on the upper side of the horizontal boundary is needed as the storage capacity of the line buffer 330.

In the filter type determination in a case where the Y1-2 asymmetric filter is adopted as the filter NC1, whether or not the expression (28) in which the pixel p1 on the horizontal boundary side is substituted for the pixels p3 and p2 (two p-side pixels farthest from the horizontal boundary) in the expression (21) for the luminance component application determination to determine whether or not to apply a DF to a luminance component in HEVC is satisfied is determined.

$$|p1-p0|+|q3-q0|<(\text{beta}>>3)$$

$$|p1-2*p1+p0|+|q2-2*q1+q0|<(\text{beta}>>2)$$

$$=|p0-p1|+|q2-2*q1+q0|<(\text{beta}>>2)$$

$$|p0-q0|<((tc*5+1)>>1) \quad (28)$$

In the filter type determination, it is determined to apply the filter NC1 as a strong filter to the color-difference components in a case where the expression (28) is satisfied, and it is determined to apply the filter NC2 as a weak filter to the color-difference components in a case where the expression (28) is not satisfied.

Type determination pixels of color-difference components for use in the filter type determination in the expression (28) are 6 pixels which are the pixels p0 to p1 and q0 to q3.

Therefore, for the filter type determination in the case where the horizontal boundary is a CTU boundary, a capacity for 2 pixel lines of the pixels p0 to p1 in the block Bp which is on the upper side of the horizontal boundary is needed as the storage capacity of the line buffer 330.

The Y1 normal filter in the expression (22), that is, a filter obtained by substituting the pixel p1 on the horizontal boundary side for the pixel p3 and the pixel p2 in a strong filter for a luminance component in HEVC, can be adopted as the Y1-2 asymmetric filter. In this case, the Y1-2 asymmetric filter is expressed by an expression (29).

$$p1'=\text{Clip3}(p1-2*tC,p1+2*tC,(2*p1+p0+q0+2)>>2)$$

$$p0'=\text{Clip3}(p0-2*tC,p0+2*tC,(3*p1+2*p0+2*q0+q1+4)>>3)$$

$$q0'=\text{Clip3}(q0-2*tC,q0+2*tC,(p1+2*p0+2*q0+2*q1+q2+4)>>3)$$

$$q1'=\text{Clip3}(q1-2*tC,q1+2*tC,(p0+q0+q1+q2+2)>>2)$$

$$q2'=\text{Clip3}(q2-2*tC,q2+2*tC,(p0+q0+q1+3*q2+2*q3+4)>>3) \quad (29)$$

Filter constituting pixels of color-difference components for use in the filtering process using the Y1-2 asymmetric filter in the expression (29) are 6 pixels which are the pixels p0 to p1 and q0 to q3. Moreover, target pixels of color-difference components to be subjected to the filtering process are 5 pixels which are the pixels p0 to p1 and q0 to q2.

Therefore, in the filtering process using the Y1-2 asymmetric filter in the case where the horizontal boundary is a CTU boundary, a capacity for 2 pixel lines of the pixels p0 to p1 in the block Bp which is on the upper side of the horizontal boundary is needed as the storage capacity of the line buffer 330.

The Y1-2 asymmetric filter in the expression (29) lacks the first expression for obtaining the pixel p2' in the expression (22). Further, the Y1-2 asymmetric filter in the expression (29) is a filter in which the pixel p1 on the horizontal boundary side is substituted for the pixel p2 in an expression for obtaining the pixels p1' and p0' in the expression (22). Therefore, a tap coefficient for the pixel p1 in the expression for obtaining the pixel p1' in the expression (29) is changed from 1 in the expression (22) to 2 (=1+1), and a tap coefficient for the pixel p1 in the expression for obtaining the pixel p0' in the expression (29) is changed from 2 in the expression (22) to 3 (=1+2).

Accordingly, in the case where the Y1-2 asymmetric filter is adopted as the filter NC1, a capacity for 2 pixel lines of the pixels p0 to p1 in the block Bp which is on the upper side of the horizontal boundary is needed as the storage capacity of the line buffer 330.

Here, pixels for use in the case where the Y1-2 asymmetric filter is adopted as the filter NC1 are pixels p0 to p1 in the block Bp and the pixels q0 to q3 in the block Bq. These pixels are asymmetric with respect to the horizontal boundary.

In the filter application determination in the case where the Y1-2 symmetric filter is adopted as the filter NC1, whether or not an expression (30) in which, for example, dp3 and dq3 in the expression (20) are set to 0, and further, the pixels p1,0 and q1,0 on the horizontal boundary side are substituted for the pixels p2,0 and q2,0 is satisfied is determined.

$$dp0=\text{Abs}(p1,0-2*p1,0+p0,0)=\text{Abs}(p0,0-p1,0)$$

$$dq0=\text{Abs}(q1,0-2*q1,0+q0,0)=\text{Abs}(q0,0-q1,0)$$

$$d=dp0+dq0<(\text{beta}>>1) \tag{30}$$

In the filter application determination, it is determined to apply a DF in a case where the expression (30) is satisfied, and it is determined to refrain from applying a DF in the case where the expression (30) is not satisfied.

Therefore, application determination pixels of color-difference components for use in the filter application determination are 4 pixels which are the pixels p0 to p1 and q0 to q1.

As a result, for the filter application determination in the case where the horizontal boundary is a CTU boundary, a capacity for 2 pixel lines of the pixels p0 to p1 in the block Bp which is on the upper side of the horizontal boundary is needed as the storage capacity of the line buffer 330.

In the filter type determination in the case where the Y1-2 symmetric filter is adopted as the filter NC1, whether or not an expression (31) in which the pixel p1 on the horizontal boundary side is substituted for the pixels p3 and p2 in the expression (21) for a luminance component application determination to determine whether or not to apply a DF to a luminance component in HEVC, and the pixel q1 on the horizontal boundary side is substituted for the pixels q3 and q2 is satisfied is determined.

$$|p1-p0|+|q1-q0|<(\text{beta}>>3)$$

$$|p1-2*p1+p0|+|q1-2*q1+q0|<(\text{beta}>>2)$$

$$=|p0-p1|+|q0-q1|<(\text{beta}>>2)$$

$$|p0-q0|<((tc*5+1)>>1) \tag{31}$$

In the filter type determination, it is determined to apply the filter NC1 as a strong filter to the color-difference components in a case where the expression (31) is satisfied, and it is determined to apply the filter NC2 as a weak filter to the color-difference components in a case where the expression (31) is not satisfied.

Type determination pixels of color-difference components for use in the filter type determination in the expression (31) are 4 pixels which are the pixels p0 to p1 and q0 to q1.

Therefore, for the filter type determination in the case where the horizontal boundary is a CTU boundary, a capacity for 2 pixel lines of the pixels p0 to p1 in the block Bp which is on the upper side of the horizontal boundary is needed as the storage capacity of the line buffer 330.

The Y1 normal filter in the expression (22), that is, a filter obtained by substituting the pixel p1 on the horizontal boundary side for the pixel p3 and pixel p2 in a strong filter for a luminance component in HEVC, and substituting the pixel q1 on the horizontal boundary side for the pixel q3 and pixel q2 can be adopted as the Y1-2 symmetric filter. In this case, the Y1-2 symmetric filter is expressed by an expression (32).

$$p1'=\text{Clip3}(p1-2*tC,p1+2*tC,(2*p1+p0+q0+2)>>2)$$

$$p0'=\text{Clip3}(p0-2*tC,p0+2*tC,(3*p1+2*p0+2*q0+q1+4)>>3)$$

$$q0'=\text{Clip3}(q0-2*tC,q0+2*tC,(p1+2*p0+2*q0+3*q1+4)>>3)$$

$$q1'=\text{Clip3}(q1-2*tC,q1+2*tC,(p0+q0+2*q1+2)>>2) \tag{32}$$

Filter constituting pixels of color-difference components for use in the filtering process using the Y1-2 symmetric filter in the expression (32) are 4 pixels which are the pixels p0 to p1 and q0 to q1. In addition, target pixels of color-difference components to be subjected to the filtering process are 4 pixels which are the pixels p0 to p1 and q0 to q1.

Therefore, for the filtering process using the Y1-2 symmetric filter in the case where the horizontal boundary is a CTU boundary, a capacity for 2 pixel lines of the pixels p0 to p1 in the block Bp which is on the upper side of the horizontal boundary is needed as the storage capacity of the line buffer 330.

In the Y1-2 symmetric filter in the expression (32), the first expression for obtaining the pixel p2' in the expression (22) and the sixth expression for obtaining the pixel q2' are lacked. Moreover, the Y1-2 symmetric filter in the expression (32) is a filter obtained by substituting the pixel p1 for the pixel p2 in the expression for obtaining the pixels p1' and p0' in the expression (22), and substituting the pixel q1 on the horizontal boundary side for the pixel q2 in the expression for obtaining the pixels q1' and q0' in the expression (22). Therefore, a tap coefficient for the pixel p1 in the expression for obtaining the pixel p1' in the expression (31) is changed from 1 in the expression (22) to 2 (=1+1), and a tap coefficient for the pixel p1 in the expression for obtaining the pixel p0' in the expression (31) is changed from 2 in the expression (22) to 3 (=1+2). In addition, a tap coefficient for the pixel q1 in the expression for obtaining the pixel q0' in the expression (31) is changed from 2 in the expression (22) to 3 (=2+1), and a tap coefficient for the pixel q1 in the expression for obtaining the pixel q1' in the expression (31) is changed from 1 in the expression (22) to 2 (=1+1).

Accordingly, in the case where the Y1-2 symmetric filter is adopted as the filter NC1, a capacity for 2 pixel lines of the pixels p0 to p1 in the block Bp which is on the upper side of the horizontal boundary is needed as the storage capacity of the line buffer 330.

Here, pixels for use in the case where the Y1-2 symmetric filter is adopted as the filter NC1 are the pixels p0 to p1 in the block Bp and the pixels q0 to q1 in the block Bq. These pixels are symmetric with respect to the horizontal boundary.

<Case of Adopting, as Filter NC1, Filter Based on Filter OF>

FIG. 18 is a diagram depicting a filter NC1 and pixels required in a case where a filter based on the filter OF is adopted as the filter NC1.

The filter NC1 that is based on the filter OF is an OF normal filter, an OF-1 asymmetric filter, an OF-1 symmetric filter, an OF-2 asymmetric filter, or an OF-2 symmetric filter.

In a case where the OF normal filter is adopted as the filter NC1, the filter application determination is made in a manner similar to the case of the Y1 normal filter, that is, in a manner similar to the luminance component application determination in the expression (20).

Therefore, application determination pixels of color-difference components for use in the filter application determination are 6 pixels which are the pixels p0 to p2 and q0 to q2, as in the case of the Y1 normal filter.

As a result, for the filter application determination in the case where the horizontal boundary is a CTU boundary, a capacity for 3 pixel lines of the pixels p0 to p2 in the block Bp which is on the upper side of the horizontal boundary is needed as the storage capacity of the line buffer 330.

In the filter type determination in the case where the OF normal filter is adopted as the filter NC1, whether or not the expression (21) is satisfied is determined, in a manner similar to the case of the Y1 normal filter.

Therefore, type determination pixels of color-difference components for use in the filter type determination are 8 pixels which are the pixels p0 to p3 and q0 to q3, as in the case of the Y1 normal filter.

As a result, for the filter type determination in the case where the horizontal boundary is a CTU boundary, a capacity for 4 pixel lines of the pixels p0 to p3 in the block Bp which is on the upper side of the horizontal boundary is needed as the storage capacity of the line buffer 330.

A strong filter for a luminance component in HEVC, that is, a filter in which a tap coefficient for the Y1 normal filter by the expression (22) and the clip parameters A and B in the clip function Clip3(A, B, C) are changed, can be adopted as the OF normal filter. For example, a filter by an expression (33) is adopted as the OF normal filter.

$$p2'=\text{Clip3}(p2-tC,p2+tC,(3*p3+2*p2+p1+p0+q0+4)>>3)$$

$$p1'=\text{Clip3}(p1-tC,p1+tC,(2*p3+p2+2*p11+p0+q0+q1+4)>>3)$$

$$p0'=\text{Clip3}(p0-tC,p0+tC,(p3+p2+p1+2*p0+q0+q1+q2+4)>>3)$$

$$q0'=\text{Clip3}(q0-tC,q0+tC,(p2+p1+p0+2*q0+q1+q2+q3+4)>>3)$$

$$q1'=\text{Clip3}(q1-tC,q1+tC,p1+p0+q0+2*q1+q2+2*q3+4)>>3)$$

$$q2'=\text{Clip3}(q2-tC,q2+tC,(p0+q0+q1+2*q2+3*q3+4)>>3) \quad (33)$$

The OF normal filter by the expression (33) is a strong filter for a luminance component in HEVC, that is, a filter in which a tap coefficient for the Y1 normal filter by the expression (22) and the clip parameters A and B in the clip function Clip3(A, B, C) are changed. For example, in the OF normal filter by the expression (33), 2tC constituting the clip parameters in the expression (22) is changed to tC.

Filter constituting pixels of color-difference components for use in the filtering process using the OF normal filter by the expression (33) are 8 pixels which are the pixels p0 to p3 and q0 to q3. In addition, target pixels of color-difference components to be subjected to the filtering process are 6 pixels which are the pixels p0 to p2 and q0 to q2.

Therefore, for the filtering process using the OF normal filter in the case where the horizontal boundary is a CTU boundary, a capacity for 4 pixel lines of the pixels p0 to p3 in the block Bp which is on the upper side of the horizontal boundary is needed as the storage capacity of the line buffer 330.

Accordingly, in the case where the OF normal filter is adopted as the filter NC1, a capacity for 4 pixel lines of the pixels p0 to p3 in the block Bp which is on the upper side of the horizontal boundary is needed as the storage capacity of the line buffer 330.

In a case where the OF-1 asymmetric filter is adopted as the filter NC1, the filter application determination is made in a manner similar to the case of the OF normal filter, for example.

Therefore, application determination pixels of color-difference components for use in the filter application determination are 6 pixels which are the pixels p0 to p2 and q0 to q2, as in the case of the OF normal filter.

As a result, for the filter application determination in the case where the horizontal boundary is a CTU boundary, a capacity for 3 pixel lines of the pixels p0 to p2 in the block Bp which is on the upper side of the horizontal boundary is needed as the storage capacity of the line buffer 330.

In the case where the OF-1 asymmetric filter is adopted as the filter NC1, whether or not the expression (23) is satisfied is determined during the filter type determination, as in a manner similar to the case of the Y1-1 asymmetric filter.

Therefore, type determination pixels of color-difference components for use in the type determination of the OF-1 asymmetric filter are 7 pixels which are the pixels p0 to p2 and q0 to q3, as in the case of the Y1-1 asymmetric filter.

As a result, for the filter type determination in the case where the horizontal boundary is a CTU boundary, a capacity for 3 pixel lines of the pixels pixel p0 to p2 of the block Bp on the upper side of the horizontal boundary is needed as the storage capacity of the line buffer 330.

A filter obtained by substituting the pixel p2 on the horizontal boundary side for the pixel p3 in the OF normal filter in the expression (33) can be adopted as the OF-1 asymmetric filter. In this case, the OF-1 asymmetric filter is expressed by an expression (34).

$$p2'=\text{Clip3}(p2-tC,p2+tC,(5*p2+p1+p0+q0+4)>>3)$$

$$p1'=\text{Clip3}(p1-tC,p1+tC,(3*p2+2*p1+p0+q0+q1+4)>>3)$$

$$p0'=\text{Clip3}(p0-tC,p0+tC,(2*p2+p1+2*p0+q0+q1+q2+4)>>3)$$

$$q0'=\text{Clip3}(q0-tC,q0+tC,(p2+p1+p0+2*q0+q1+q2+q3+4)>>3)$$

$$q1'=\text{Clip3}(q1-tC,q1+tC,(p1+p0+q0+2*q1+q2+2*q3+4)>>3)$$

$$q2'=\text{Clip3}(q2-tC,q2+tC,(p0+q0+q1+2*q2+3*q3+4)>>3) \quad (34)$$

Filter constituting pixels of color-difference components for use in the filtering process using the OF-1 asymmetric filter in the expression (34) are 7 pixels which are the pixels p0 to p2 and q0 to q3. In addition, target pixels of color-difference components to be subjected to the filtering process are 6 pixels which are the pixels p0 to p2 and q0 to q2.

Therefore, the filtering process using the OF-1 asymmetric filter in the case where the horizontal boundary is a CTU boundary, a capacity for 3 pixel lines of the pixels p0 to p2 of the block Bp on the upper side of the horizontal boundary is needed as the storage capacity of the line buffer 330.

The OF-1 asymmetric filter by the expression (34) is a filter obtained by substituting the pixel p2 on the horizontal boundary side for the pixel p3 in the expression for obtaining the pixels p2' to p0' in the expression (33). Therefore, a tap coefficient for the pixel p2 in the expression for obtaining the pixel p2' is changed from 2 in the expression (33) to 5 (=3+2). In addition, a tap coefficient for the pixel p2 in the expression for obtaining the pixel p1' is changed from 1 in the expression (33) to 3 (=2+1), and a tap coefficient for the pixel p2 in the expression for obtaining the pixel p2' is changed from 1 in the expression (33) to 2 (=1+1).

Accordingly, in the case where the OF-1 asymmetric filter is adopted as the filter NC1, a capacity for 3 pixel lines of the pixels p0 to p2 in the block Bp which is on the upper side of the horizontal boundary is needed as the storage capacity of the line buffer 330.

Here, pixels for use in the case where the OF-1 asymmetric filter is adopted as the filter NC1, are the pixels p0 to p2 in the block Bp and the pixels q0 to q3 in the block Bq. These pixels are asymmetric with respect to the horizontal boundary.

In the case where the OF-1 symmetric filter is adopted as the filter NC1, the filter application determination is made in a manner similar to the case of the OF normal filter, for example.

Therefore, application determination pixels of color-difference components for use in the filter application determination are 6 pixels which are the pixels p0 to p2 and q0 to q2, as in the case of the OF normal filter.

As a result, for the filter application determination in the case where the horizontal boundary is a CTU boundary, a capacity for 3 pixel lines of the pixels p0 to p2 in the block Bp which is on the upper side of the horizontal boundary is needed as the storage capacity of the line buffer 330.

In the case where the OF-1 symmetric filter is adopted as the filter NC1, whether or not the expression (25) is satisfied is determined during the filter type determination, as in the case of the 1-1 symmetric filter.

Therefore, type determination pixels of color-difference components for use in the filter type determination of the OF-1 symmetric filter are 6 pixels which are the pixels p0 to p2 and q0 to q2, as in the case of the Y1-1 symmetric filter.

As a result, for the filter type determination in the case where the horizontal boundary is a CTU boundary, a capacity for 3 pixel lines of the pixels p0 to p2 in the block Bp which is on the upper side of the horizontal boundary is needed as the storage capacity of the line buffer 330.

A filter obtained by substituting the pixel p2 on the horizontal boundary side for the pixel p3 in the OF normal filter in the expression (33), and further, substituting the pixel q2 on the horizontal boundary side for the pixel q3 can be adopted as the OF-1 symmetric filter. In this case, the OF-1 symmetric filter is expressed by an expression (35).

$$p2'=Clip3(p2-tC, p2+tC, (5*p2+p1+p0+q0+4)>>3)$$

$$p1'=Clip3(p1-tC, p1+tC, (3*p2+2*p1+p0+q0+q1+4)>>3)$$

$$p0'=Clip3(p0-tC, p0+tC, (2*p2+p1+2*p0+q0+q1+q2+4)>>3)$$

$$q0'=Clip3(q0-tC, q0+tC, (p2+p1+p0+2*q0+q1+2*q2+4)>>3)$$

$$q1'=Clip3(q1-tC, q1+tC, (p1+p0+q0+2*q1+3*q2+4)>>3)$$

$$q2'=Clip3(q2-tC, q2+tC, (p0+q0+q1+5*q2+4)>>3) \quad (35)$$

Filter constituting pixels of color-difference components for use in the filtering process using the OF-1 symmetric filter in the expression (35) are 6 pixels which are the pixels p0 to p2 and q0 to q2. In addition, target pixels of color-difference components to be subjected to the filtering process are 6 pixels which are the pixels p0 to p2 and q0 to q2.

Therefore, for the filtering process using the OF-1 symmetric filter in the case where the horizontal boundary is a CTU boundary, a capacity for 3 pixel lines of the pixels p0 to p2 in the block Bp which is on the upper side of the horizontal boundary is needed as the storage capacity of the line buffer 330.

The OF-1 symmetric filter by the expression (35) is a filter obtained by substituting the pixel p2 on the horizontal boundary side for the pixel p3 in the expression for obtaining the pixels p2' to p0' in the expression (33). Therefore, a tap coefficient for the pixel p2 in the expression for obtaining the pixel p2' is changed from 2 in the expression (33) to 5 (=3+2). In addition, a tap coefficient for the pixel p2 in the expression for obtaining the pixel p1' is changed from 1 in the expression (33) to 3 (=2+1), and a tap coefficient for the pixel p2 in the expression for obtaining the pixel p0' is changed from 1 in the expression (33) to 2 (=1+1).

In addition, the OF-1 symmetric filter by the expression (35) is a filter obtained by substituting the pixel q2 on the horizontal boundary side for the pixel q3 in the expression for obtaining the pixels q0' to q2' in the expression (33). Therefore, a tap coefficient for the pixel q2 in the expression for obtaining the pixel q0' is changed from 1 in the expression (33) to 2 (=1+1). In addition, a tap coefficient for the pixel q2 in the expression for obtaining the pixel q1' is changed from 1 in the expression (33) to 3 (=1+2), and a tap coefficient for the pixel q2 in the expression for obtaining the pixel q2' is changed from 2 in the expression (33) to 5 (=2+3).

Accordingly, in the case where the OF-1 symmetric filter is adopted as the filter NC1, a capacity for 3 pixel lines of the pixels p0 to p2 in the block Bp which is on the upper side of the horizontal boundary is needed as the storage capacity of the line buffer 330.

Here, pixels for use in the case where the OF-1 symmetric filter is adopted as the filter NC1 are the pixels p0 to p2 in the block Bp and the pixels q0 to q2 in the block Bq. These pixels are symmetric with respect to the horizontal boundary.

In the case where the OF-2 asymmetric filter is adopted as the filter NC1, whether or not the expression (27) is satisfied is determined during the filter application determination, as in the case of the Y1-2 asymmetric filter.

Therefore, application determination pixels of color-difference components for use in the filter application determination of the OF-2 asymmetric filter are 5 pixels which are the pixels p0 to p1 and q0 to q2, as in the case of the Y1-2 asymmetric filter.

As a result, for the filter application determination in the case where the horizontal boundary is a CTU boundary, a capacity for 2 pixel lines of the pixels p0 to p1 in the block Bp which is on the upper side of the horizontal boundary is needed as the storage capacity of the line buffer 330.

In the case where the OF-2 asymmetric filter is adopted as the filter NC1, whether or not the expression (28) is satisfied is determined during the filter type determination, as in the case of the Y1-2 asymmetric filter.

Therefore, type determination pixels of color-difference components for use in the filter type determination of the OF-2 asymmetric filter are 6 pixels which are the pixels p0 to p1 and q0 to q3, as in the case of the Y1-2 asymmetric filter.

As a result, for the filter type determination in the case where the horizontal boundary is a CTU boundary, a capacity for 2 pixel lines of the pixels p0 to p1 in the block Bp which is on the upper side of the horizontal boundary is needed as the storage capacity of the line buffer 330.

A filter obtained by substituting the pixel p1 on the horizontal boundary side for the pixels p3 and pixel p2 in the OF normal filter by the expression (33) can be adopted as the OF-2 asymmetric filter. In this case, the OF-2 asymmetric filter is expressed by an expression (36).

$$p1'=\text{Clip3}(p1-tC,p1+tC,(5*p1+p0+q0+q1+4)>>3)$$

$$p0'=\text{Clip3}(p0-tC,p0+tC,(3*p1+2*p0+q0+q1+q2+4)>>3)$$

$$q0'=\text{Clip3}(q0-tC,q0+tC,(2*p1+p0+2*q0+q1+q2+q3+4)>>3)$$

$$q1'=\text{Clip3}(q1-tC,q1+tC,(p1+p0+q0+2*q1+q2+2*q3+4)>>3)$$

$$q2'=\text{Clip3}(q2-tC,q2+tC,(p0+q0+q1+2*q2+3*q3+4)>>3) \quad (36)$$

Filter constituting pixels of color-difference components for use in the filtering process using the OF-2 asymmetric filter by the expression (33) are 6 pixels which are the pixels p0 to p1 and q0 to q3. In addition, target pixels of color-difference components to be subjected to the filtering process are 5 pixels which are the pixels p0 to p1 and q0 to q2.

Therefore, for the filtering process using the OF-2 asymmetric filter in the case where the horizontal boundary is a CTU boundary, a capacity for 2 pixel lines of the pixels p0 to p1 in the block Bp which is on the upper side of the horizontal boundary is needed as the storage capacity of the line buffer 330.

In the OF-2 asymmetric filter by the expression (36), the expression for obtaining the pixel p2' in the expression (33) is lacked.

In addition, the OF-2 asymmetric filter by the expression (36) is a filter obtained by substituting the pixel p1 on the horizontal boundary side for the pixels p2 and p3 in the expression for obtaining the pixels p1', p0', and q0' in the expression (33). Therefore, a tap coefficient for the pixel p1 in the expression for obtaining the pixel p1' in the expression (36) is changed from 2 in the expression (33) to 5 (=2+1+2). In addition, a tap coefficient for the pixel p1 in the expression for obtaining the pixel p0' in the expression (36) is changed from 1 in the expression (33) to 3 (=1+1+1), and a tap coefficient for the pixel p1 in the expression for obtaining the pixel q0' in the expression (36) is changed from 1 in the expression (33) to 2 (=1+1).

Accordingly, in the case where the OF-2 asymmetric filter is adopted as the filter NC1, a capacity for 2 pixel lines of the pixels p0 to p1 in the block Bp which is on the upper side of the horizontal boundary is needed as the storage capacity of the line buffer 330.

Here, pixels for use in the case where the OF-2 asymmetric filter is adopted as the filter NC1 are the pixels p0 to p1 in the block Bp and the pixels q0 to q3 in the block Bq. These pixels are asymmetric with respect to the horizontal boundary (the OF-2 asymmetric filter is an asymmetric filter).

In the case where the OF-2 symmetric filter is adopted as the filter NC1, whether or not the expression (30) is satisfied is determined during the filter application determination, as in the case of the Y1-2 symmetric filter.

Therefore, application determination pixels of color-difference components for use in the filter application determination of the OF-2 symmetric filter are 4 pixels which are the pixels p0 to p1 and q0 to q1, as in the case of the Y1-2 symmetric filter.

As a result, for the filter application determination in the case where the horizontal boundary is a CTU boundary, a capacity for 2 pixel lines of the pixels p0 to p1 in the block Bp which is on the upper side of the horizontal boundary is needed as the storage capacity of the line buffer 330.

In a case where the OF-2 symmetric filter is adopted as the filter NC1, whether or not the expression (31) is satisfied is determined during the filter type determination, as in the case of the Y1-2 symmetric filter.

Therefore, type determination pixels of color-difference components for use in the filter type determination of the OF-2 symmetric filter are 4 pixels of the pixels p0 to p1 and q0 to q1, as in the case of the Y1-2 symmetric filter.

As a result, for the filter type determination in the case where the horizontal boundary is a CTU boundary, a capacity for 2 pixel lines of the pixels p0 to p1 in the block Bp which is on the upper side of the horizontal boundary is needed as the storage capacity of the line buffer 330.

A filter obtained by substituting the pixel p1 on the horizontal boundary side for the pixels p3 and p2 in the OF normal filter in the expression (33), and substituting the pixel q1 on the horizontal boundary side for the pixels q2 and q3 can be adopted as the OF-2 symmetric filter. In this case, the OF-2 symmetric filter is expressed by an expression (37).

$$p1'=\text{Clip3}(p1-tC,p1+tC,(5*p1+p0+q0+q1+4)>>3)$$

$$p0'=\text{Clip3}(p0-tC,p0+tC,(3*p1+2*p0+q0+q1+q2+4)>>3)$$

$$q0'=\text{Clip3}(q0-tC,q0+tC,(2*p1+p0+2*q0+3*q1+4)>>3)$$

$$q1'=\text{Clip3}(q1-tC,q1+tC,(p1+p0+q0+5*q1+4)>>3) \quad (37)$$

Filter constituting pixels of color-difference components for use in the filtering process using the OF-2 symmetric filter by the expression (37) are 4 pixels which are the pixels p0 to p1 and q0 to q1. In addition, target pixels of color-difference components to be subjected to the filtering process are 4 pixels which are the pixels p0 to p1 and q0 to q1.

Therefore, for the filtering process using the OF-2 symmetric filter in the case where the horizontal boundary is a CTU boundary, a capacity for 2 pixel lines of the pixels p0 to p1 in the block Bp which is on the upper side of the horizontal boundary is needed as the storage capacity of the line buffer 330.

In the OF-2 symmetric filter by the expression (37), the first expression for obtaining the pixel p2' and the sixth expression for obtaining the pixel q2' in the expression (33) are lacked.

In addition, the OF-2 symmetric filter by the expression (37) is a filter obtained by substituting the pixel p1 on the horizontal boundary side for the pixels p2 and p3 in the expression for obtaining the pixels p1', p0', and q0' in the expression (33). Therefore, a tap coefficient for the pixel p1 in the expression for obtaining the pixel p1' in the expression (37) is changed from 2 in the expression (33) to 5 (=2+1+2). In addition, a tap coefficient for the pixel p1 in the expression for obtaining the pixel p0' in the expression (37) is changed from 1 in the expression (33) to 3 (=1+1+1), and a tap coefficient for the pixel p1 in the expression for obtaining the pixel q0' in the expression (37) is changed from 1 in the expression (33) to 2 (=1+1).

In addition, the OF-2 symmetric filter by the expression (37) is a filter obtained by substituting the pixel q1 on the horizontal boundary side for the pixels q2 and q3 in the expression for obtaining the pixels q0' and q1' in the expression (33). Therefore, a tap coefficient for the pixel q1 in the expression for obtaining the pixel q0' in the expression (37) is changed from 1 in the expression (33) to 3 (=1+1+1). In addition, a tap coefficient for the pixel q1 in the expression for obtaining the pixel q1' in the expression (37) is changed from 1 in the expression (33) to 3 (=1+1+1), and a tap coefficient for the pixel p1 in the expression for obtaining the pixel q0' in the expression (37) is changed from 2 in the expression (33) to 5 (=2+1+2).

Accordingly, in the case where the OF-2 symmetric filter is adopted as the filter NC1, a capacity for 2 pixel lines of the pixels p0 to p1 in the block Bp which is on the upper side of the horizontal boundary is needed as the storage capacity of the line buffer 330.

Here, pixels for use in the case where the OF-2 symmetric filter is adopted as the filter NC1 are the pixels p0 to p1 in the block Bp and the pixels q0 to q1 in the block Bq. These pixels are symmetric with respect to the horizontal boundary (the OF-2 symmetric filter is a symmetric filter).

<Case of Adopting, as Filter NC1 Filter, Filter Based on Filter Y2>

FIG. 19 is a diagram depicting the filter NC1 and pixels required in a case where a filter that is based on the filter Y2 is adopted as the filter NC1.

The filter NC1 that is based on the filter Y2 is a Y2 normal filter, a Y2-1 asymmetric filter, or a Y2-1 symmetric filter.

In a case where the Y2 normal filter is adopted as the filter NC1, the filter application determination is made in a manner similar to the case of the Y1 normal filter, that is, in a manner similar to the luminance component application determination in the expression (20).

Therefore, application determination pixels of color-difference components for use in the filter application determination are 6 pixels which are the pixels p0 to p2 and q0 to q2, as in the case of the Y1 normal filter.

As a result, for the filter application determination in the case where the horizontal boundary is a CTU boundary, a capacity for 3 pixel lines of the pixels p0 to p2 in the block Bp which is on the upper side of the horizontal boundary is needed as the storage capacity of the line buffer 330.

In the case where the Y2 normal filter is adopted as the filter NC1, a determination conforming to a standard weak determination of determining whether or not to apply a weak filter to a luminance component in HEVC is made during the filter type determination.

Here, in the standard weak determination, whether or not the expression (38) is satisfied, and further, whether or not the expression (39) and the expression (40) are satisfied, if needed, are determined.

$$|(9*(q0,i-p0,i)-3*(q1,i-p1,i)+8)>>4|<tc*10 \qquad (38)$$

$$|pb2,0-2*p1,0+p0,0|+|p2,3-2*p1,3+p0,3|<(\text{beta}+(\text{beta}>>1))>>3 \qquad (39)$$

$$|q2,0-2*q1,0+q0,0|+|q2,3-2*q1,3+q0,3|<(\text{beta}+(\text{beta}>>1))>>3 \qquad (40)$$

In the standard weak determination, first, a weak on/off determination of determining whether or not the expression (38) is satisfied is made for each line (row) in the blocks Bp and Bq. Then, in a case where there is a line for which the expression (38) is satisfied as a result of the weak on/off determination, a p1 determination of determining whether or not the expression (39) is satisfied, and a q1 determination of determining whether or not the expression (40) is satisfied are made with use of the first line and the fourth line.

In the standard weak determination, in a case where the p1 determination by the expression (39) is satisfied, a pixel $p_i$, of the block Bp, in the line satisfying the weak on/off determination by the expression (38) is set as a pixel which can be a target pixel. Similarly, in a case where the q1 determination by the expression (40) is satisfied, the pixel $q_i$, of the block Bq, in the line satisfying the weak on/off determination by the expression (38) is set as a pixel which can be a target pixel.

In the filter type determination of the Y2 normal filter, a determination conforming to the standard weak determination of determining whether or not to apply a weak filter to a luminance component in HEVC is made.

That is, during the filter type determination of the Y2 normal filter, whether or not an expression (41) is satisfied, and further, whether or not the expression (39) and the expression (40) are satisfied, if needed, are determined.

$$|(9*(q0-p0)-3*(q1-p1)+8)>>4|<tc*10 \qquad (41)$$

$$|p2-2*p1+p0|<(\text{beta}+(\text{beta}>>1))>>4 \qquad (42)$$

$$|q2-2*q1+q0|<(\text{beta}+(\text{beta}>>1))>>4 \qquad (43)$$

During the filter type determination of the Y2 normal filter, first, a weak on/off determination of determining whether or not the expression (41) is satisfied is made for each of 2 lines (rows) of pixels of color-difference components in the blocks Bp and Bq. Then, in a case where there is a line for which the expression (41) is satisfied as a result of the weak on/off determination, a p1 determination of determining whether or not the expression (42) is satisfied for one line (e.g., the first line) of the 2 lines of pixels of color-difference components in the blocks Bp and Bq, and a q1 determination of determining whether or not the expression (43) is satisfied are made.

During the filter type determination of the Y2 normal filter, in a case where the p1 determination by the expression (42) is satisfied, the pixel $p_i$, of the block Bp, in the line (row) for which the weak on/off determination by the expression (41) is set as a pixel which can be a target pixel. Similarly, in a case where the q1 determination by the expression (43) is satisfied, the pixel $q_i$, of the block Bq, in the line for which the weak on/off determination by the expression (41) is satisfied is set as a pixel which can be a target pixel.

In the filter NC2 that is based on the filter Y2, only pixels set as pixels which can be target pixels become target pixels, and filtered pixels are desired.

From the expression (41) to the expression (43), type determination pixels of color-difference components for use in the filter type determination of the Y2 normal filter are 6 pixels which are the pixels p0 to p2 and q0 to q2.

As a result, for the filter type determination in the case where the horizontal boundary is a CTU boundary, a capacity for 3 pixel lines of the pixels p0 to p2 in the block Bp which is on the upper side of the horizontal boundary is needed as the storage capacity of the line buffer 330.

A weak filter for a luminance component in HEVC can be adopted as the Y2 normal filter. In this case, the Y2 normal filter is expressed by an expression (44).

$$D=\text{Clip3}(-tC,tC,D), D=(9*(q0-p0)-3*(q1-p1)+8)>>4$$

$$p0'=\text{Clip1}C(p0+D)$$

$$q0'=\text{Clip1}C(q0-D)$$

$$Dp=\text{Clip3}(-(tC>>1),tC>>1,(((p2+p0+1)>>1)-p1+D)>>1)$$

$$p1'=\text{Clip1}C(p1+Dp)$$

$$Dq=\text{Clip3}(-(tC>>1),tC>>1,(((q2+q0+1)>>1)-q1-D)>>1)$$

$$q1'=\text{Clip1}C(q1+Dq) \qquad (44)$$

Here, Clip1C(A) is set as Clip1C(A)=Clip(0,(1>>BC)−1, A) when BC is defined to represent the number of bits of color-difference components.

Filter constituting pixels of color-difference components for use in the filtering process using the Y2 normal filter by the expression (44) are 6 pixels which are the pixels p0 to p2 and q0 to q2. In addition, target pixels of color-difference components to be subjected to the filtering process are 4 pixels of the pixels p0 to p1 and q0 to q1.

Therefore, for the filtering process of the Y2 normal filter in the case where the horizontal boundary is a CTU boundary, a capacity for 3 pixel lines of the pixels p0 to p2 in the block Bp which is on the upper side of the horizontal boundary is needed as the storage capacity of the line buffer 330.

Accordingly, in the case where the Y2 normal filter is adopted as the filter NC1, a capacity for 3 pixel lines of the pixels p0 to p2 in the block Bp which is on the upper side of the horizontal boundary is needed as the storage capacity of the line buffer 330.

In the case where the Y2-1 asymmetric filter is adopted as the filter NC1, whether or not the expression (217) is satisfied is determined during the filter application determination, as in the case of the Y1-2 asymmetric filter.

Therefore, application determination pixels of color-difference components for use in the filter application determination of the Y2-1 asymmetric filter are 5 pixels which are the pixels p0 to p1 and q0 to q2, as in the case of the Y1-2 asymmetric filter.

As a result, for the filter application determination in the case where the horizontal boundary is a CTU boundary, a capacity for 2 pixel lines of the pixels p0 to p1 in the block Bp which is on the upper side of the horizontal boundary is needed as the storage capacity of the line buffer 330.

In the case where the Y2-1 asymmetric filter is adopted as the filter NC1, whether or not an expression (45) to an expression (47) obtained by substituting the pixel p1 on the horizontal boundary side for the pixel p2 in the expression (41) to the expression (43) of the filter type determination of the Y2 normal filter are satisfied is determined during the filter type determination.

$$|(9*(q0-p0)-3*(q1-p1)+8)>>4|<tc*10 \qquad (45)$$

$$|p1-2*p1+p0|<(beta+(beta>>1))>>4=|p0-p1|<(beta+(beta>>1))>>4 \qquad (46)$$

$$|q2-2*q1+q0|<(beta+(beta>>1))>>4 \qquad (47)$$

The expression (45) indicates the weak on/off determination. The expression (46) and the expression (47) indicate the p1 determination and the q1 determination, respectively.

The filter type determination of the Y2-1 asymmetric filter is similar to the filter type determination of the Y2 normal filter, except for the point of using the expression (45) to the expression (47) in place of the expression (41) to the expression (43). Therefore, an explanation of the filter type determination of the Y2-1 asymmetric filter is omitted.

From the expression (45) to the expression (47), type determination pixels of color-difference components for use in the filter type determination of the Y2-1 asymmetric filter are 5 pixels which are the pixels p0 to p1 and q0 to q2.

As a result, for the filter type determination in the case where the horizontal boundary is a CTU boundary, a capacity for 2 pixel lines of the pixels p0 to p1 in the block Bp which is on the upper side of the horizontal boundary is needed as the storage capacity of the line buffer 330.

A filter expressed by an expression (48) obtained by substituting the pixel p1 on the horizontal boundary side for the pixel p2 in the expression (44) for the Y2 normal filter can be adopted as the Y2-1 asymmetric filter.

$$D=Clip3(-tC,tC,D), D=(9*(q0-p0)-3*(q1-p1)+8)>>4$$

$$p0'=Clip1C(p0+D)$$

$$q0'=Clip1C(q0-D)$$

$$Dp=Clip3(-(tC>>1),tC>>1,(((p1+p0+1)>>1)-p1+D)>>1)$$

$$p1'=Clip1C(p1+Dp)$$

$$Dq=Clip3(-(tC>>1),tC>>1,(((q2+q0+1)>>1)-q1-D)>>1)$$

$$q1'=Clip1C(q1+Dq) \qquad (48)$$

Filter constituting pixels of color-difference components for use in the filtering process using the Y2-1 asymmetric filter by the expression (48) are 5 pixels which are the pixels p0 to p1 and q0 to q2. In addition, target pixels of color-difference components to be subjected to the filtering process are 4 pixels which are the pixels p0 to p1 and q0 to q1.

Therefore, for the filtering process using the Y2-1 asymmetric filter in the case where the horizontal boundary is a CTU boundary, a capacity for 2 pixel lines of the pixels p0 to p1 in the block Bp which is on the upper side of the horizontal boundary is needed as the storage capacity of the line buffer 330.

Accordingly, in the case where the Y2-1 asymmetric filter is adopted as the filter NC1, a capacity for 2 pixel lines of the pixels p0 to p1 in the block Bp which is on the upper side of the horizontal boundary is needed as the storage capacity of the line buffer 330.

Here, pixels for use in the case where the Y2-1 asymmetric filter is adopted as the filter NC1 are the pixels p0 to p1 in the block Bp and the pixels q0 to q2 in the block Bq. These pixels are asymmetric with respect to the horizontal boundary.

In the case where the Y2-1 symmetric filter is adopted as the filter NC1, whether or not the expression (30) is satisfied is determined in the filter application determination, as in the case of the Y1-2 symmetric filter.

Therefore, application determination pixels of color-difference components for use in the filter application determination of the Y2-1 symmetric filter are 4 pixels which are the pixels p0 to p1 and q0 to q1, as in the case of the Y1-2 symmetric filter.

As a result, for the filter application determination in the case where the horizontal boundary is a CTU boundary, a capacity for 2 pixel lines of the pixels p0 to p1 in the block Bp which is on the upper side of the horizontal boundary is needed as the storage capacity of the line buffer 330.

In the case where the Y2-1 symmetric filter is adopted as the filter NC1, whether or not an expression (49) to an expression (51) obtained by substituting the pixel p1 on the horizontal boundary side for the pixel p2 in the expression (41) to the expression (43) for the filter type determination of the Y2 normal filter, and substituting the pixel q1 on the horizontal boundary side for the pixel q2, are satisfied is determined during the filter type determination.

$$|(9*(q0-p0)-3*(q1-p1)+8)>>4|<tc*10 \qquad (49)$$

$$|p1-2*p1+p0|<(beta+(beta>>1))>>4=|p0-p1|<(beta+(beta>>1))>>4 \qquad (50)$$

$$|q1-2*q1+q0|<(beta+(beta>>1))>>4=|q0-q1|<(beta+(beta>>1))>>4 \qquad (51)$$

The expression (49) indicates a weak on/off determination. The expressions (50) and (51) indicate a p1 determination and a q1 determination, respectively.

The filter type determination of the Y2-1 symmetric filter is similar to the filter type determination of the Y2 normal filter, except for the point of using the expression (49) to the expression (51) in place of the expression (41) to the expression (43). Thus, an explanation of the filter type determination of the Y2-1 symmetric filter is omitted.

From the expression (49) to the expression (51), type determination pixels of color-difference components for use in the filter type determination of the Y2-1 symmetric filter are 4 pixels which are the pixels p0 to p1 and q0 to q1.

As a result, for the filter type determination in the case where the horizontal boundary is a CTU boundary, a capacity for 2 pixel lines of the pixels p0 to p1 in the block Bp which is on the upper side of the horizontal boundary is needed as the storage capacity of the line buffer 330.

A filter expressed by an expression (52) obtained by substituting the pixel p1 on the horizontal boundary side for the pixel p2 in the expression (44) for the Y2 normal filter, and substituting the pixel q1 on the horizontal boundary side for the pixel q2, can be adopted as the Y2-1 symmetric filter.

$$D=\text{Clip3}(-tC,tC,D), D=(9*(q0-p0)-3*(q1-p1)+8)>>4$$

$$p0'=\text{Clip1}C(p0+D)$$

$$q0'=\text{Clip1}C(q0-D)$$

$$Dp=\text{Clip3}(-(tC>>1),tC>>1,(((p1+p0+1)>>1)-p1+D)>>1)$$

$$p1'=\text{Clip1}C(p1+Dp)$$

$$Dq=\text{Clip3}(-(tC>>1),tC>>1,(((q1+q0+1)>>1)-q1-D)>>1)$$

$$q1'=\text{Clip1}C(q1+Dq) \quad (52)$$

Filter constituting pixels of color-difference components for use in the filtering process using the Y2-1 symmetric filter by the expression (52) are 4 pixels which are the pixels p0 to p1 and q0 to q1. In addition, target pixels of color-difference components to be subjected to the filtering process are 4 pixels which are the pixels p0 to p1 and q0 to q1.

Accordingly, for the filtering process using the Y2-1 symmetric filter in the case where the horizontal boundary is a CTU boundary, a capacity for 2 pixel lines of the pixels p0 to p1 of the block Bp which is on the upper side of the horizontal boundary is needed as the storage capacity of the line buffer 330.

Accordingly, in the case where the Y2-1 symmetric filter is adopted as the filter NC1, a capacity for 2 pixel lines of the pixels p0 to p1 in the block Bp which is on the upper side of the horizontal boundary is needed as the storage capacity of the line buffer 330.

Here, pixels for use in the case where the Y2-1 symmetric filter is adopted as the filter NC1 are the pixels p0 to p1 in the block Bp and the pixel q0 to q1 in the block Bq. These pixels are symmetric with respect to the horizontal boundary.

As explained so far, the present technology can provide various filters as DFs.

<Application Method of Filter NC1>

FIG. 20 is a diagram depicting examples of an application method for applying the filter NC1 to a decoded image.

Here, the term "filter characteristic" comprehensively defines a filter characteristic such as a filter strength, a filter constituting pixel, the value of a filter coefficient, the tap length of a filter, or the (symmetric/asymmetric) shape of a filter. The term refers to a filter characteristic caused by a filter parameter for use in filtering or by an encoding parameter (e.g., quantization parameter) that is relevant to the filter characteristic. In addition, the expression "changing a filter characteristic" means changing a filter characteristic itself, and includes changing a filter strength, a filter constituting pixel, the value of a filter coefficient, the tap length of a filter, the (symmetric/asymmetric) shape of a filter, and the like. In addition, the expression "changing a filter characteristic" encompasses changing a filter parameter or an encoding parameter (e.g., quantization parameter) that is relevant to the filter characteristic. In addition, the expression "reducing (Reduction/Reduce) a filter characteristic encompasses reducing a filter characteristic such as a filter strength, a filter constituting pixel, the value of a filter coefficient, the tap length of a filter, or the (symmetric/asymmetric) shape of a filter (in a functional manner by taking an implementation cost such as the capacity of a line buffer into consideration). In addition, the expression "reducing (Reduction/Reduce) a filter characteristic further encompasses changing a filter parameter or an encoding parameter (e.g., quantization parameter) that is relevant to the filter characteristic (in a functional manner by taking an implementation cost such as the capacity of a line buffer into consideration). Moreover, a filter having a reduced filter characteristic is referred to as a reduction filter or a reduced filter.

FIG. 20 depicts the filter NC1 which is applied to a CTU boundary, the filter NC1 which is applied to an internal boundary, the difference in the image quality between a portion of the CTU boundary and a portion of the internal boundary in a case of applying the filter NC1, and a storage capacity (Line buffer size) necessary for the line buffer 330.

Here, the Y1-1 asymmetric filter, the Y1-1 symmetric filter, the Y1-2 asymmetric filter, and the Y1-2 symmetric filter depicted in FIG. 17 each have filter constituting pixels less than in the Y1 normal filter, and thus, are filters each having a degraded (reduced) filter characteristic (filter strength). Therefore, the Y1-1 asymmetric filter, the Y1-1 symmetric filter, the Y1-2 asymmetric filter, and the Y1-2 symmetric filter can be regarded as reduced filters each having a reduced filter characteristic with respect to the Y1 normal filter.

In addition, the OF-1 asymmetric filter, the OF-1 symmetric filter, the OF-2 asymmetric filter, and the OF-2 symmetric filter depicted in FIG. 18 each have less filter constituting pixels than the OF normal filter, and thus, are filters each having a degraded (reduced) filter characteristic (filter strength). Therefore, the OF-1 asymmetric filter, the OF-1 symmetric filter, the OF-2 asymmetric filter, and the OF-2 symmetric filter can be regarded as reduced filters each having a reduced filter characteristic with respect to the OF normal filter.

In addition, the Y2-1 asymmetric filter and the Y2-1 symmetric filter depicted in FIG. 19 each have filter constituting pixels less than the Y2 normal filter, and thus, are filters each having a degraded (reduced) filter characteristic (filter strength). Therefore, the Y2-1 asymmetric filter and the Y2-1 symmetric filter can be regarded as reduced filters each having a reduced filter characteristic with respect to the Y2 normal filter.

It is assumed that the Y1 normal filter, the OF normal filter, and the Y2 normal filter are defined as normal filters. A reduced filter has a lower filter strength than the normal filters, but has less filter constituting pixels (on the p-side).

Accordingly, a storage capacity necessary for the line buffer 330 becomes small, compared to the normal filters.

Meanwhile, in order to sufficiently eliminate block noise, application of the filter NC1 having a high filter strength (filter characteristic) is demanded to a block boundary between blocks of a large block size, that is, a CTU boundary or an internal boundary.

However, if a normal filter having a high filter strength is adopted as the filter NC1, a storage capacity necessary for the line buffer 330 becomes large at a CTU boundary because there are many filter constituting pixels (on the p-side) in the normal filter.

Accordingly, a reduced filter having less filter constituting pixels (on the p-side) can adopted as the filter NC1 to a CTU boundary. In this case, a storage capacity necessary for the line buffer 330 can be suppressed. In the third line and later in FIG. 20, a reduced filter is applied to a CTU boundary in order to suppress a storage capacity necessary for the line buffer 330.

On the other hand, application of the filter NC1 to an internal boundary does not affect a storage capacity necessary for the line buffer 330. Therefore, a normal filter having many filter constituting pixels but having a high filter strength can be applied as the filter NC1 to an internal boundary. In this case, block noise can be sufficiently eliminated.

It is to be noted that, if a reduced filter and a normal filter are applied to a CTU boundary and an internal boundary, respectively, the difference in the image quality between the CTU boundary and the internal boundary can be generated due to the difference in the filter strength between the reduced filter and the normal filter.

To this end, a reduced filter similar to that for a CTU boundary can be applied to an internal boundary. In this case, generation of the difference in the image quality between the CTU boundary and the internal boundary can be inhibited.

Which one of the filters illustrated in FIGS. 17 to 19 is to be applied (selected) as the filter NC1 to the block boundary, is controlled by the control section 340 (FIG. 11).

For example, to apply a DF strongly on average in one screen, DFs of different filter designs can be applied to a CTU boundary and an internal boundary, that is, a reduced filter and a normal filter can be applied to a CTU boundary and an internal boundary, respectively.

In addition, to apply a DF uniformly in one screen, DFs of the same filter design can be applied to a CTU boundary and an internal boundary, that is, a reduced filter can be applied to a CTU boundary and an internal boundary.

FIG. 21 is a diagram depicting other examples of the application method for applying the filter NC1 to a decoded image.

For example, in the first line in FIG. 21, as the filter NC1, the filter C1 (FIG. 14) for color-difference components in HEVC is applied to a p-side of the CTU boundary, and the Y1 normal filter is applied to a q-side. Moreover, as the filter NC1, the Y1 normal filter is applied to the p-side and the q-side of the internal boundary.

As explained so far, in the present technology, as the filter NC1 (second color-difference filter) having a higher filter strength than the filter NC2 (first color-difference filter), the Y1-1 asymmetric filter, etc., (reduced second luminance filter) having a reduced filter characteristic with respect to a strong filter, etc., (second luminance filter) for a luminance component, the strong filter having a higher filter strength than a weak filter, etc., (first luminance filter) for a luminance component, or the Y2-1 asymmetric filter, etc., (reduced first luminance filter) having a reduced filter characteristic with respect to the first luminance filter can be applied to pixels of color-difference components located around a block boundary in a decoded image.

Moreover, in the present technology, the reduced second luminance filter can be a reduced second luminance vertical filter that executes the reduced second luminance filter in a vertical direction, and the second color-difference filter can be a second color-difference vertical filter that executes the second color-difference filter in a vertical direction.

Moreover, in the present technology, the reduced second luminance vertical filter can be a filter obtained by changing a filter coefficient or a clip parameter from that in the second luminance filter.

Moreover, in the present technology, the reduced second luminance vertical filter can be an asymmetric filter obtained by reducing a filter characteristic of a filter to be applied to a pixel located on the upper side of a block boundary.

Moreover, in the present technology, a strong filter for a luminance component conforming to the H,265/HEVC standard can be used as the second luminance filter.

Moreover, in the present technology, a reduced first luminance vertical filter that executes the reduced first luminance filter in the vertical direction can be used as the reduced first luminance filter.

In addition, in the present technology, the control section 340 can control the DF 300 (filtering section) such that the reduced second luminance vertical filter is applied, as the second color-difference vertical filter, to a block boundary of a coding tree block of a fixed size by a sequence unit.

Moreover, in the present technology, the control section 340 can control the filtering section such that the reduced second luminance vertical filter is applied, as the second color-difference vertical filter, to a block boundary of a block divided from a coding tree block.

In addition, in the present technology, the control section 340 can control the filtering section such that a second luminance vertical filter that executes the second luminance filter in a vertical direction is applied, as the second color-difference vertical filter, to a block boundary of a block divided from a coding tree block.

<Explanation of Computer to which Present Technology Is Applied>

Next, a series of the aforementioned processes can be executed by hardware or by software. In a case where a series of the processes is executed by software, a program constituting the software is installed into a general purpose computer or the like.

Figure 22:
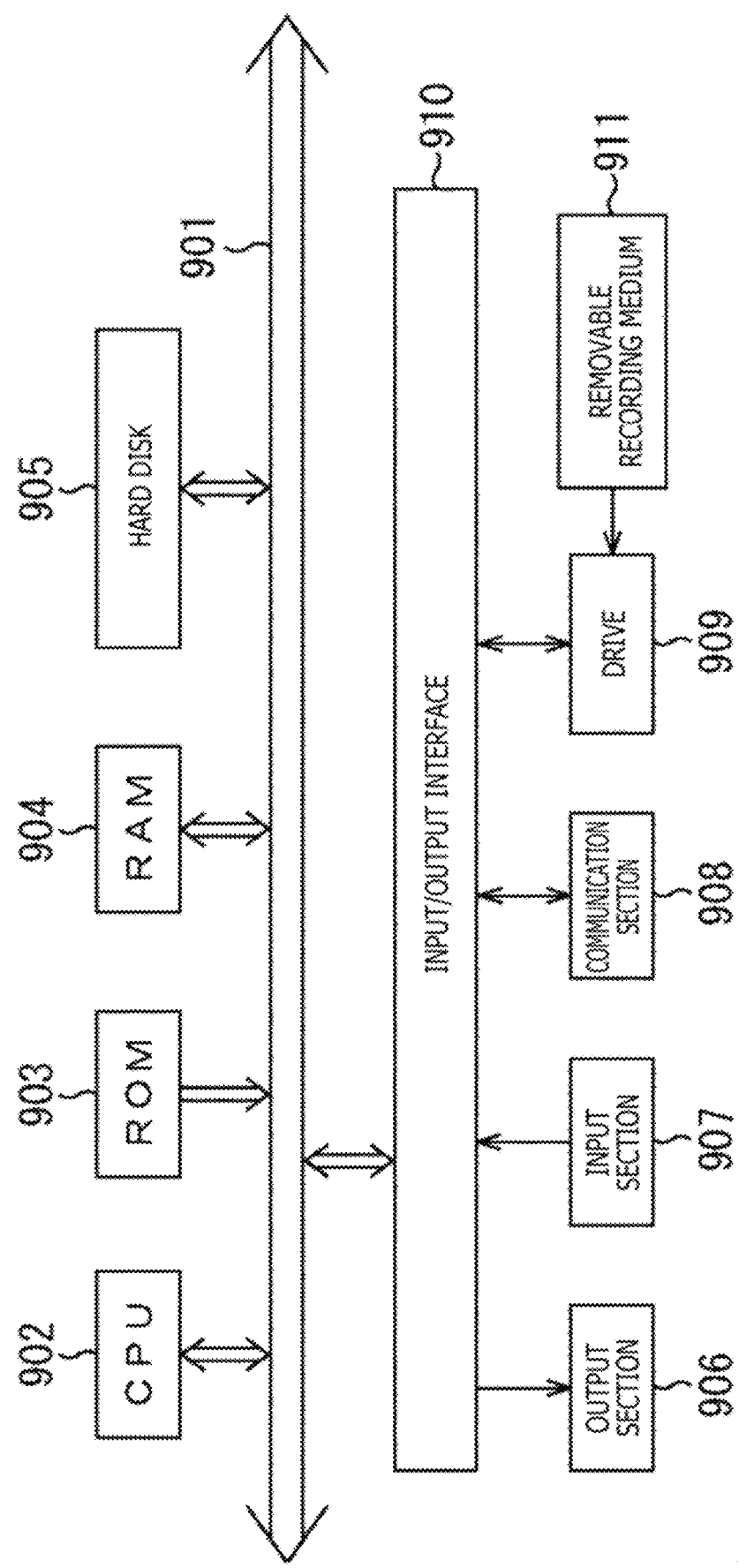
FIG. 22 is a block diagram depicting a configuration example of one embodiment of a computer.

FIG. 22 is a block diagram depicting a configuration example of one embodiment of a computer to which a program for executing a series of the aforementioned processes is installed.

The program can be previously recorded in a ROM 903 or a hard disk 905 which is a recording medium included in the computer.

Alternatively, the program can be stored (recorded) in a removable recording medium 911 that is driven by a drive 909. The removable recording medium 911 described above can be provided in a form of what is generally called package software. Here, examples of the removable recording medium 911 include a flexible disk, a CD-ROM (Compact Disc Read Only Memory), an MO (Magneto Optical) disk, a DVD (Digital Versatile Disc), a magnetic disk, and a semiconductor memory.

It is to be noted that the program can be downloaded to the computer over a communication network or a broadcasting network and be installed into an inner hard disk 905, instead of being installed into the computer through the aforementioned removable recording medium 911. That is, the program can be transferred from a download site to the computer in a wireless manner over an artificial satellite for digital satellite broadcasting, or can be transferred to the computer in a wired manner over a network such as a LAN (Local Area Network) or the internet.

The computer incorporates a CPU (Central Processing Unit) 902. An input/output interface 910 is connected to the CPU 902 via a bus 901.

Upon receiving, via the input/output interface 910, an instruction based on an operation performed on an input section 907 by a user, the CPU 902 executes the program stored in the ROM (Read Only Memory) 903 according to the instruction. Alternatively, the CPU 902 loads the program stored in the hard disk 905 into a RAM (Random Access Memory) 904, and executes the program.

Accordingly, the CPU 902 executes the processes following the aforementioned flowcharts, or executes processes to be executed by the configuration in the aforementioned block diagrams. Then, if needed, the CPU 902 outputs the process result from an output section 906 via the input/output interface 910, for example, or transmits the process result from a communication section 908, and further, records the process result in the hard disk 905, for example.

It is to be noted that the input section 907 includes a keyboard, a mouse, a microphone, or the like. In addition, the output section 906 includes an LCD (Liquid Crystal Display), a loudspeaker, or the like.

Here, in the present description, the processes to be executed by the computer according to the program herein do not necessarily need to be executed in the time-series order explained with reference to the flowcharts. That is, the processes to be executed by the computer according to the program include processes (e.g., parallel process or process using an object) that are executed parallelly or separately.

Further, the program may be processed by one computer (processor), or may be distributedly processed by a plurality of computers. Moreover, the program may be transferred to a remote computer, and be executed there.

In addition, the term "system" in the present description means a set of multiple constituent components (devices, modules (components, etc.), whether or not all the constituent components are included in the same casing does not matter. Therefore, a set of multiple devices that are housed in different casings and are connected over a network is a system, and further, single device having multiple modules housed in a single casing is also a system.

5. CONCLUSION

As explained so far, a deblocking filter according to the embodiment of the present disclosure can be more appropriately applied to a color-difference component in a decoded image.

The preferable embodiments of the present disclosure have been explained in detail with reference to the attached drawings. However, the technical scope of the present disclosure is not limited to these embodiments. A person who is skilled in the art concerning the technical field of of the present disclosure, apparently could conceive of various changes or modifications within the technical concept recited in the claims. It is naturally understood that such changes or modifications are included in the technical scope of the present disclosure.

(Color Difference-Related Parameter)

For example, in the present embodiment, an example in which a flag indicating the presence/absence of a significant coefficient of color-difference components in each TU is used as a color difference-related parameter has been explained. However, the present technology is not limited to this example. For example, a transformation coefficient itself for color-difference components may be included in the color difference-related parameters. In this case, the boundary strength calculation section 261 may calculate a bS by determining the presence/absence of a significant coefficient of color-difference components in each TU on the basis of a transformation coefficient for color-difference components. In addition, regarding the above embodiment, FIG. 4 depicts an example in which the value of a bS varies according to not only whether or not the condition B1-Y, B1-U, or B1-V is satisfied, but also whether or not the condition B2 is satisfied. However, as in an alternative example depicted in FIG. 14, a determination on whether the condition B2 is satisfied for both the color-difference components U and V may be omitted in order to inhibit an increase in the process cost, for example.

(Threshold for Large Block Determination)

In the aforementioned embodiment, the example in which the threshold for use in the large block determination is 16 has been explained. However, the present technology is not limited to this example. The threshold may be set to 8 or 32. In addition, a threshold equal to or greater than a threshold that is used in the YUV420 format may be used in the large block determination in the case of the YUV444 format.

(Strong Filter)

In the above embodiments, the example of applying a strong filter expressed by the expressions (15) to (19) to color-difference components has been explained. However, a strong filter which is applied in the present technology is not limited to this example. The strong filter which is applied to color-difference components is only required to be a filter having a higher filter strength than a weak filter. For example, a strong filter that is applied to a color-difference component in NPL 1 (a strong filter that is applied to a luminance component in HEVC) may be applied to a color-difference component in the present technology.

(Application Targets of Present Technology)

The present technology is applicable to any image encoding/decoding scheme. That is, specifications of various image encoding/decoding-related processes such as transformation (inverse transformation), quantization (inverse quantization), encoding (decoding), and prediction are defined as desired, and are not limited to the aforementioned embodiment as far as there is no inconsistency with the aforementioned present technology. Further, a part of these processes may be omitted as far as there is no inconsistency with the aforementioned present technology.

(Block)

In addition, in the present description, the term "block" (which is not a block indicating a processing section) used as a partial region of an image (picture) or a process unit in the explanation, refers to any partial region in the picture unless otherwise mentioned, and the size, shape, and characteristic, etc., of the region are not limited to particular ones. For example, it is assumed that "blocks" include any partial areas (process unit) such as a TB (Transform Block), a TU (Transform Unit), a PB (Prediction Block), a PU (Prediction Unit), an SCU (Smallest Coding Unit), a CU (Coding Unit), an LCU (Largest Coding Unit), a CTB (Coding Tree Block), a CTU (Coding Tree Unit), a transformation block, a sub-block, a macro block, a tile, and a slice, which are described in the reference documents REF1 to REF3 described above.
(Process Unit)

In the aforementioned explanation, a data unit by which various information is set or a data unit in various processes is determined as desired, and thus, is not limited to those in the aforementioned embodiment. For example, the information or processes may be set for each TU (Transform Unit), TB (Transform Block), PU (Prediction Unit), PB (Prediction Block), CU (Coding Unit), LCU (Largest Coding Unit), sub-block, block, tile, slice, picture, sequence, or component, or data by a data unit thereof may be a target. Needless to say, such a data unit can be set for each piece of information or for each process. The data units for all information or processes are not necessarily unified. It is to be noted that a storage place of the information is determined as desired, and thus, the information may be stored in a header of the aforementioned data unit, a parameter set, or the like. Also, the information may be stored in a plurality of places.

In addition, in the aforementioned embodiment, a deblocking filtering process of color-difference components is performed for every 2 lines. However, the present technology is not limited to this embodiment. For example, in the case of the YUV444 format, a deblocking filtering process of color-difference components may be performed for every 4 lines. In this case, the application necessity/unnecessity determination section 265 may make the determination by referring to the first line and the third line during the determination of the aforementioned condition C3.
(Control Information)

Control information concerning the present technology explained above may be transmitted from the encoding side to the decoding side. For example, control information (e.g., enabled_flag) for controlling whether or not to permit (or prohibit) application of the aforementioned present technology may be transmitted. Alternatively, for example, control information indicating a target to which the aforementioned present technology is applied (or a target to which the aforementioned present technology is not applied) may be transmitted. For example, control information for designating (the upper limit or the lower limit of, or both the upper limit and the lower limit of) a block size, a frame, a component, a layer, or the like, to which the present technology is applied (or for which the application is permitted or prohibited) may be transmitted.
(Block Size Information)

When the size of a block to which the present technology is applied is designated, the block size may be directly designated, or the block size may be indirectly designated. For example, the block size may be designated with identification information for identifying a size. Alternatively, for example, the block size may be designated on the basis of the ratio to or the difference from the size of a reference block (e.g., LCU or SCU). For example, in a case where information for designating the block size is transmitted as a syntax element or the like, information for indirectly designing the size in the aforementioned manner may be used. Accordingly, the information amount of the information can be reduced, and the encoding efficiency can be further improved, in some cases. In addition, designing such a block size encompasses designing the range of the block size (e.g., designing an allowable range of the block size).
(Others)

It is to be noted that the term "flag" in the present description refers to information for identifying a plurality of states, and includes not only information for identifying two states, that is, a true (1) or a false (0), but also information for identifying three or more states. Therefore, a value that a "flag" can take may be one of two values 1/0, or may be one of three or more values. That is, the number of bits constituting a "flag" is defined as desired, and thus, may be 1 or two or greater. In addition, regarding identification information (including a flag), the identification information may be included in a bitstream, or difference information regarding the identification information from certain reference information may be included in a bitstream. Therefore, the term "flag" or "identification information" in the present description includes not only information regarding the "flag" or "identification information," but also difference information from reference information.

In addition, various information (e.g., meta data) related to encoded data (bitstream) may be transmitted or recorded in any form as long as the information is associated with the encoded data. Here, the term "associate" means allowing usage (linkage) of one data set when processing the other data set, for example. That is, data sets associated with each other may be combined into one data set, or may be separate data sets. For example, information associated with encoded data (image) may be transmitted over a transmission path different from that for the encoded data (image). In addition, for example, information associated with encoded data (image) may be recorded in a recording medium different from that for the encoded data (image) (or in a recording area, in the same recording medium, different from that for the encoded data (image)). It is to be noted that "association" may be performed not on the entirety of data but on a part of data. For example, an image and information corresponding to the image may be associated with each other by any unit such as multiple frames, one frame, or a part of a frame.

It is to be noted that the terms "combining," "multiplexing," "adding," "integrating," "including," "storing," "putting into," "introducing," and "inserting" in the present description mean combining multiple items into one, such as combining encoded data and metadata into one data set, and thus, mean one method for the aforementioned "association."

The present technology can be implemented as any configuration constituting a device or a system, such as a processor as a system LSI (Large Scale Integration) or the like, a module using a plurality of processors, etc., a unit using a plurality of processors, etc., or a set (i.e., a partial configuration of a device) obtained by adding any other functions to a unit.

It is to be noted that the embodiments according to the present technology are not limited to the aforementioned one, and various changes can be made within the scope of the gist of the present technology.

For example, the present technology can be configured by cloud computing in which one function is shared and cooperatively processed by a plurality of devices over a network.

In addition, the steps having been explained with reference to the aforementioned flowcharts can be executed by one device, or can be shared and executed by a plurality of devices.

Further, in a case where a plurality of processes is included in one step, the plurality of processes included in the one step can be executed by one device, or can be shared and executed by a plurality of devices.

Moreover, the effects described in the present description are just examples, and thus, are not limited. Therefore, any other effects may be provided.

REFERENCE SIGNS LIST

10: Image encoding device
16: Lossless encoding section
26: Deblocking filter (DF)
60: Image decoding device
62: Lossless decoding section
261: Boundary strength calculation section
263: Determination section
265: Application necessity/unnecessity determination section
267: Filter strength determination section
269: Filtering section
300: DF
310: Determination section
311: Application necessity/unnecessity determination section
312: Filter strength determination section
320: Filtering section
330: Line buffer
340: Control section
901: Bus
902: CPU
903: ROM
904: RAM
905: Hard disk
906: Output section
907: Input section
908: Communication section
909: Drive
910: Input/output interface
911: Removable recording medium

The invention claimed is:

1. An image processing device comprising:
a decoding section that generates a decoded image by performing a decoding process of a bitstream; and
a filtering section that applies, as a second color-difference filter having a higher filter strength than a first color-difference filter, a reduced second luminance filter or a reduced first luminance filter to a pixel of a color-difference component located around a block boundary in the decoded image having undergone the decoding process by the decoding section, the reduced second luminance filter having a reduced filter characteristic with respect to a second luminance filter having a higher filter strength than a first luminance filter, the reduced first luminance filter having a reduced filter characteristic with respect to the first luminance filter.

2. The image processing device according to claim 1, wherein
the reduced second luminance filter is a reduced second luminance vertical filter that executes the reduced second luminance filter in a vertical direction, and
the second color-difference filter is a second color-difference vertical filter that executes the second color-difference filter in the vertical direction.

3. The image processing device according to claim 2, wherein
the reduced second luminance vertical filter is a filter in which a filter coefficient or a clip parameter is changed with respect to the second luminance filter.

4. The image processing device according to claim 2, wherein
the reduced second luminance vertical filter is an asymmetric filter in which a filter characteristic of a filter to be applied to a pixel located on an upper side of a block boundary is reduced.

5. The image processing device according to claim 2, wherein
the reduced first luminance filter is a reduced first luminance vertical filter that executes the reduced first luminance filter in the vertical direction.

6. The image processing device according to claim 2, further comprising:
a control section that controls the filtering section such that the reduced second luminance vertical filter is applied, as the second color-difference vertical filter, to a block boundary of a coding tree block of a fixed size by a sequence unit.

7. The image processing device according to claim 6, wherein
the control section controls the filtering section such that the reduced second luminance vertical filter is applied, as the second color-difference vertical filter, to a block boundary of a block divided from the coding tree block.

8. The image processing device according to claim 6, wherein
the control section controls the filtering section such that a second luminance vertical filter that executes the second luminance filter in the vertical direction is applied, as the second color-difference vertical filter, to a block boundary of a block divided from the coding tree block.

9. The image processing device according to claim 7, wherein
the block is divided according to a Quad-Tree Block Structure, a Quad Tree Plus Binary Tree Block Structure, or a Multi-type Tree Coding Block Structure.

10. The image processing device according to claim 1, wherein
the second luminance filter is a strong filter for a luminance component conforming to H,265/HEVC standard.

11. The image processing device according to claim 1, wherein
the second luminance filter is a filter obtained by changing a filter characteristic of a strong filter for a luminance component conforming to H,265/HEVC standard.

12. An image processing method comprising:
generating a decoded image by performing a decoding process of a bitstream; and
applying, as a second color-difference filter having a higher filter strength than a first color-difference filter, a reduced second luminance filter or a reduced first luminance filter to a pixel of a color-difference component located around a block boundary in the decoded image, the reduced second luminance filter having a reduced filter characteristic with respect to a second luminance filter having a higher filter strength than a first luminance filter, the reduced first luminance filter having a reduced filter characteristic with respect to the first luminance filter.

13. An image processing device comprising:
a filtering section that applies, as a second color-difference filter having a higher filter strength than a first color-difference filter, a reduced second luminance filter or a reduced first luminance filter to a pixel of a color-difference component located around a block boundary in a local decoded image obtained by a local decoding process during an encoding process of an image, the reduced second luminance filter having a reduced filter characteristic with respect to a second luminance filter having a higher filter strength than a first luminance filter, the reduced first luminance filter having a reduced filter characteristic with respect to the first luminance filter; and an encoding section that performs an encoding process of the image by using the local decoded image to which the second color-difference filter has been applied by the filtering section.

14. An image processing method comprising:

applying, as a second color-difference filter having a higher filter strength than a first color-difference filter, a reduced second luminance filter or a reduced first luminance filter to a pixel of a color-difference component located around a block boundary in a local decoded image obtained by a local decoding process during an encoding process of an image, the reduced second luminance filter having a reduced filter characteristic with respect to a second luminance filter having a higher filter strength than a first luminance filter, the reduced first luminance filter having a reduced filter characteristic with respect to the first luminance filter; and performing an encoding process of the image by using the local decoded image to which the second color-difference filter has been applied.

* * * * *